US011997150B2

(12) United States Patent
Yoden

(10) Patent No.: US 11,997,150 B2
(45) Date of Patent: *May 28, 2024

(54) MEDIA ASSET STREAMING OVER NETWORK TO DEVICES

(71) Applicant: NTF Casting LLC, Wilmington, DE (US)

(72) Inventor: Koji Yoden, Hyogo (JP)

(73) Assignee: NTF Casting LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,233

(22) Filed: Jan. 6, 2022

(65) Prior Publication Data

US 2022/0131919 A1 Apr. 28, 2022

Related U.S. Application Data

(63) Continuation of application No. 16/940,279, filed on Jul. 27, 2020, now Pat. No. 11,245,740, which is a (Continued)

(51) Int. Cl.
*H04L 29/06* (2006.01)
*H04L 41/22* (2022.01)
(Continued)

(52) U.S. Cl.
CPC .............. *H04L 65/60* (2013.01); *H04L 41/22* (2013.01); *H04L 65/612* (2022.05)

(58) Field of Classification Search
CPC ....... H04L 65/60; H04L 65/612; H04L 41/22; H04L 29/06
(Continued)

(56) References Cited

U.S. PATENT DOCUMENTS 6,782,402 B1 * 8/2004 Hidaka .............. H04N 1/32443
707/999.203
7,369,257 B2 * 5/2008 Enomoto ........... H04N 1/00244
709/201

(Continued)

OTHER PUBLICATIONS

"Internet number-Internet Radio," in Newton's Telecom Dictionary, 26th Updted & Expanded Edition, eds. Harry Newton et al., 2011, 4 pages.
(Continued)

*Primary Examiner* — Jude Jean Gilles

(57) ABSTRACT

Streaming of a media asset from a cloud server computer to a media playback device is disclosed. In an embodiment, a list of media assets stored in the cloud server computer is sent over network from the cloud server computer to a portable device. In another embodiment, the list is transferred via close-range communication to the portable device from the media playback device which received the list from the cloud server computer over network. In the embodiments, a media asset is started streaming over network from the cloud server computer to the media playback device responsive to selection of one of the listed media assets at the portable device. In some embodiments, streaming is redirected from the portable device to the media playback device responsive to a user's operation or in case of disconnection.

8 Claims, 69 Drawing Sheets

Related U.S. Application Data continuation of application No. 15/969,577, filed on May 2, 2018, now Pat. No. 10,728,300, which is a continuation of application No. 15/644,726, filed on Jul. 7, 2017, now Pat. No. 9,986,006, which is a continuation of application No. 14/689,020, filed on Apr. 16, 2015, now Pat. No. 9,749,380, which is a continuation of application No. 13/775,193, filed on Feb. 24, 2013, now Pat. No. 9,037,683.

(60) Provisional application No. 61/606,916, filed on Mar. 5, 2012.

(51) Int. Cl.
*H04L 65/60* (2022.01)
*H04L 65/612* (2022.01)

(58) Field of Classification Search
USPC .......................................................... 709/219
See application file for complete search history.

(56) References Cited

U.S. PATENT DOCUMENTS

| | | | |
|---|---|---|---|
| 7,890,647 | B2 | 2/2011 | Nakamura et al. |
| 8,074,248 | B2 | 12/2011 | Sigmon, Jr. et al. |
| 8,291,408 | B1 | 10/2012 | Czymontek |
| 8,537,753 | B2 | 9/2013 | Klein |
| 8,990,364 | B2 | 3/2015 | Spencer et al. |
| 9,037,683 | B1* | 5/2015 | Yoden ............... H04L 65/60 709/219 |
| 9,749,380 | B1* | 8/2017 | Yoden ............... H04L 65/60 |
| 9,986,006 | B2* | 5/2018 | Yoden ............... H04L 41/22 |
| 10,728,300 | B2* | 7/2020 | Yoden ............... H04L 65/1094 |
| 2003/0220845 | A1 | 11/2003 | Chu et al. |
| 2004/0181667 | A1* | 9/2004 | Venters, III ......... G06F 21/10 713/164 |
| 2006/0089949 | A1 | 4/2006 | Robbin et al. |
| 2006/0097991 | A1 | 5/2006 | Hotelling et al. |
| 2006/0123052 | A1 | 6/2006 | Robbin et al. |
| 2007/0022438 | A1 | 1/2007 | Arseneau et al. |
| 2007/0250870 | A1 | 10/2007 | Kim et al. |
| 2008/0051917 | A1 | 2/2008 | Lee |
| 2008/0071682 | A1 | 3/2008 | Dominguez |
| 2008/0158145 | A1 | 7/2008 | Westerman |
| 2008/0158170 | A1 | 7/2008 | Herz et al. |
| 2008/0158172 | A1 | 7/2008 | Hotelling et al. |
| 2008/0165140 | A1 | 7/2008 | Christie et al. |
| 2008/0177822 | A1* | 7/2008 | Yoneda ............ H04N 21/43615 709/202 |
| 2009/0048943 | A1 | 2/2009 | Hardigree |
| 2009/0083136 | A1 | 3/2009 | Blackwood |
| 2009/0217323 | A1* | 8/2009 | Yi ..................... H04N 21/4316 725/110 |
| 2009/0316688 | A1 | 12/2009 | Meenavalli |
| 2010/0008636 | A1* | 1/2010 | Ohno ............... H04N 21/43635 348/739 |
| 2011/0047568 | A1 | 2/2011 | Yeh et al. |
| 2011/0060663 | A1 | 3/2011 | McPhie et al. |
| 2011/0106665 | A1 | 5/2011 | Robbin et al. |
| 2011/0261380 | A1* | 10/2011 | Kwon ............... G03G 15/5087 358/1.15 |
| 2011/0287757 | A1 | 11/2011 | Nykoluk et al. |
| 2011/0305435 | A1* | 12/2011 | Tanaka ............. G11B 20/00862 386/259 |
| 2011/0311195 | A1* | 12/2011 | Ikeda ................ H04N 21/4122 386/230 |
| 2012/0036524 | A1 | 2/2012 | Mugulavalli et al. |
| 2012/0036525 | A1 | 2/2012 | Mugulavalli et al. |
| 2012/0146918 | A1 | 6/2012 | Kreiner et al. |
| 2012/0233651 | A1 | 9/2012 | Lee et al. |
| 2012/0243469 | A1 | 9/2012 | Klein |

OTHER PUBLICATIONS

Adi Robertson, "MIT brings Google App Inventor back from the dead as open-source project", The Verge, retrieved form https://web.archive.org/web/20120123100259/https://www.theverge.com/2012/1/21/2723656/google-app-inventor-open-souce-code-released-by-mit, May 24, 2019, 14 pages.

Declaration Of Henry H. Houh U.S. Pat. No. 9,749,380, Aug. 29, 2017, 114 pages.

Declaration Of Ingrid Hsieh-Yee Under 37 C.F.R. § 1.68 U.S. Pat. No. 9,749,380, *Unified Patents Inc.* vs *Kojicast, LLC*, Apr. 15, 2021, with Appendix, 103 pages.

File History of U.S. Appl. No. 13/775,193, title "Media Asset Streaming Over Network To Devices", Filed on Feb. 24, 2013, 375 pages.

File History of U.S. Appl. No. 14/689,020, title "Media Asset Streaming Over Network To Devices", Filed on Apr. 16, 2015, 279 pages.

Final Written Decision Judgment U.S. Pat. No. 9,749,380, *Unified Patents Inc.* vs *Kojicast, LLC*, IPR2019-01118, Dec. 4, 2020, 46 pages.

Institution of Inter Partes Decision U.S. Pat. No. 9,749,380, *Unified Patents Inc.* vs *Kojicast, LLC*, IPR2019-01118, Dec. 10, 2019, 38 pages.

Mandatory Notice By Patent Owner Under 37 CFR § 42.8 U.S. Pat. No. 9,749,380, *Unified Patents Inc.* vs *Kojicast, LLC*, IPR2019-01118, Jun. 17, 2019, 4 pages.

Mark Blanchet, "A Practical Guide to Implementing IPv6 in Mobile and Fixed Networks", Migrating to IPV6, Exhibit 1008 Wiley & Sons Ltd, May 26, 2006, 70 pages.

Notice Of Filing Date Accorded To Petition And Time For Filing Patent Owner Preliminary Response U.S. Pat. No. 9,749,380, *Unified Patents Inc.* vs *Kojicast, LLC*, IPR2019-01118, Jun. 12, 2019, 5 pages.

Patent Owner Power Of Attorney U.S. Pat. No. 9,749,380, *Unified Patents Inc.* vs *Kojicast, LLC*, IPR2019-01118, Nov. 29, 2019, 4 pages.

Petition for Inter Partes Review of U.S. Pat. No. 9,749,380, *Unified Patents Inc.* vs *Kojicast, LLC*, IPR2019-01118, May 24, 2019, 87 pages.

Petitioner's Power Of Attorney Pursuant To 37 CFR 42.10(B) U.S. Pat. No. 9,749,380, Koji Yoden, IPR2019-01118, May 22, 2019, 1 page.

Petitioner's Stipulation To Treat Exhibit 1013 As A Declaration U.S. Pat. No. 9,749,380, *Unified Patents LLC* vs *Kojicast, LLC*, IPR2019-01118, Aug. 18, 2020, 3 pages.

Petitioner's Updated Mandatory Notice To Update Counsel Of Record U.S. Pat. No. 9,749,380, IPR2019-01118, Oct. 21, 2019, 4 pages.

Petitioner's Updated Mandatory Notices U.S. Pat. No. 9,749,380, *Unified Patents LLC* vs *Kojicast, LLC*, IPR2019-01118, Jan. 9, 2020, 4 pages.

Petitioner's Voluntary Interrogatory Responses U.S. Pat. No. 9,749,380, *Unified Patents LLC* vs *Kojicast, LLC*, IPR2019-01118, May 24, 2019, 10 pages.

Power Of Attorney Of Kojicast, LLC U.S. Pat. No. 9,749,380, *Unified Patents Inc.* vs *Kojicast, LLC*, IPR2019-01118, Jun. 17, 2019, 3 pages.

Scheduling Order Patent 9,749,380 *Unified Patents Inc.* vs *Kojicast, LLC*, IPR2019-01118, Dec. 10, 2019, 11 pages.

U.S. Appl. No. 61/606,916, title "Media Streaming From Cloud Server Computer Over Network" filed on Mar. 5, 2012, 71 pages.

Updated Mandatory Notice By Patent Owner Under 37 CFR §42.8 U.S. Pat. No. 9,749,380, *Unified Patents Inc.* vs *Kojicast, LLC*, IPR2019-01118, Dec. 4, 2019, 5 pages.

* cited by examiner

MEDIA ASSET STREAMING OVER NETWORK TO DEVICES

CROSS REFERENCE TO RELATED APPLICATIONS

This application claims priority from and is a continuation of U.S. patent application Ser. No. 16/940,279, filed on Jul. 27, 2020, which a continuation of U.S. patent application Ser. No. 15/969,577, filed on May 2, 2018 (now issued as U.S. Pat. No. 10,728,300), which is continuation of U.S. patent application Ser. No. 15/644,726, filed on Jul. 7, 2017 (now issued as U.S. Pat. No. 9,986,006), which is a continuation of U.S. patent application Ser. No. 14/689,020, filed on Apr. 16, 2015 (now issued as U.S. Pat. No. 9,749,380), which is a continuation of U.S. patent application Ser. No. 13/775,193, filed on Feb. 24, 2013 (now issued as U.S. Pat. No. 9,037,683), which claims priority from U.S. Provisional Patent Application 61/606,916, filed on Mar. 5, 2012, the contents of each of which are expressly incorporated herein by reference in their entirety.

TECHNICAL FIELD

The present disclosure relates to streaming of media assets from a server computer to one or more devices over network.

BACKGROUND

There have been marketed multi-functional portable computing devices such as iPhone and iPad both made by Apple Inc., other tablets, mobile phones, and the likes.

Such computing device today has one or more processors of great performance and one or more memories in which computer programs and media assets can be stored. The computer programs include a media player and a video game. The media asset includes music data, movie data, and video game data. For example, when a user executes a media player in the computing device to play the music data or video data, the user can enjoy music and movies. For example, when a user executes a video game program in the computing device to play the video game data, the user can enjoy playing the video games as if the computing device were just like a game console.

However, a user may feel less excited through playing such media assets in the portable computing device than through playing them in a typical desktop television set or home audio system, because the portable computing device typically has a smaller local display and/or a more inferior loudspeaker than the typical television set or home audio system.

An approach of sending graphics or video from a portable computing device to a remote display device such as a desktop television set by way of some kind of communication protocol upon playing the media assets may be helpful. A typical television set has a display that is larger than the local display of the portable computing device. Accordingly, such approach may enable a larger screen of the played media to be displayed, and thus may make the user feel more excited. An example of such approach is disclosed in the international patent publication No. WO2004/082284 entitled "Methods, Devices, and Systems for Displaying Information from Remote Electronic Device". Furthermore, if those skilled in the art could apply such approach of sending video to sending music, it might make the user to feel more excited by enabling music to be played through a loudspeaker of the home audio system.

However, such approach of sending video or music from a portable computing device to a remote appliance requires the media assets to be stored in the local memories in one or both of the portable computing device and the remote appliance.

Therefore, the present invention addresses an approach of streaming media assets over network.

SUMMARY

Aspects of the present invention are methods of streaming media assets over network from a server computer to a media-playing device.

According to a first aspect, information indicative of media assets stored in the server computer is sent over network from the server computer to a portable device, so that the portable device displays a user interface for presenting the media assets. In response to selection of a media asset out of the presented media assets through the user interface, the selected media asset is streamed over network from the server computer to the media-playing device.

According to a second aspect, information indicative of media assets stored in the server computer is transferred to a portable device from the media-playing device which received the information from the server computer, so that the portable device displays a user interface for presenting the media assets. In response to selection of a media asset out of the presented media assets through the user interface, the selected media asset is streamed over network from the server computer to the media-playing device.

The word "tappable" used in this application means possibility or ability of being tapped. For example, a tappable object means an object which is to be tapped, or which a user can tap on.

A "media asset" described in this application means electronic data, in any form, to be executed and/or played. For example, the media asset includes video data constituting a video clip, a motion picture, a movie, and the likes; audio data constituting music, a song, and the likes; text data constituting a document and the likes; and a computer program constituting an application such as a video game, a text editor, and the likes. The media asset may be also referred to as a media content, a media file, or the likes.

"Streaming" described in this application means providing a stream of the media asset in a manner where a recipient of the stream is able to play the stream. The streaming may be performed pursuant to, for example, protocols such as the HTTP (Hypertext Transfer Protocol), the RTSP (Real Time Streaming Protocol), and the RTMP (Real Time Messaging Protocol). The streaming includes a so-called progressive download.

DRAWINGS

DETAILED DESCRIPTION

First Embodiment

Summary

Figure 1:
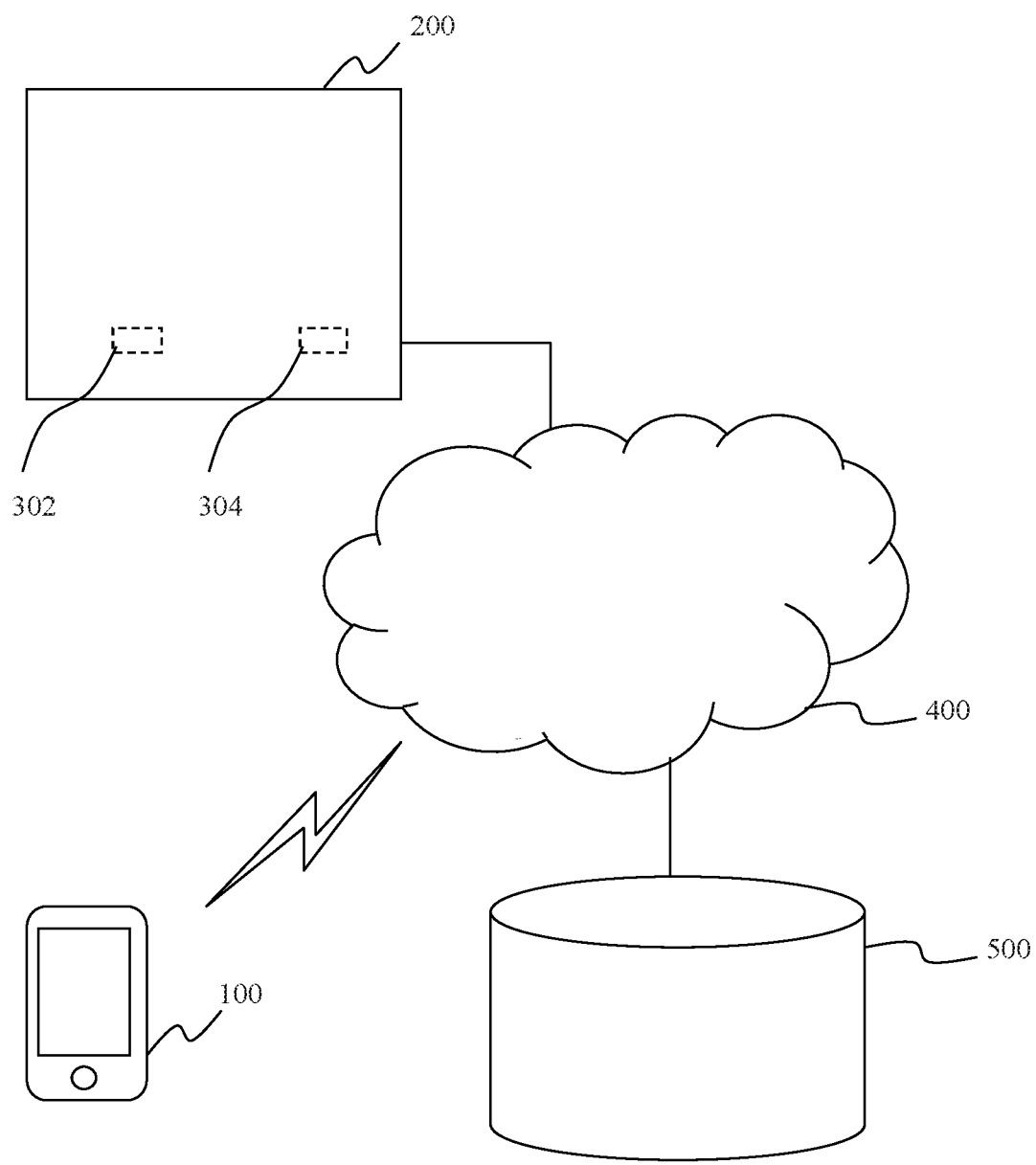
FIG. 1 illustrates a system including a computing device, a media-playing device, and a cloud server computer according to a first embodiment.

In the first embodiment, a computing device 100 and one or more media-playing devices 200 can be connected to a cloud server computer 500 over network 400. The cloud server computer 500 stores media assets. The cloud server computer 500 presents to the computing device 100 a list of the stored media assets. Responsive to selection of a media asset out of the presented media assets by the computing device 100, the cloud server computer 500 can start streaming the selected media asset over network 400 to the media-playing device 200.

Rough Configuration

Figure 2:
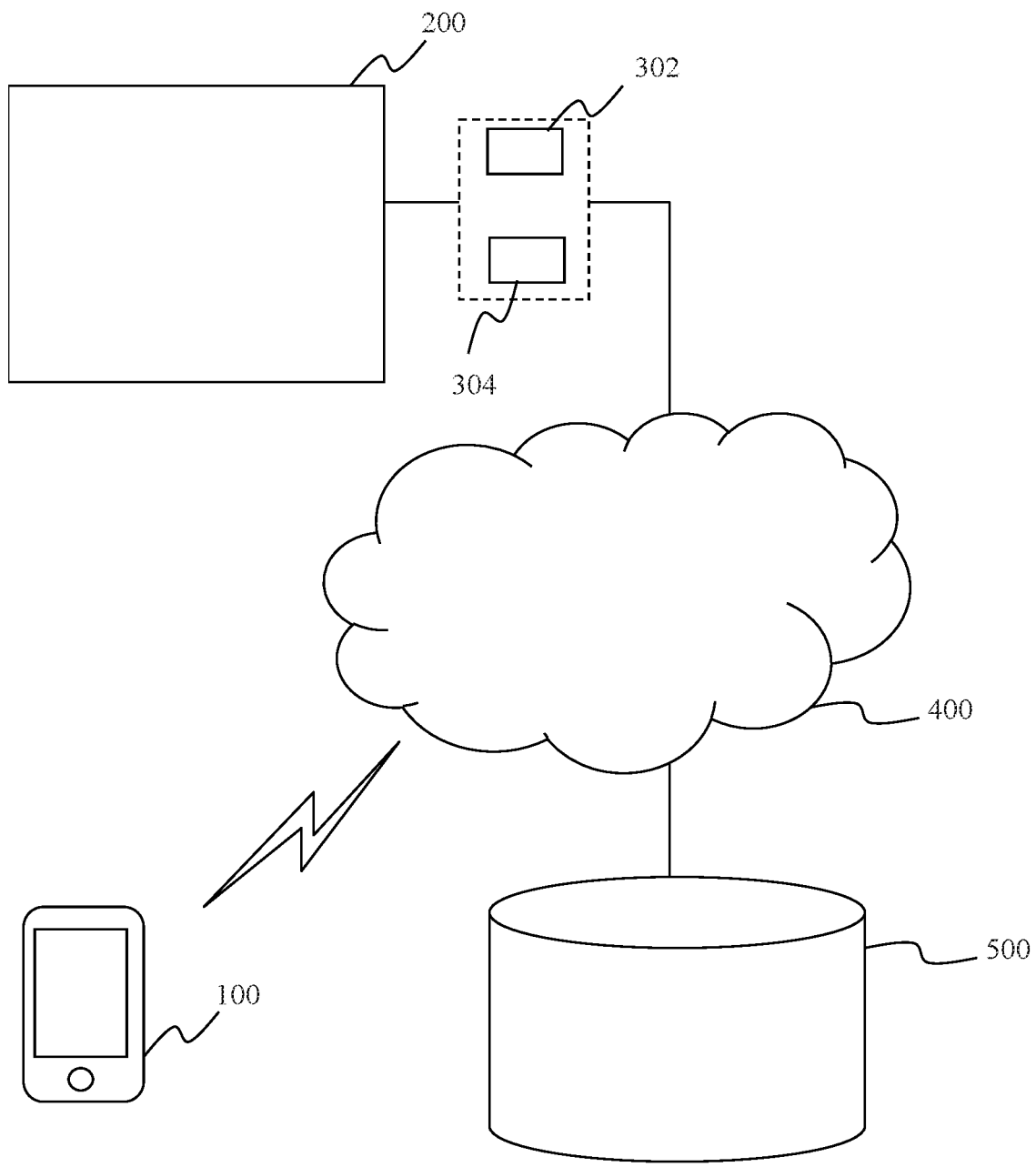
FIG. 2 illustrates a system including a computing device, a media-playing device, and a cloud server computer according to the first embodiment.

FIGS. 1 and 2 depict a system, according to the present embodiment, including the computing device 100, the media-playing device 200, and the cloud server computer As depicted in FIGS. 1 and 2, the computing device 100 and the media-playing device 200 are connected to the cloud server computer 50) over the network 400.

The computing device 100 is a multi-functional computing device suitable in size for portability. The computing device 100 can be a smartphone, cell phone, a tablet computer, a laptop computer, and another similar computing device.

The computing device 100 has communication circuitry 103 for wirelessly connecting to the network 400.

The media-playing device 200 is an appliance suitable for use, for example, on a desk, a table, or in a living room for playing media assets. The media-playing device 200 plays media assets to output media generated as a result of playing the media assets. For example, the media-playing device 200 may have a display unit with the size of 20 inches, 32 inches, 40 inches, 60 inches, and so on for displaying visual media generated as a result of playing visual media assets. For example, the media-playing device 200 may have a loudspeaker unit for outputting sound generated as a result of playing audio media assets.

The media-playing device 200 is coupled to communication circuitry 302 for connecting to the network 400 to receive media assets.

The computing device 100 and the media-playing device 200 are physically other than from each other. In other words, circuitry of the computing device 100 and circuitry of the media-playing device 200 are encased in housings different from each other.

Figure 3:
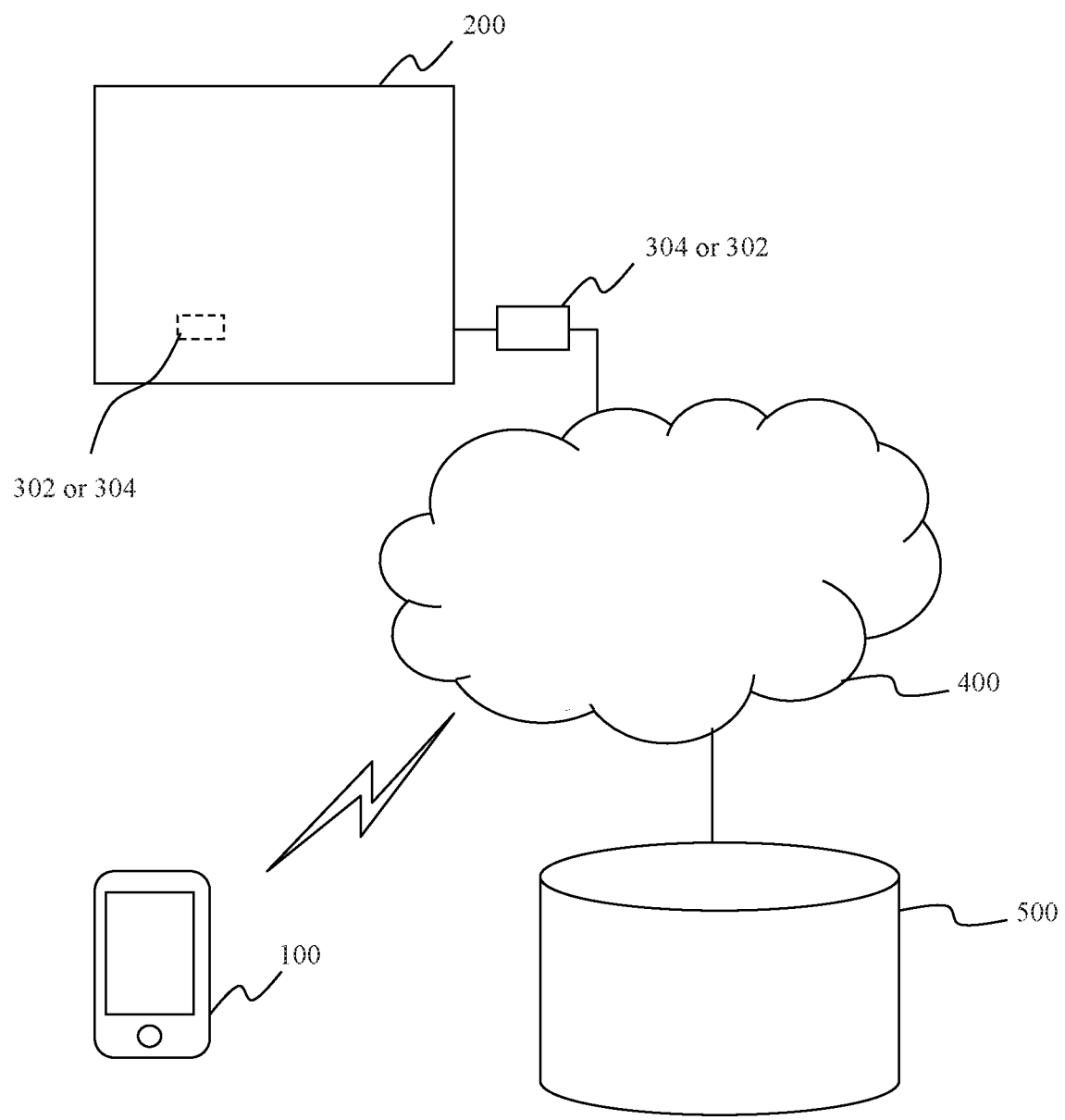
FIG. 3 illustrates a system including a computing device, a media-playing device, and a cloud server computer according to the first embodiment.

The computing device 100 and the media-playing device 200 can be connected together over close-range communication. Specifically, the computing device 100 has close-range communication circuitry 106 for wirelessly connecting to the media-playing device 200. The media-playing device 200 is coupled to close-range communication circuitry 304 for wireless close-range communication with the computing device 100. Each of the circuitry 302 and 304 can be provided inside the media-playing device 200 as depicted in FIG. 1, or can also be an external device attachable to the media-playing device 200 by way of, for example, USB (Universal Serial Bus) or another interface as depicted in FIG. 2. Or, one of the circuitry 302 and 304 can be provided inside the media-playing device 200 while another can be an external device attachable to the media-playing device 200, as depicted in FIG. 3.

The network 400 is communication environment where the computing device 100 and the media-playing device 200 are connected to the cloud server computer 500. The network 400 can be the Internet, a LAN (Local Area Network), the WiMAX™, or other one or a combination of communication platforms.

The cloud server computer 500 is a computing device having communication circuitry 503 for connection over the network 400 to the computing device 100 and the media-playing device 200. The cloud server computer 500 stores media assets and provides a service of streaming the media assets to the computing device 100 and/or the media-playing device 200 over the network 400. For example, the cloud server computer 500 may consist essentially of a personal computer, a work station, or a similar computing device coupled to storage for storing the media assets.

Computing Device 100

Figure 4:
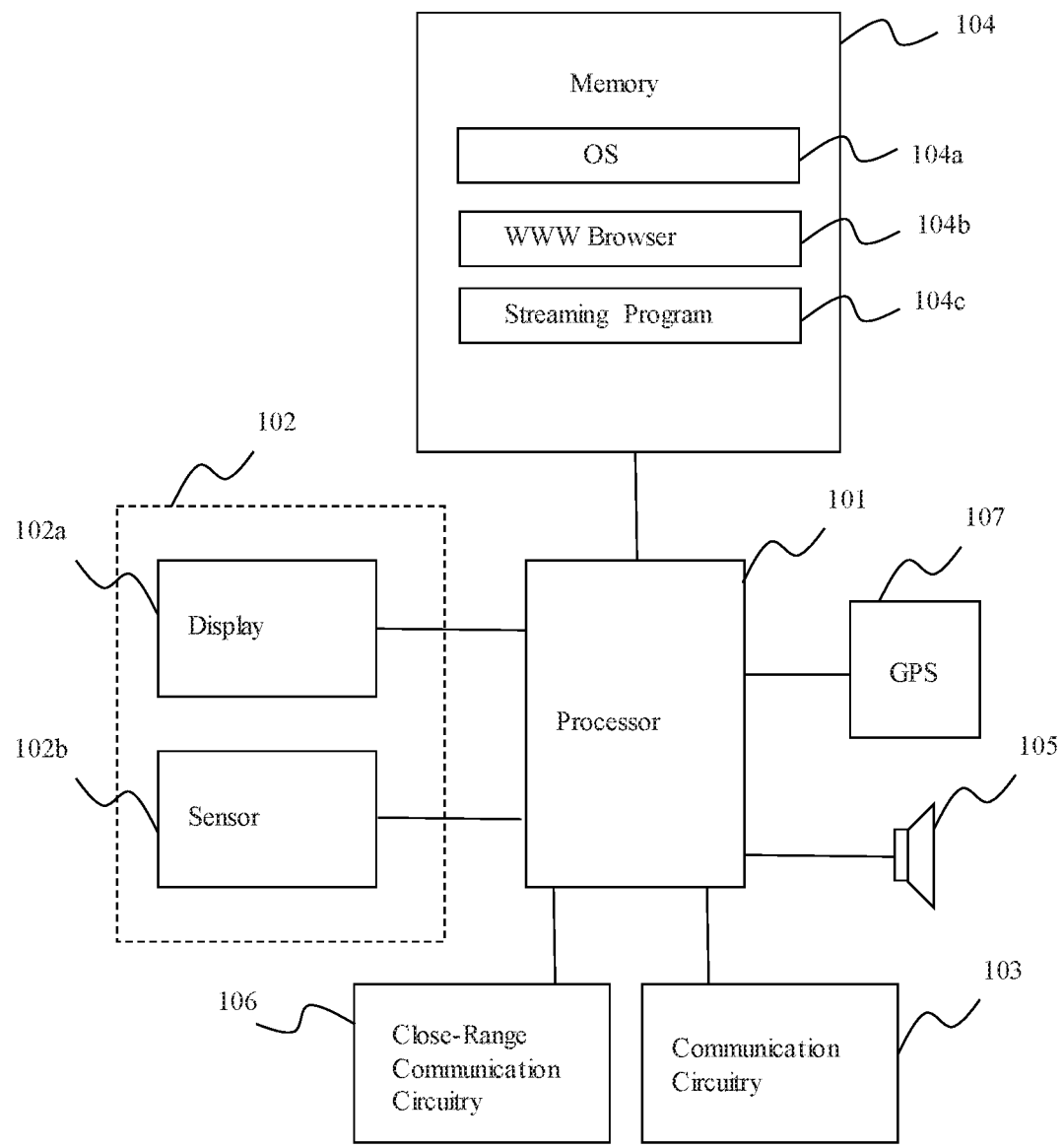
FIG. 4 is a block diagram illustrating means and/or circuitry provided in the computing device according to the embodiments.

FIG. 4 is a block diagram of the computing device 100 for illustrating the configuration of the computing device 100 in more detail.

The computing device 100 mainly has a processor 101, a sensitive display 102, the communication circuitry 103, a memory 104, a loudspeaker unit 105, the close-range communication circuitry 106, and GPS circuitry 107.

The processor 101 generally processes instructions of computer programs stored in the memory 104 to execute the computer programs, so as to realize a variety of functions of the computing device 100. The processor 101 can be a CPU (Central Processing Unit), a MPU (Micro Processing Unit), a DSP (Digital Processing Unit), or another general or dedicated processor.

The sensitive display 102 is a display unit composed essentially of a display unit 102a and a sensor unit 102b. The display unit 102a can be a LCD (Liquid Crystal Display), an EL (Electro-Luminance) display, or another similar type of display device. The display unit 102a displays graphics and video in accordance with video signals generated by and sent from the processor 101. The sensor unit 102b is a sensor to distinctively detect (i) taps of one or more objects, such as a user's finger and a stylus, made onto the sensor unit 102b and (ii) hover of such object made in proximity over the sensor unit 102b. The senor unit 102b sends to the processor 101 signals representing (i) the location of the detected tap as long as such tap is detected and (ii) the location of detected hover as long as such hover is detected. A tap may be a touch or a contact in other words. Further, the sensor unit 102b detects gestures by (i) continuously detecting hover continuously made in proximity above the sensor unit 102b or (ii) continuously detecting a movement of the object while a tap is maintained on the sensor unit 102b. The technologies of sensing of taps, hover, and/or gestures are disclosed, for example, in the U.S. patent publications Nos. 2009/194344 invented by Harley et al, 2008/297487 invented by Hotelling et al, 2009/289914 invented by CHO, 2006/26521 invented by Hotelling et al, 2006/244733 invented by Geaghan et al, 2010/45633 invented by Gettemy et al, 2011/169780 invented by Goertz et al, 2008/158172 invented by Hotelling et al, and the issued U.S. Pat. No. 7,653,883 invented by Hotelling et al, U.S. Pat. No. 8,232,990 invented by King et al, U.S. Pat. No. 7,880,732 invented by Goertz, U.S. Pat. No. 7,663,607 invented by Hotelling et al, U.S. Pat. No. 7,855,718 invented by Westerman, U.S. Pat. No. 7,777,732 invented by HERZ et al, U.S. Pat. No. 7,924,271 invented by Christie et al, U.S. Pat. No. 8,219,936 invented by Kim et al, U.S. Pat. No. 8,284,173 invented by Morrison, U.S. Pat. No. 6,803,906 invented by Morrison, U.S. Pat. No. 6,954,197 invented by Morrison et al, U.S. Pat. No. 7,692,627 invented by Wilson, the contents of which are incorporated herein by reference in their entirety. The display unit 102a and the sensor unit 102b can be mechanically integrated together. As a result, the sensitive display 102 displays graphics and video as well as detects tap, hover, and gestures of an object like the users finger or a stylus made on or above the sensitive display 102.

The communication circuitry 103 is circuitry for wirelessly connecting to the network 400 to send and receive data to and from the cloud server computer 500 over the network 400. The communication circuitry 103 can be pursuant to the CDMA (Code Division Multiple Access), the WiMAX™ protocol, the wireless LAN (Local Area Network) protocol, or another wireless communication protocol depending on the communication platform of the network 400.

The memory 104 is a memory device such as, for example, a flash memory, an EEPROM, a HDD (Hard Disk Drive), a combination thereof, and another similar device for data storage. The memory 104 stores computer programs to be executed by the processor 101. In particular, the memory 104 stores an OS (Operating System) 104a, a WWW (World Wide Web) browser 104b, and a streaming program 104c. The WWW browser 104b and the streaming program 104c are typically application programs that run on the OS 104a. The programs 104b and 104c are often collectively referred to as application programs. One or more of the application programs 104b and 104c can be executed on the OS 104a in response to the user's selection.

The WWW browser 104b is a program generally having instructions of: receiving designation of URLs (Universal Resource Locators) from the user; connecting to the designated URLs; and displaying WWW pages corresponding to the URLs on the sensitive display 102.

The streaming program 104c is a program that is associated with the URL of the cloud server computer 500 and has instructions for media asset streaming. The instructions preferably includes but are not limited to: connecting to the cloud server computer 500; displaying on the sensitive display 102 a GUI (Graphical User Interface) to receive operations from the user; requesting login to and out of the cloud server computer 500; requesting registration of the computing device 100 and the media-playing devices 200 to the cloud server computer 500; receiving information indicative of media assets from the cloud server computer 500; displaying a list of the media assets with reference to the information; receiving a user input to select a media asset out of the listed media assets; requesting streaming of the selected media asset to the cloud server computer 500;

playing streamed media asset; and displaying a menu for operation of the media asset streaming.

The memory 104 also can store media assets locally. For example, the media assets downloaded through the communication circuitry 103 over the network 400 can be stored in the memory 104.

The loudspeaker unit 105 outputs sound generated as a result of media assets being played by the processor 101.

The close-range communication circuitry 106 is circuitry for wirelessly connecting to the close-range communication circuitry 304 of the media-playing device 200. Data can be transmitted to and received from the media-playing device 200 through the close-range communication circuitry 106. The close-range communication circuitry 106 can communicate in accordance with, for example, an infrared communication protocol, the Bluetooth™ protocol, the WiMAX™ protocol, the wireless LAN (Local Area Network) protocol, or another close-range wireless communication protocol.

The GPS circuitry 107 is circuitry for locating the computing device 100 by use of the GPS (Global Positioning System). The GPS circuitry 107 may generate location information indicative of the location, such as the latitude and longitude, of the computing device 100.

Media-Playing Device 200

Figure 5:
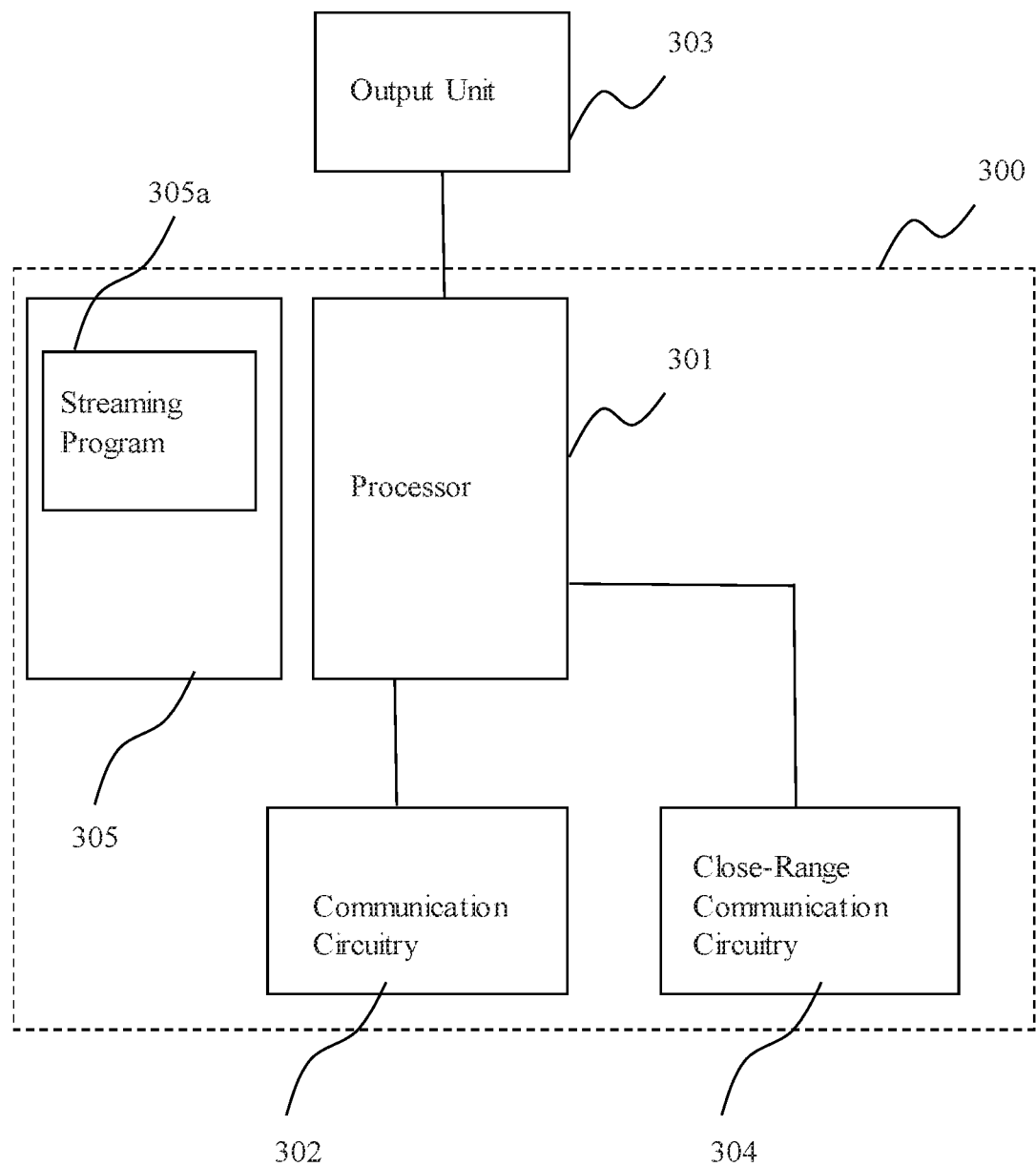
FIG. 5 is a block diagram illustrating means and/or circuitry provided in the media-playing device according to the embodiments.

FIG. 5 is a block diagram of the media-playing device 200 for illustrating the configuration of the media-playing device 200 in more detail.

The media-playing device 200 is mainly provided with or coupled to a processor 301, the communication circuitry 302, an output unit 303, the close-range communication circuitry 304, a memory 305, and GPS circuitry 307.

The communication circuitry 302 is circuitry for connecting to the network 400 to receive data from the cloud server computer 500. For example, the communication circuitry 302 can be pursuant to the CDMA (Code Division Multiple Access), the WiMAX™ protocol, the LAN (Local Area Network) protocol, or another communication protocol depending on the communication platform of the network 400.

The processor 301 generally executes computer programs stored in the memory 305. The processor 301 can be a CPU (Central Processing Unit), a MPU (Micro Processing Unit), a DSP (Digital Processing Unit), or another general or dedicated processor.

The memory 305 stores a streaming program 305a that is a computer program having instructions for playing streamed media assets. The instructions preferably include but are not limited to: accessing to the cloud server computer 500 over the network 400; receiving information indicative of media assets stored in the cloud server computer 500 from the cloud server computer 500; transferring the information to the computing device 100 via the close-range communication circuitry 304; receiving a selection of a media asset from the computing device 100 via the close-range communication circuitry 304; sending a request for streaming of the selected media asset to the cloud server computer 500; receiving a media asset streamed from the cloud server computer 500 over the network 400; playing the streamed media asset by decoding the media asset if the media asset is encoded; and outputting video and/or audio signals generated as a result of playing the media asset to the output unit 303.

The output unit 303 is a unit for presenting media generated as a result of the processor 31 playing media assets. Specifically, the output 303 may be a display unit such as a LCD (Liquid Crystal Display), an EL (Electro-Luminance) display, and the likes for displaying video generated as a result of playing visual media assets, or may be a loudspeaker unit for outputting sound generated as a result of playing audio media assets.

The close-range communication circuitry 304 is circuitry for wirelessly connecting to the close-range communication circuitry 106 of the computing device 100. Data can be transmitted to and received from the computing device 100 through the close-range communication circuitry 304. The close-range communication circuitry 304 can communicate in accordance with, for example, an infrared communication protocol, the Bluetooth™ protocol, the WiMAX™ protocol, the wireless LAN (Local Area Network) protocol, or another close-range wireless communication protocol.

The GPS circuitry 307 is circuitry for locating the media-playing device 200 by use of the GPS (Global Positioning System). The GPS circuitry 307 may generate location information indicative of the location, such as the latitude and longitude, of the media-playing device 200.

Cloud Server Computer

Figure 6:
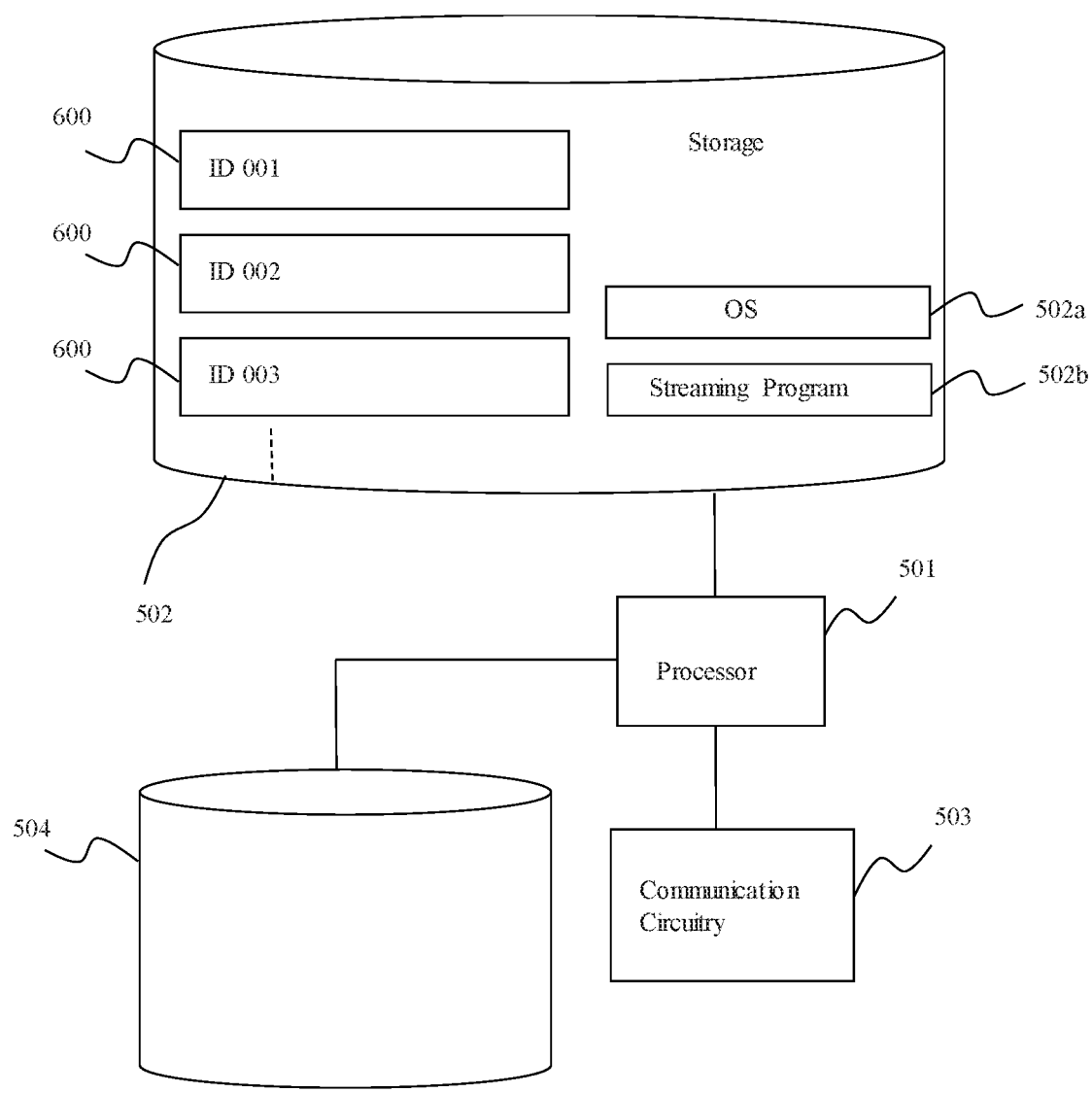
FIG. 6 is a block diagram illustrating means and/or circuitry provided in the cloud server computer according to the embodiments.

FIG. 6 is a block diagram of the cloud server computer 500 for illustrating the configuration of the cloud server computer 500 in more detail.

The cloud server computer 500 mainly has a processor 501, storage 502, communication circuitry 503, and storage 504.

The communication circuitry 503 is circuitry for connecting to the network 400 to receive and send data from and to the computing device 100 and the media-playing device 200. For example, the communication circuitry 503 can be pursuant to the CDMA (Code Division Multiple Access), the WiMAX™ protocol, the LAN (Local Area Network) protocol, or another communication protocol depending on the communication platform of the network 400.

The processor 501 generally processes instructions of computer programs stored in the storage 502 to execute the computer programs. The processor 501 can be a CPU (Central Processing Unit), a MPU (Micro Processing Unit), a DSP (Digital Processing Unit), or another general or dedicated processor.

Figure 7:
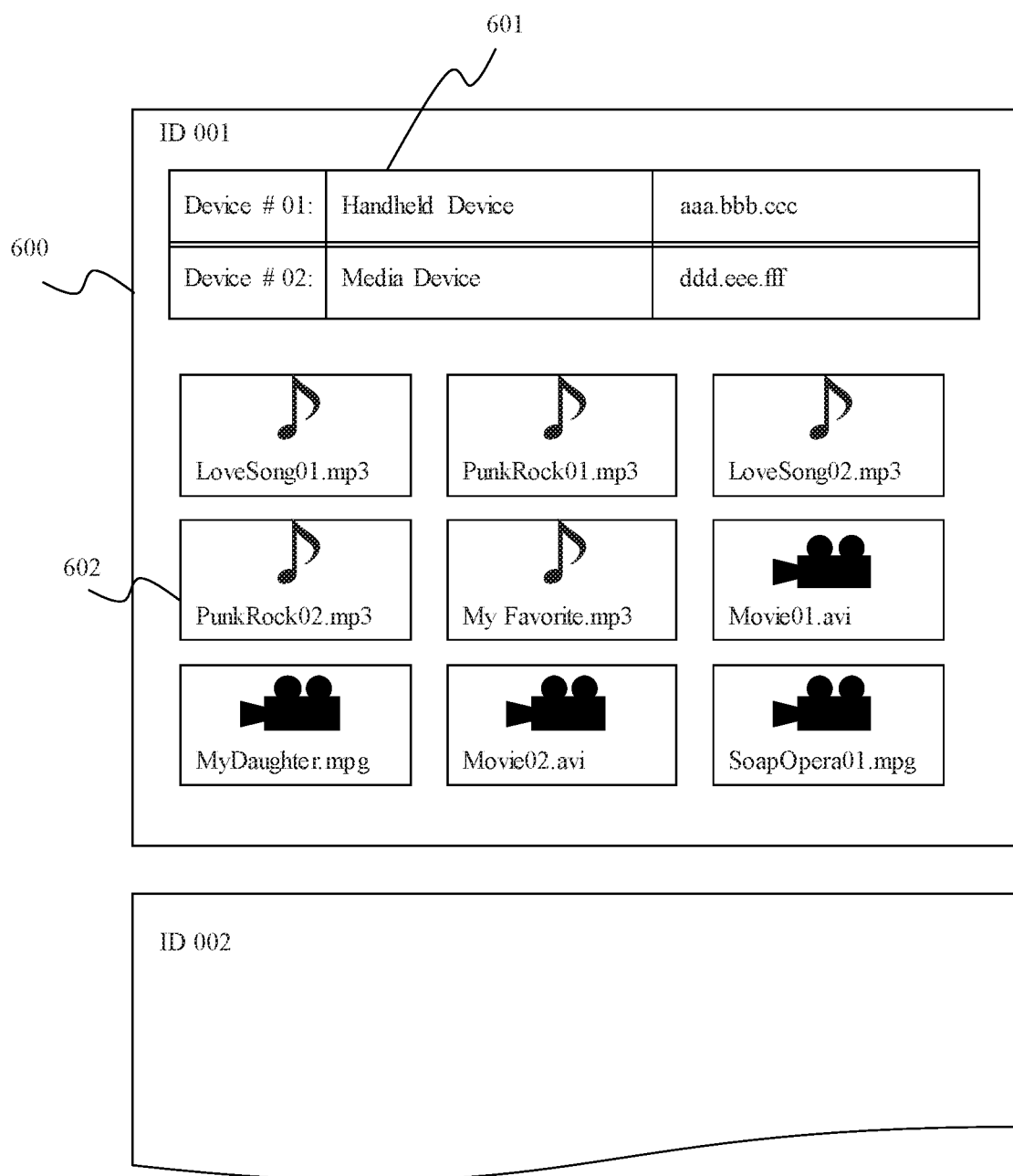
FIG. 7 illustrates user information stored in the cloud server computer.

The storage 502 stores computer programs to be executed by the processor 501 and user data 600 associated with user IDs. The computer programs mainly include OS 502a and a streaming program 502b. The streaming program 502b runs on the OS 502a. Each of the user data 600 is associated with a specific user ID, and contains device information 601 and media assets 602 associated with the specific user ID, as illustrated in FIG. 7. The device information 601 includes a name of each of one or more computing devices 100 and one or more media-playing devices 200 registered by a user and information, such as an IP address, unique to the corresponding device for identifying the device over network 400. The media assets 602 may be media data that have been copied or downloaded over the network 400, or have been uploaded by the user.

More specifically, a media asset 602 may be an audio media product formatted in MP3 (MPEG2 Audio Layer-3), AAC (Advanced Audio Coding), or another audio format. A media asset 602 may be a video media product formatted in AVI (Audio Video Interleave), MPEG4, H.264, or another video format. A media asset 602 also may be a video game product formatted in EXE (Execution) or another program format.

As illustrated in FIG. 7, for example, the user data 600 of the user ID 001 includes the device information 601 indicative of the computing device 100 labeled "Handheld Device" as a device number 01 having an IP address of "aaa.bbb.ccc" and a media-playing device 200 labeled "Media Device" as a device number 02 having an IP address of "ddd.eee.fff". The user data 600 of the user ID 001 also includes the audio media assets 602 of "LoveSong01.mp3", "PunkRock01.mp3", "LoveSong02.mp3", "PunkRock02.mp3" and "MyFavorite.mp3", and the video media assets 602 of "Movie01.avi", "MyDaughter.mpg", "Movie02.avi" and "SoapOpera01.mpg".

The streaming program 502b is a program having instructions for streaming media assets 602. The instructions preferably include but are not limited to: sending an encoded media asset 602 to a device registered in the device information 601; decoding an encoded media asset 602 and generating a decoded media asset to send the decoded media asset to a device registered in the device information 601; and, in case of streaming a media asset 602 of a video game product, executing the video game product and generating graphics of the video game product to send the graphics to a device registered in the device information 601. The instructions may also include (i) registration of the user data 600, (ii) permission of login, (iii) copy/download of media assets to store the media assets in the storage 504, (iv) upload of media assets, (v) establishment of connection to the computing device 100 and the media-playing device 200, and (vi) streaming of media assets over the network 400 to a device listed in the user data 600. Details of how the streaming is done will be described below.

The storage 504 stores media assets for sale. The media assets stored in the storage 504 do not belong to any of the users of the user IDs, and is to be copied or downloaded as the user data 600 of a purchaser.

Registration of User ID

Figure 9:
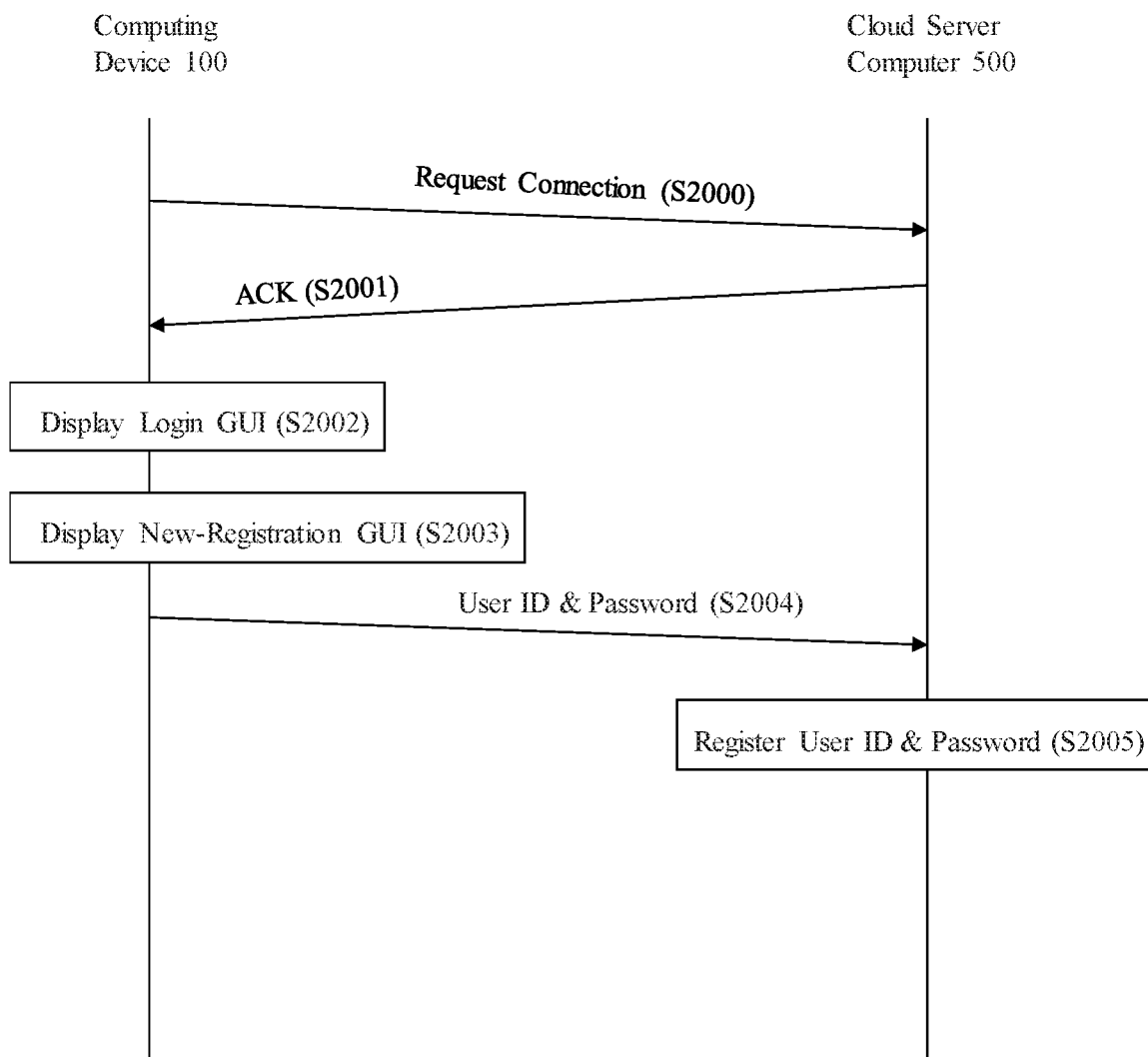
FIG. 9 is a flowchart illustrating operations performed by the computing device and the cloud server computer for registration of a user ID.

First, the user needs to register a unique user ID in the cloud server computer 500. FIG. 9 is a flowchart illustrating registration of user ID.

As illustrated in FIG. 9, the user first uses the computing device 100 to connect to the cloud server computer 500 to register his/her unique user ID.

Responsive to the user's operation through the sensitive display 102, the computing device 100 launches the streaming program 104c and sends to the cloud server computer 500 via the communication circuitry 103 a request for connection between the computing device 100 and the cloud server computer 500 (S2000).

Figure 8A:
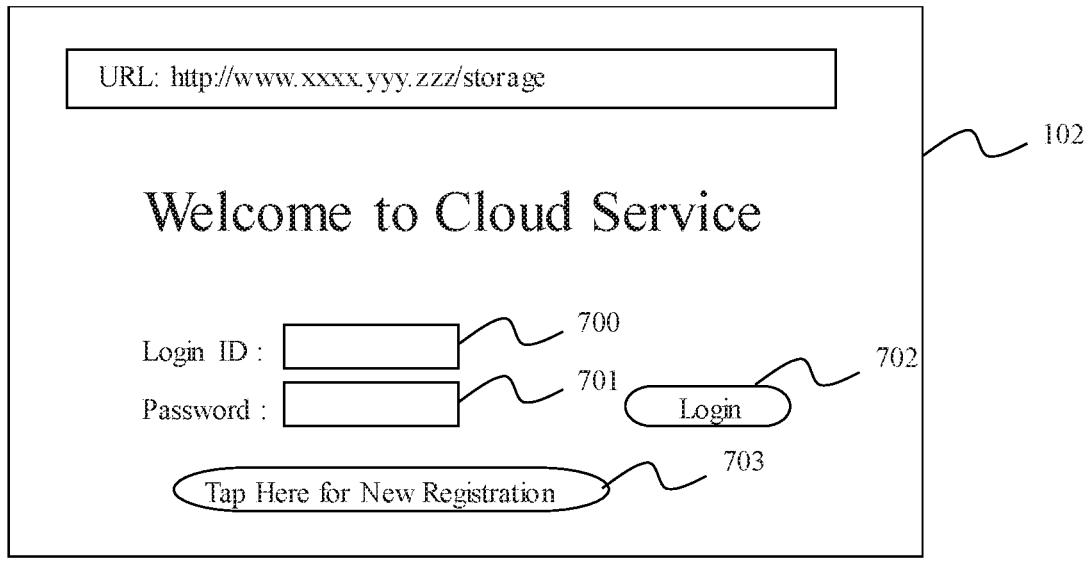
FIGS. 8A through 8J illustrate GUIs (Graphical User Interfaces) displayed on a sensitive display of the computing device according to a first embodiment.

Responsive to establishment of connection between the computing device 100 and the cloud server computer 500 (S2001), the computing device 100 displays on the sensitive display 102 a GUI for login to the cloud server computer 500 as illustrated in FIG. 8A (S2002).

The GUI contains an input field 700 for input of a user ID, an input field 701 for input of a password, and tappable icons 702 and 703. A user ID and a password can be input in the input field 700 and 701 by the user's operation through the sensitive display 102.

Figure 8B:
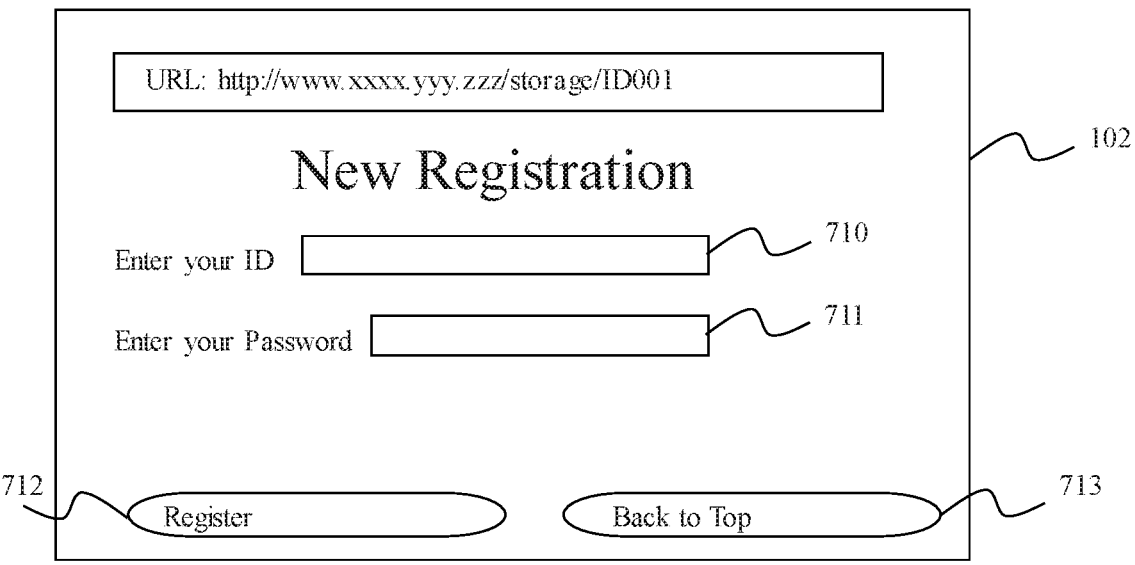

If the user has not registered any user ID yet, the user needs to register his/her unique user ID. Tapping the icon 703 through the sensitive display 102 proceeds the GUI to a GUI for new registration (S2003). The GUI for new registration contains an input field 710 for input of a user ID the user would like to register, an input field 711 for input of a password the user would like to register along with the user ID input in the input filed 710, as illustrated in FIG. 8B. A user ID and a password can be input in the input fields 710 and 711 by the user's operation through the sensitive display 102. The GUI also contains tappable icons 712 and 713. Responsive to the icon 712 being tapped through the sensitive display 102, the computing device 100 sends to the cloud server computer 500 the user ID and password input in the input fields 710 and 711 (S2004). The cloud server computer then registers the received user ID and the password together (S2005). The registered user ID and password are stored as the user data 600. Responsive to the icon 713 being tapped through the sensitive display 102, the GUI returns to the GUI for login as illustrated in FIG. 8A.

Login

Once the user ID and the password have been registered in the cloud server computer 500, the computing device 100 can login to the cloud server computer 500 with the user ID.

Figure 10:
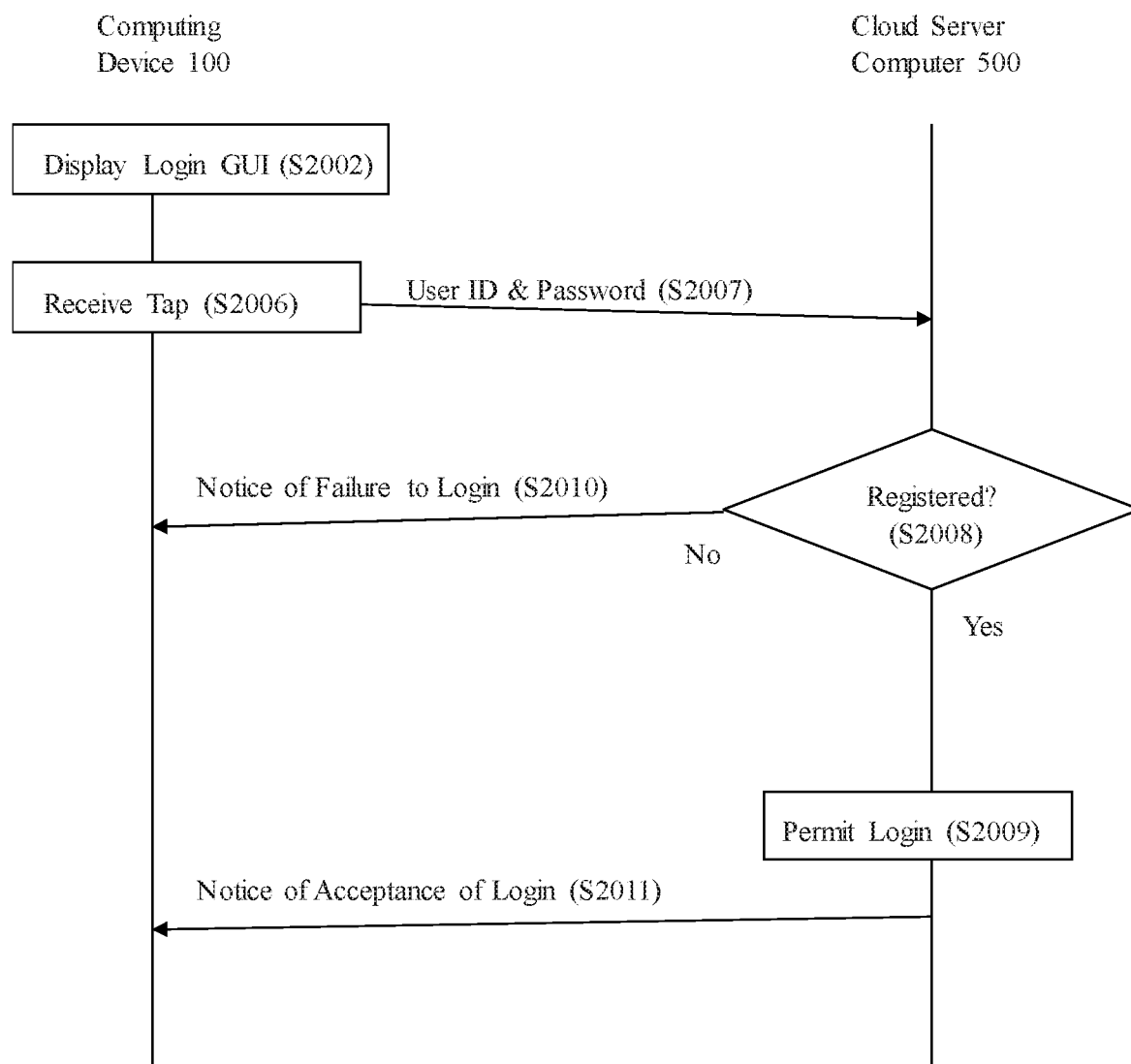
FIG. 10 is a flowchart illustrating operations performed by the computing device and the cloud server computer for login.

In the GUI for login as illustrated in FIG. 8A, the computing device 100 receives input of the user ID and the password in the input fields 700 and 701, and receives tapping on the icon 702. Responsive to the icon 702 being tapped through the sensitive display 102 (S2006), the computing device 100 sends a request for login with the input user ID and the password to the cloud server computer 500 (S2007), as illustrated in FIG. 10. The cloud server computer 500 accepts login from the computing device 100 with the user ID and the password (S2009) if the user ID and the password are registered together as the user data 600 (S2008: Yes). Then, the cloud server computer 500 notifies the computing device 100 of acceptance of login (S2011). On the other hand, the cloud server computer 500 does not permit login from the computing device 100 and notifies the computing device 100 of failure to login (S2010) if the user ID and the password are not registered (S2008: No).

Registration of Devices

After login to the cloud server computer 500, the user can register one or more media-playing devices 200 in association with the computing device 100 in the cloud server computer 500.

Figure 8C:
Figure 11:
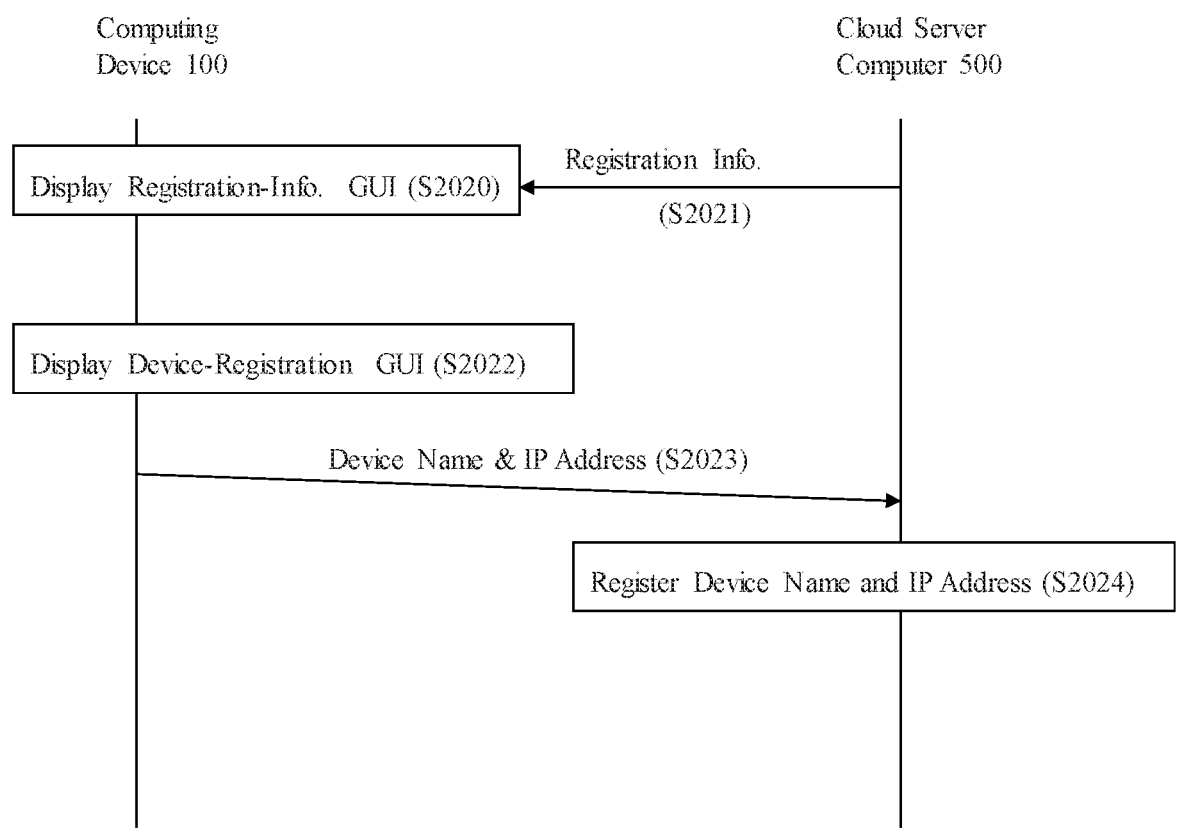
FIG. 11 is a flowchart illustrating operations performed by the computing device and the cloud server computer for registration of the media-playing device.

FIG. 11 is a flowchart illustrating registration of the media-playing devices 200. Responsive to the notification of acceptance of login in S2011, the GUI proceeds to the GUI for registration information as illustrated in FIG. 8C (S2020). Responsive to the notification of acceptance of login in S2011, the cloud server computer 500 sends to device information 601 stored as the user data 600. For example, if the user has logged in with the user with the user ID 001, the cloud server computer 500 sends the device information 601 as the user data 600 of the user ID 001. Accordingly, in the GUI for registration information, the computing device 100 receives from the cloud server computer 500 the device information 601 (S2021).

The GUI for registration information contains information field 720 and tappable icons 721 and 722. The information field 720 displays user ID and the received device information 601 indicative of the devices registered in the cloud server computer 500 in association with the user ID. In the example of FIG. 8C, the device information 601 shows that the computing device 100 with the IP address of "aaa.bbb.ccc" is labeled "Handheld Device" and registered as the Registered Device 1, and a media-playing device 200 with the IP address of "ddd.eee.fff" is labeled "Media Device" and registered as the Registered Device 2.

Figure 8D:
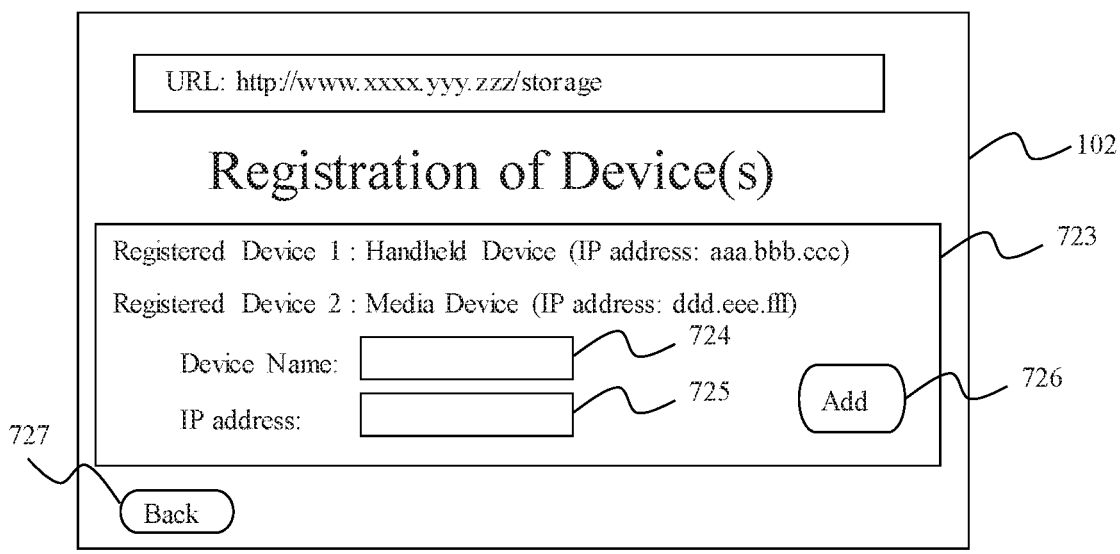

Tapping on the icon 722 proceeds the GUI to a GUI for device registration as illustrated in FIG. 8D (S2022). In the GUI for device registration, the registration information field 723 displays an input field 724 for input of a device name, an input field 725 for input of an IP address, and tappable icons 726 and 727, as well as the device information 601.

In the GUI for device registration, the computing device 100 receives input of a device name and an IP address in the input fields 724 and 725 from the user. Responsive to the icon 726 being tapped through the sensitive display 102, the computing device 100 sends a request to the cloud server computer 500 for registration of the input device name and the IP address in association with each other (S2023).

The cloud server computer 500 receives and registers the device name and the IP address as the device information 601 of the user data 600 (S2024).

Tapping on the icon 727 returns the GUI back to the GUI for registration information as illustrated in FIG. 8C.

According to the steps from S2020 to S2024, the computing device 100 and one or more media-playing devices 200 can be registered as the user data 600.

Store Media Assets

After login to the cloud server computer 500, the user can store media assets in association with his/her user ID in the cloud server computer 500.

Figure 12:
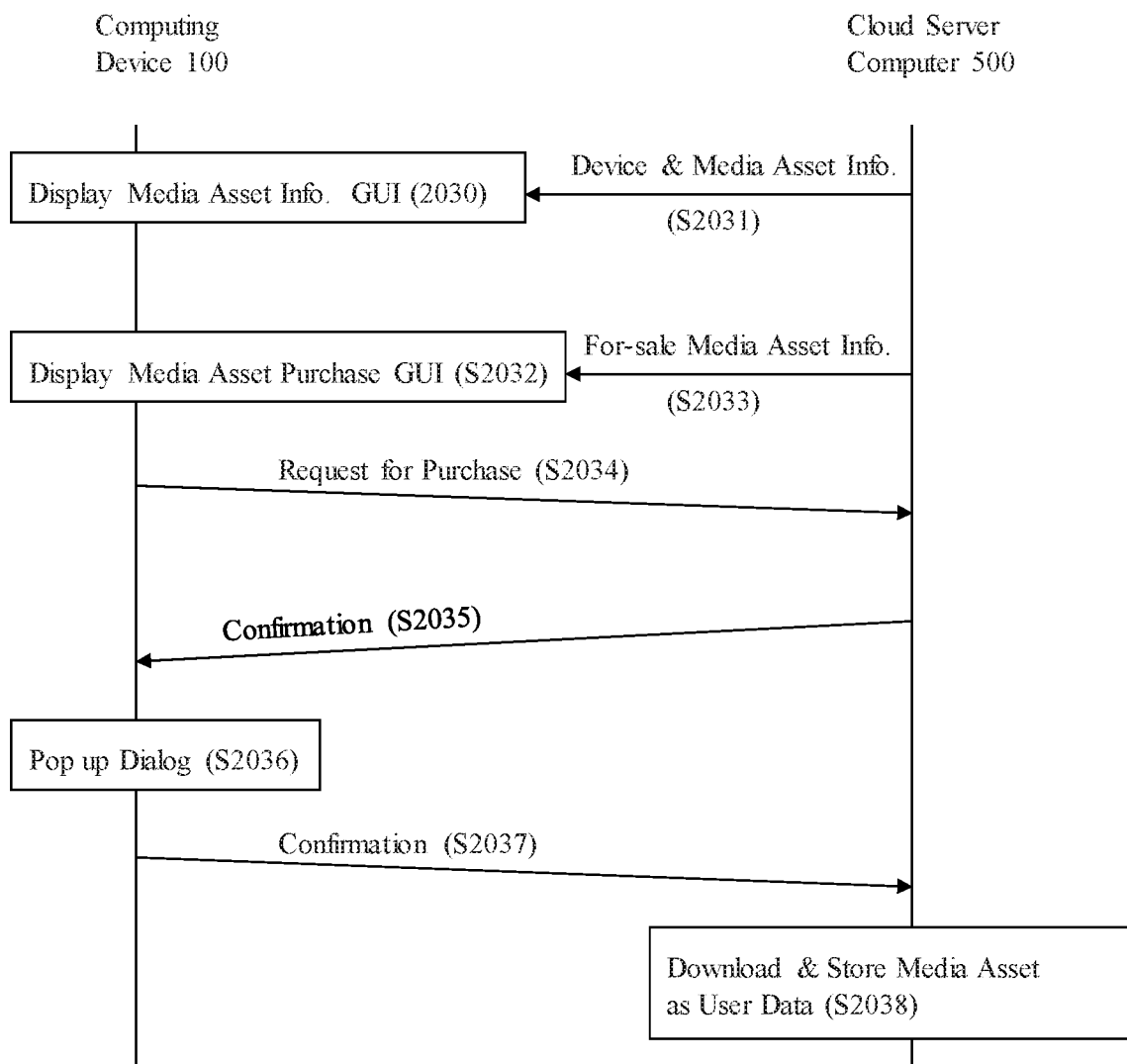
FIG. 12 is a flowchart illustrating operations performed by the computing device and the cloud server computer for download of media assets.

FIG. 12 is a flowchart illustrating purchase and storage of the media assets.

Figure 8E:
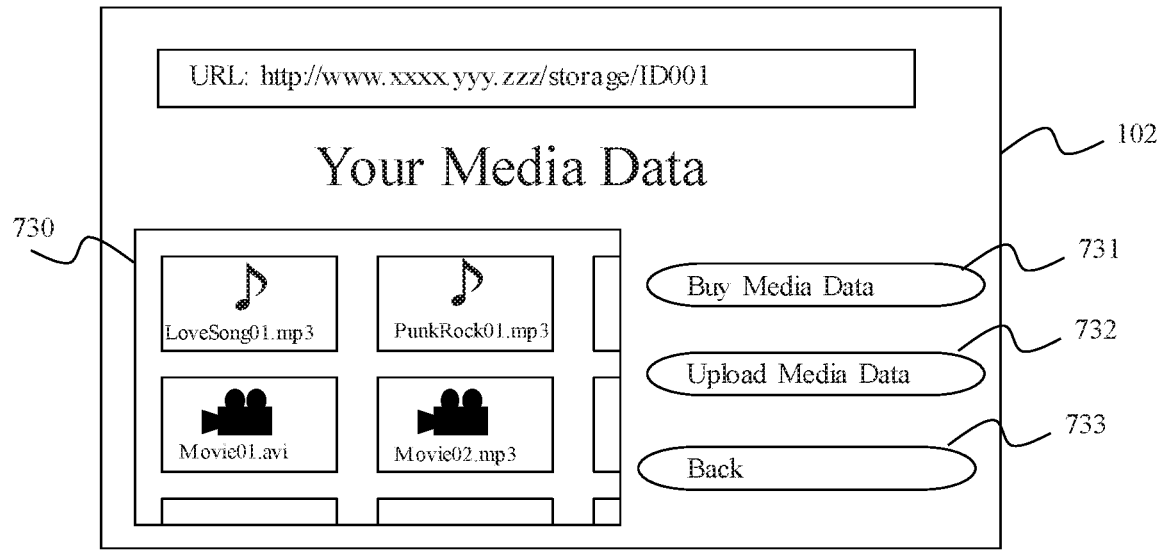

In the GUI for registration information as illustrated in FIG. 8C again, responsive to the icon 721 being tapped, the GUI proceeds to the GUI for media-asset information as illustrated in FIG. 8E (S2030). In the GUI for media-asset information, the cloud server computer 500 sends the device information 601 and information about the stored media assets 602 to the computing device 100 (S2031). Tus, in the GUI for media-asset information, the computing device 100 receives the user data 601 and information about the media assets 602 (S2031). For example, the information may include a name and format of each media asset 602 and/or thumbnails each representing each media asset 602.

The GUI for media-data information contains a list 730 and icons 731, 732, and 733. The list 730 displays the media assets 602, based on the received information, in a tappable form so as for the user to select one of the media assets 602. In the example of FIG. 8E, the list 730 lists the media assets 602 by way of thumbnails representing the media assets 602.

Responsive to the icon 733 being tapped through the sensitive display 102, the GUI returns to the GUI for registration information as illustrated in FIG. 8C.

Figure 8F:
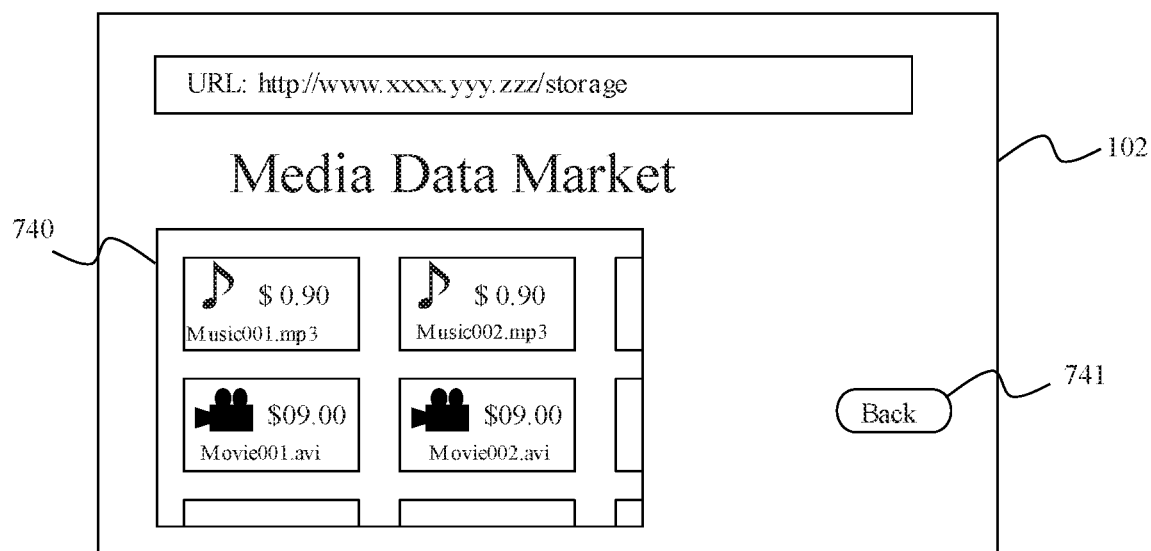

Responsive to the icon 731 being tapped through the sensitive display 102, the GUI proceeds to a GUI for media-asset purchase as illustrated in FIG. 8F (S2032). In the GUI for media-asset purchase, the computing device 100 receives from the cloud server computer 500 information indicative of the for-sale media assets stored in the storage 504 (S2033). For example, the information may include a name, a format, and a price of each for-sale media asset, and/or thumbnails each representing each for-sale media asset.

The GUI for media-asset purchase contains a list 740 and icon 741. In the example of FIG. 8F, the list 740 displays the for-sale media assets by way of thumbnails representing the for-sale media assets.

Responsive to the icon 741 being tapped through the sensitive display 102, the GUI returns to the GUI for media-asset information as illustrated in FIG. 8E.

Figure 8G:
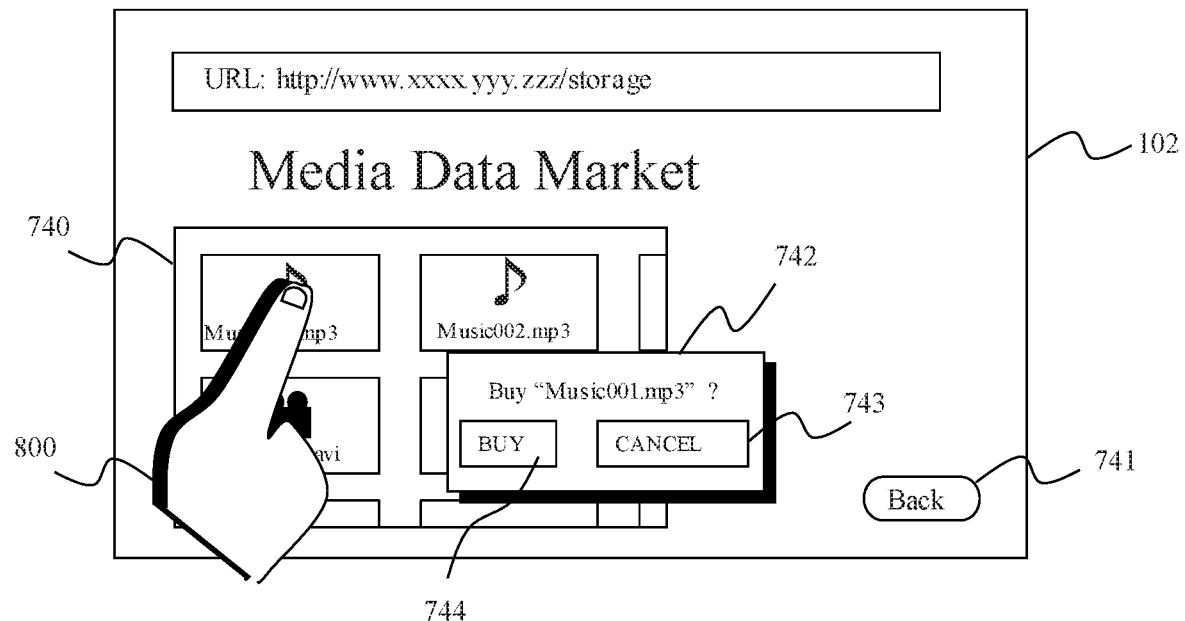

Through the GUI for media-asset purchase, the user can select one of the for-sale media assets listed in the list 740 to purchase and store the selected media asset. For selection, the user can tap a thumbnail corresponding to a for-sale media asset he/she wants to buy through the sensitive display 102. Responsive to a thumbnail being tapped, the computing device 100 sends a request to the cloud server computer 500 for purchase of a for-sale media asset corresponding to the tapped thumbnail (S2034). Responsive to the request, the cloud server computer 500 sends confirmation to the computing device 100 (S2035). Responsive to the confirmation, the computing device 100 pops up a dialog 742 for confirmation in the GUI for media-asset purchase, as illustrated in FIG. 8G (S2036). The dialog 742 contains tappable icons 743 and 744 to confirm whether or not the user really wants to buy the selected for-sale media asset. Responsive to the icon 744 being tapped through the sensitive display 102, the computing device 100 sends to the cloud server computer 500 confirmation to confirm the user's intention to buy the selected for-sale media asset (S2037). Responsive to the confirmation, the cloud server computing device 500 processes a purchase transaction, and downloads the selected for-sale media asset to the user data 600 in the storage 502 (S2038). Specifically, the selected for-sale media asset is downloaded to one of the user data 600 corresponding to the user ID of the purchaser, and stored as the one of the user data 600. For example, if the purchaser is a user who has logged in with a user ID 001, the selected for-sale media asset is stored in a user data 600 of the user ID 001.

Note that because the purchase transaction over network is so familiar and well known to those skilled in the art, the details of how the purchase transaction is made is not described in detail in this specification. A technology of such purchase transaction over network can be seen, for example, in U.S. patent publications Nos. 2011-106665 entitled "Online Purchase of Digital Media Bundles", 2011-60663 entitled "System and Method of Providing Customer Purchase Propensity Information to Online Merchants", 2009-48943 entitled "Internet Based Customer Driven Purchase Method and Apparatus", 2009-83136 entitled "Consolidated Online Purchase Transaction", 2008-71682 entitled "Method and System for Processing Internet Purchase Transactions", 2007-22438 entitled "System and Methods for Performing Online Purchase of Delivery of Service to a Handheld Device", 2006-123052 entitled "Online Purchase of Digital Media Bundles", 2006-89949 entitled "Online Purchase of Digital Media Bundles", 2003-220845 entitled "System and Method for Processing Online Purchase", the contents of which are incorporated herein by reference.

Responsive to the icon 743 being tapped through the sensitive display 102, the computing device 100 does not send the confirmation, and the GUI for media-data purchase remains.

Upload Media Data

Besides purchase of media assets, the user can upload media assets stored locally in the computing device 100 to the cloud server computer 500.

Figure 13:
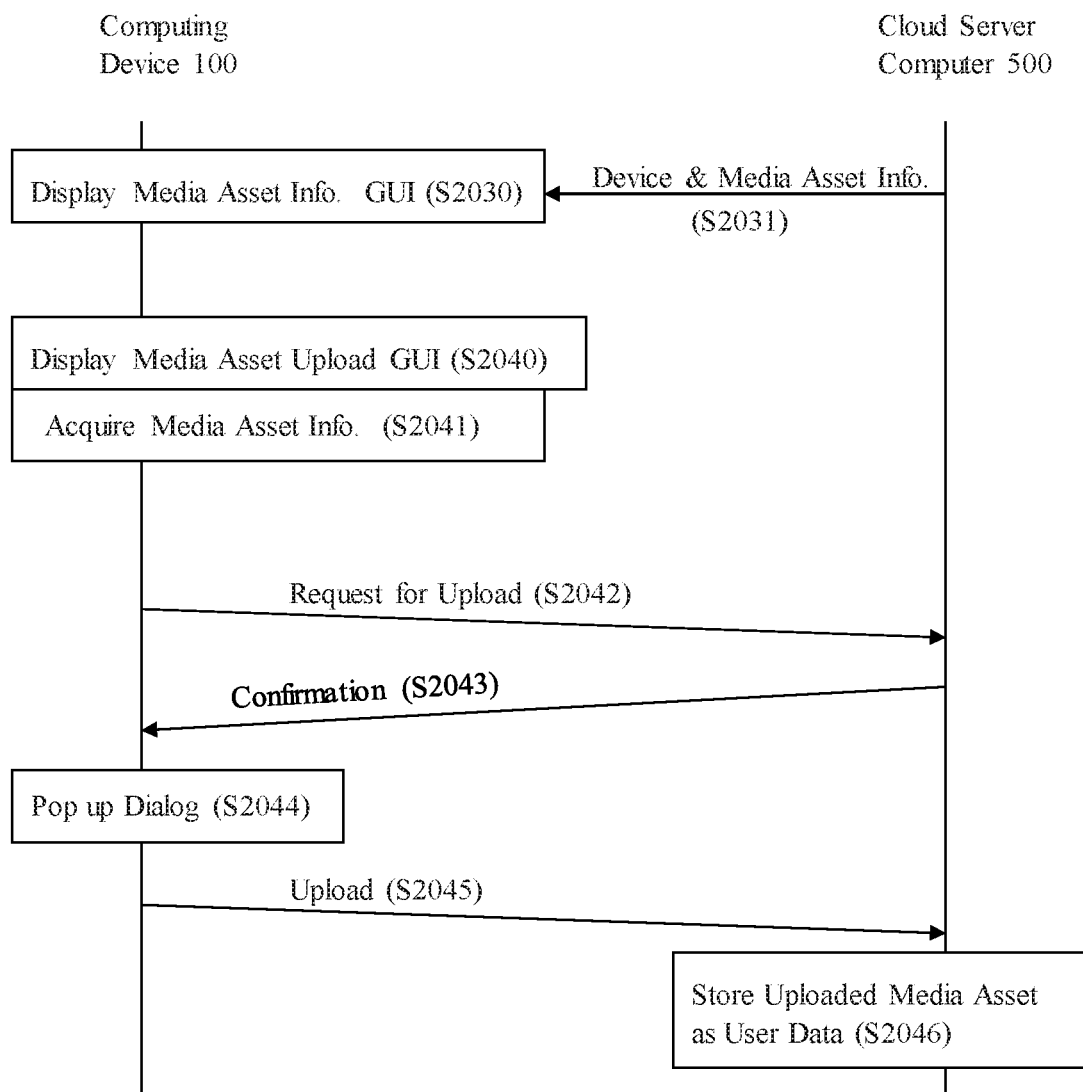
FIG. 13 is a flowchart illustrating operations performed by the computing device and the cloud server computer for upload of media assets.

FIG. 13 is a flowchart illustrating upload and storage of the media assets.

Figure 8H:
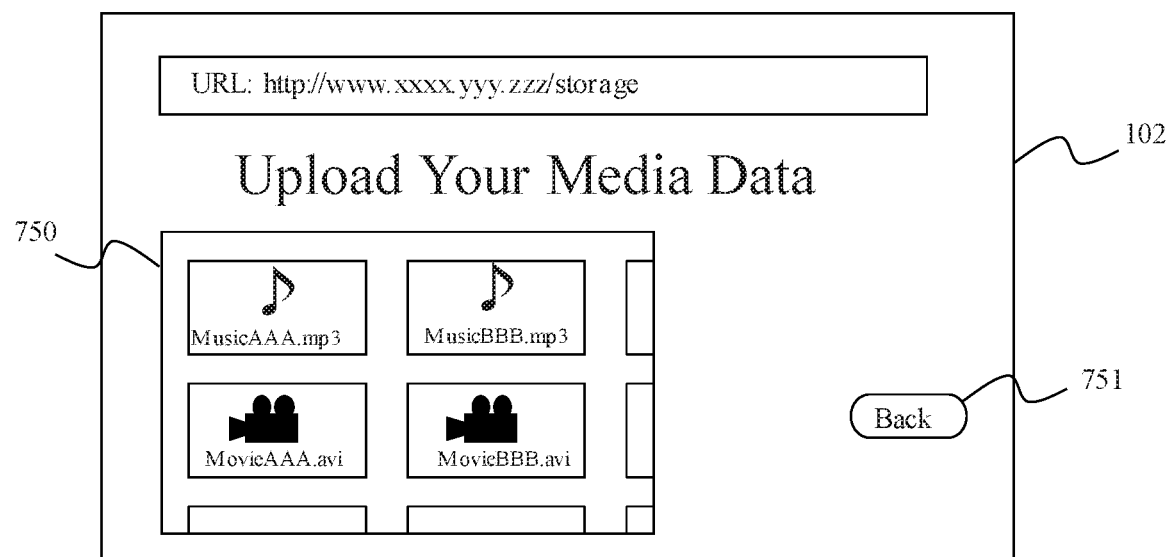

Back in the GUI for media-asset information as illustrated in FIG. 8E again (S2030, S2031), responsive to the icon 732 being tapped through the sensitive display 102, the GUI proceeds to a GUI for media-asset upload as illustrated in FIG. 8H (S2040). In the GUI for media-asset upload, the computing device 100 acquires information indicative of media assets stored locally in the memory 104 (S2041) if one or more media assets are stored locally in the memory 104. For example, the information may include a name and a format of each media asset, and/or thumbnails each representing each media asset.

The GUI for media-asset upload contains a list 750 and icon 751. In the example of FIG. 8H, the list 750 displays the media assets by way of thumbnails representing the media assets.

Responsive to the icon 751 being tapped through the sensitive display 102, the GUI returns to the GUI for media-asset information as illustrated in FIG. 8E.

Figure 8I:
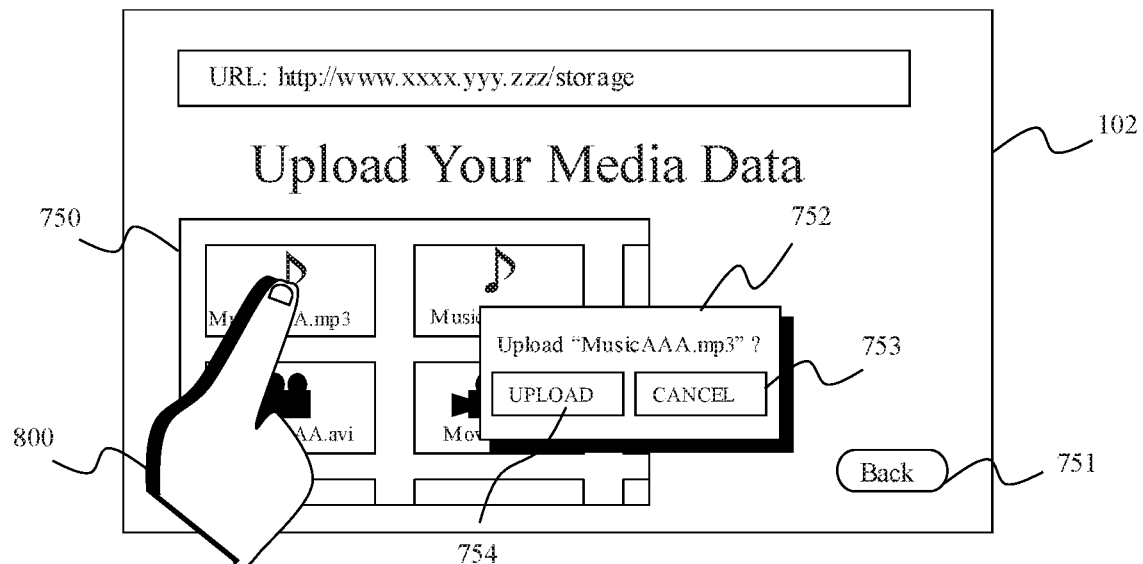

Through the GUI for media-asset upload, the user can select one of the media assets listed in the list 750 to upload the selected media asset. For selection, the user can tap a thumbnail corresponding to a media asset he/she wants to upload through the sensitive display 102. Responsive to a thumbnail being tapped, the computing device 100 sends a request to the cloud server computer 500 for upload of a media asset corresponding to the tapped thumbnail (S2042). Responsive to the request, the cloud server computer 500 sends confirmation to the computing device 100 (S2043) Responsive to the confirmation, the computing device 100 pops up a dialog 752 for confirmation in the GUI for media-asset upload, as illustrated in FIG. 8I (S2044). The dialog 752 contains tappable icons 753 and 754 to confirm whether or not the user really wants to upload the selected media asset. Responsive to the icon 754 being tapped through the sensitive display 102, the computing device 100 starts uploading the selected media asset to the cloud server computer 500 (S2045). Responsive to the uploading, the cloud server computing device 500 stores the uploaded media assets in the storage 502 (S2046). Specifically, the media asset is uploaded and stored in one of the user data 600 corresponding to the user ID of the user (uploader). For example, if the uploader is a user who has logged in with a user ID 001, the selected media asset is stored in a user data 600 of the user ID 001.

Responsive to the icon 753 being tapped through the sensitive display 102, the computing device 100 does not start the uploading, and the GUI for media-asset upload remains.

Streaming of Media Asset

If the user has one or more media assets stored as the user data 600 of his/her user ID in the cloud server computer 500, the user can enjoy the media assets through streaming. The cloud server computer 500, in connection with the computing device 100, performs streaming of a media asset in accordance with at least one or combination of the following aspects of streaming.

First Aspect of Streaming

Figure 14:
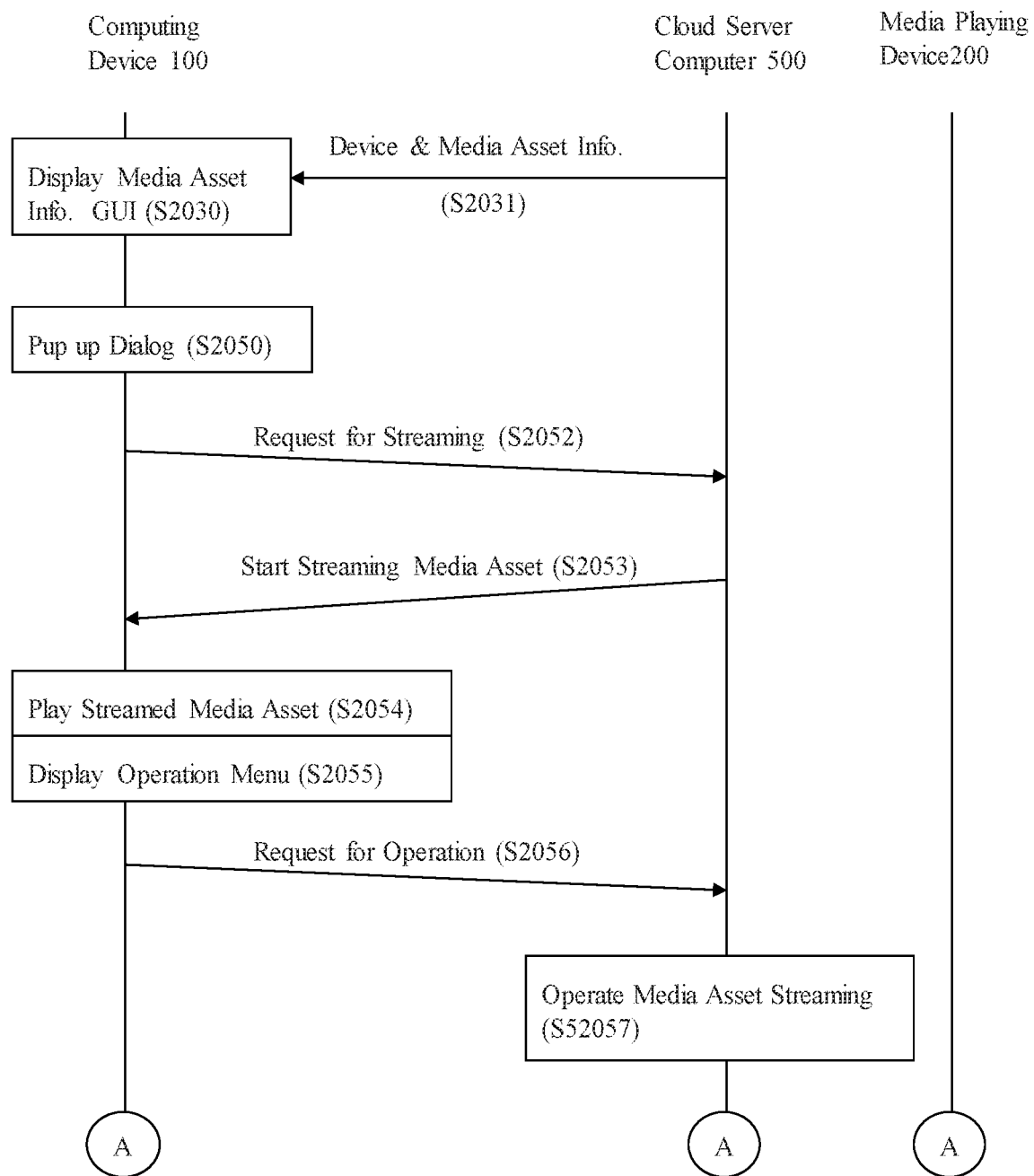
FIG. 14 is a flowchart illustrating operations performed by the computing device and the cloud server computer for media asset streaming according to a first aspect of streaming.
Figure 15:
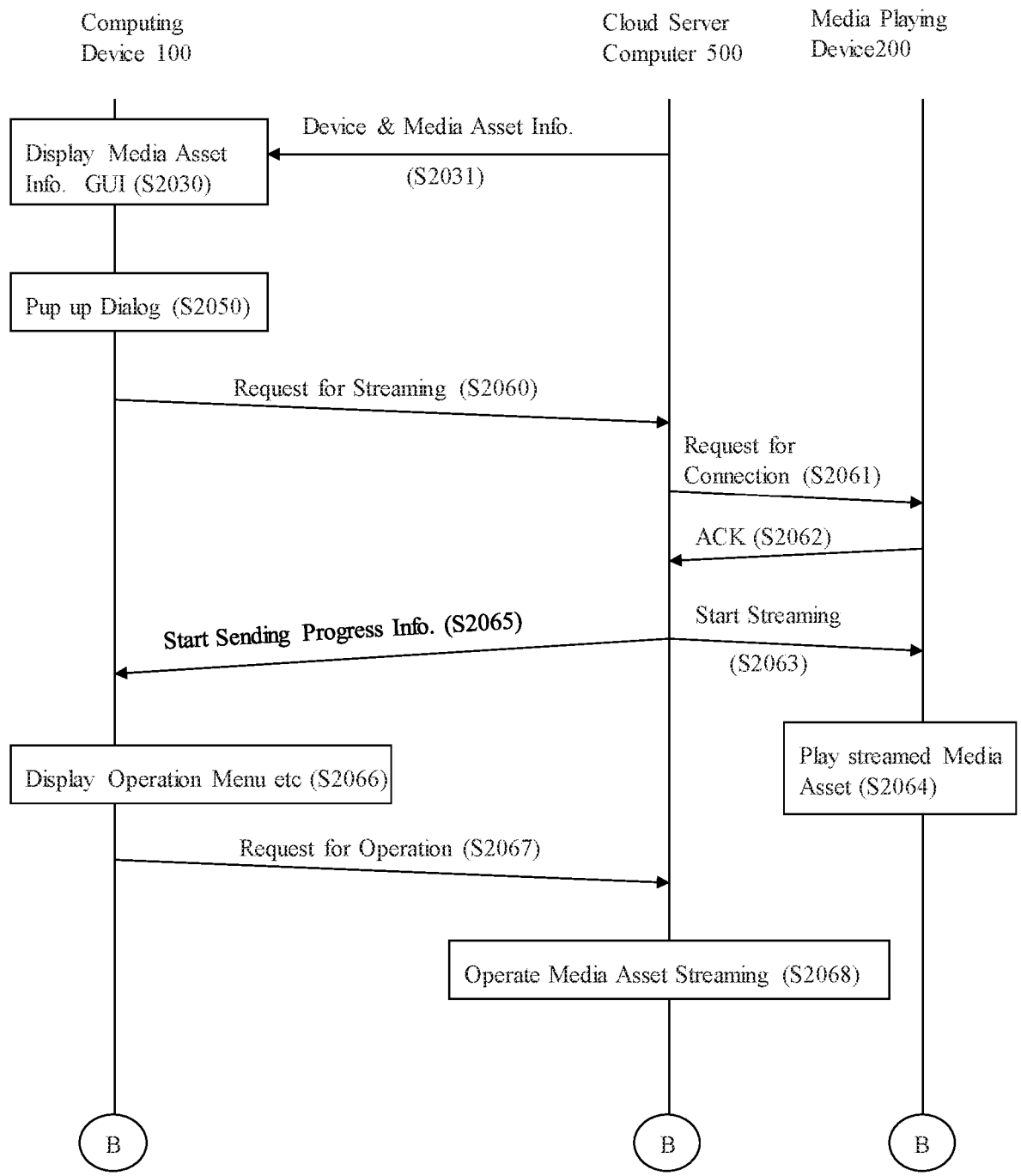
FIG. 15 is a flowchart illustrating operations performed by the computing device, the media-playing device, and the cloud server computer for media asset streaming according to the first aspect of streaming.

FIGS. 14 and 15 are flowcharts illustrating a first aspect of streaming of the media assets.

Back in the GUI for media-asset information as illustrated in FIG. 8E again (S2030, S2031), the list 730 displays media assets 602 stored as the user data 600 of the user, based on the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Figure 8J:
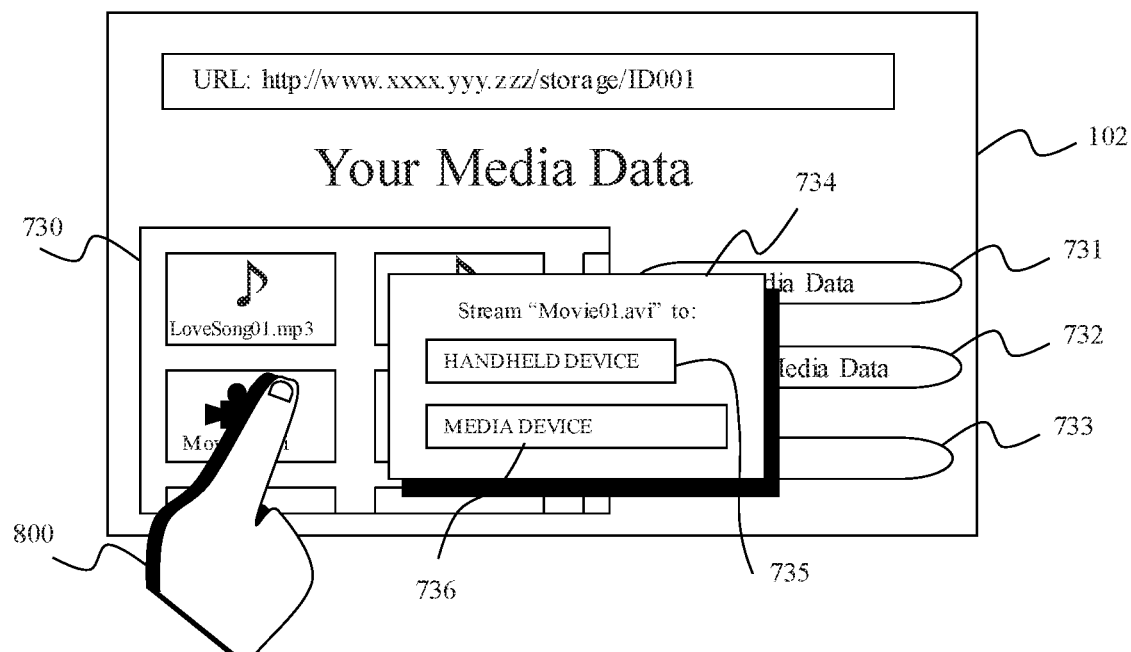

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 refers to the device information 601 received at S2031, and pops up a dialog 734 for confirming the destination of streaming as illustrated in FIG. 8I (S2050). The dialog 734 contains icons representing devices listed in the received device information 601. In the example of FIG. 8J, the dialog 734 contains a tappable icon 735 to select the computing device 100 labeled "Handheld Device" and a tappable icon 736 to select the media-playing device 200 labeled "Media Device", with reference to the device information 601 of the user ID 001.

Responsive to the icon 735 being tapped through the sensitive display 102, the computing device 100 sends a request to the cloud server 500 for streaming of a selected media asset to the computing device 100 (S2052). The request may include information indicative of the selected media asset and information indicative of selection of the computing device 100. Responsive to the request from the computing device 100, the cloud server computer 500 starts streaming the selected media asset to the computing device 100 (S2053). Specifically, the cloud server computer 500 starts streaming the selected media asset by directing the streaming to the IP address of the computing device 100 (aaa.bbb.ccc) with reference to the user data 601. In S2053, upon starting the streaming, the cloud server computer 500 does not need to newly establish connection with the computing device 100 because the computing device 100 is not only the destination of the streaming but also the requester of the streaming and thus connection between the cloud server computer 500 and the computing device 100 has been kept established since the cloud server computer 500 accepted login from the computing device 100. If the selected media asset concerns encoded video or audio data, the streaming may be made by directly sending the encoded video or audio data to the computing device 100, or by decoding the encoded video or audio data to send the decoded data to the computing device 100. If the selected media asset concerns a video game program, the streaming may be made by executing the video game program to send rendered video game graphics and played video game sound to the computing device 100.

Figure 27:
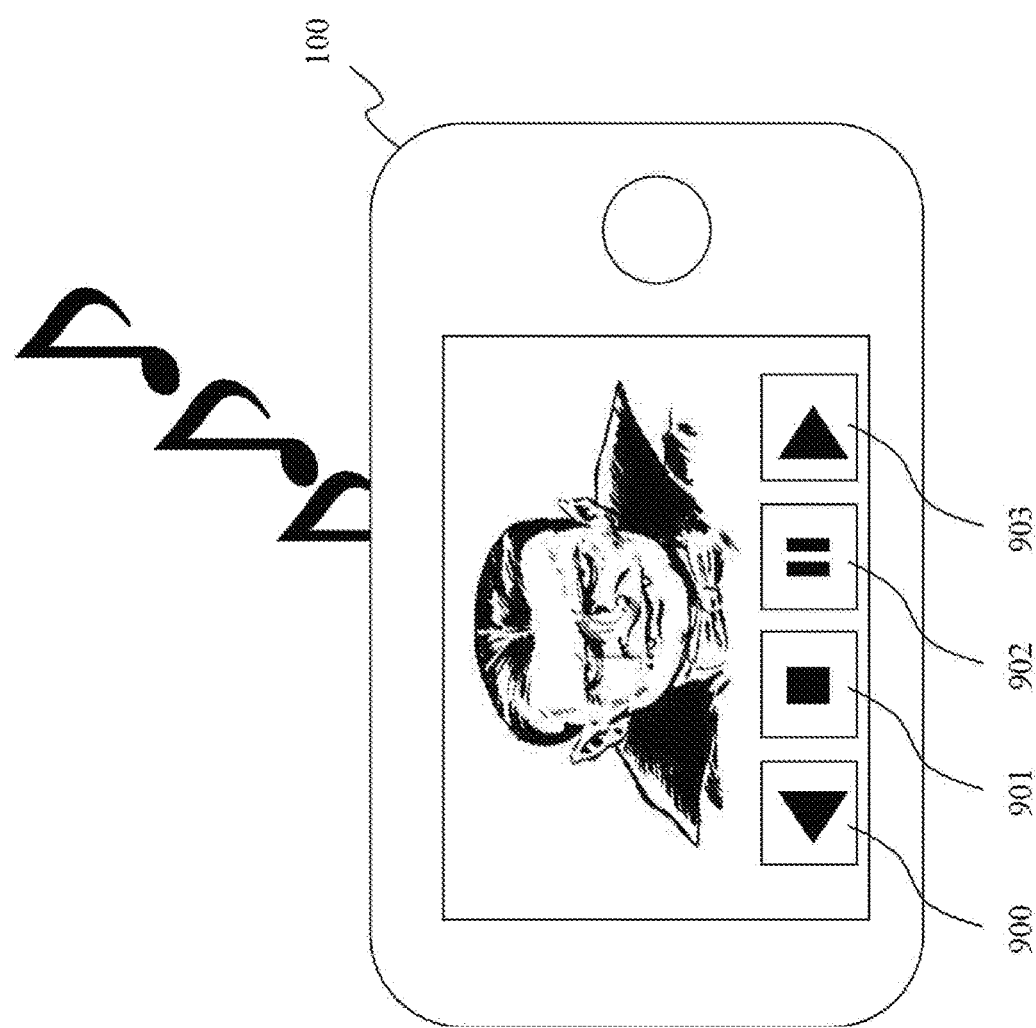
FIG. 27 illustrates how a streamed media asset is played and output at the computing device according to the first aspect of streaming.

While the media asset is being streamed, the computing device 100 plays the media asset (S2054). Specifically, resultant audio generated as a result of the media asset being played is outputted through the loudspeaker 105, and/or resultant graphics and video generated as a result of the media asset being played is displayed on the sensitive display 102 as illustrated in FIG. 27. In addition to playing the media asset, the computer 100 also generates a graphical menu for operation of the ongoing streaming of the media asset, and displays the graphical menu on the sensitive display 102 (S2055). For example, the graphical menu consisting of the tappable icons 900 to 903 is displayed on the sensitive display 102 as illustrated in FIG. 27. As illustrated in FIG. 27, the graphical menu is displayed along with the video displayed on the sensitive display 102. The icons 900 to 903 are icons for operation of the ongoing streaming of the media asset. Responsive to one of the icons 900 to 903 being tapped through the sensitive display 102, the computing device 100 sends a request to the cloud server computer 500 for operation of the ongoing streaming of the media asset (S2056). For example, responsive to the icon 900 being tapped, the computing device 100 requests the cloud server computer 500 to rewind the ongoing streaming of the media asset. For example, responsive to the icon 901 being tapped, the computing device 100 requests the cloud server computer 500 to stop the ongoing streaming of the media asset. For example, responsive to the icon 902 being tapped, the computing device 100 requests the cloud server computer 500 to pause the ongoing streaming of the media asset. For example, responsive to the icon 903 being tapped, the computing device 100 requests the cloud server computer 500 to fast-forward the ongoing streaming of the media asset. Responsive to the request for operation from the computing device 100, the cloud server computer 500 operates the streaming of the ongoing media asset, namely, rewinds, stops, pauses, or fast-forwards the ongoing streaming of the media asset (S2057).

Back in S2050, through the dialog 734, responsive to the icon 736 being tapped, the computing device 100 sends a request to the cloud server 500 for streaming of the selected media asset to the media-playing device 200 corresponding to the icon 736 (S2060). The request may include information indicative of the selected media asset and indicative of the selection of the media-playing device 200. Responsive to the request from the computing device 100, the cloud server computer 500 sends a request to the selected media-playing device 200 for connection between the cloud server computer 500 and the selected media-playing device 200 (S2061). Responsive to establishment of the connection between the cloud server computer 500 and the selected media-playing device 200 (S2062), the cloud server computer 500 starts streaming the selected media asset to the selected media-playing device 200 (S2063). Specifically, the cloud server computer 500 starts streaming the selected media asset by directing the streaming to the IP address of the selected media-playing device 200 (ddd.eee.fff) with reference to the user data 600. If the selected media asset concerns encoded video or audio data, the streaming may be made by directly sending the encoded video or audio data to the media-playing device 200, or by decoding the encoded video or audio data to send the decoded data to the media-playing device 200. If the selected media asset concerns a video game program, the streaming may be made by executing the video game program to send rendered video game graphics and played video game sound to the media-playing device 200.

While the media asset is being streamed, the media-playing device 200 plays the media asset (S2064). Specifically, resultant audio and/or video generated as a result of the media asset being played is outputted through the output unit 303. For example, if the streamed media asset involves encoded audio or video, the streamed media asset is decoded by the processor 301 so that the decoded video or audio is outputted by the output unit 303. For example, if the streamed media asset involves non-encoded audio or video, the streamed media asset is just outputted by the output unit 303.

Upon starting the streaming at S2063, the cloud server computer 500 sends to the computing device 100 notification that the streaming has been started, and starts sending to the computing device 100 progress information indicative of progress of the streaming (S2065). The notification may contain information indicative of the streamed media asset such as the name of the streamed media asset, the format of the streamed media asset, the duration of the streamed media asset, and the likes. The progress information may indicate how far the media asset has been streamed within the duration of the media asset. The cloud server computer 500 intermittently sends the progress information based on the progress of the streaming after S2065 as long as the streaming is in progress.

Figure 28:
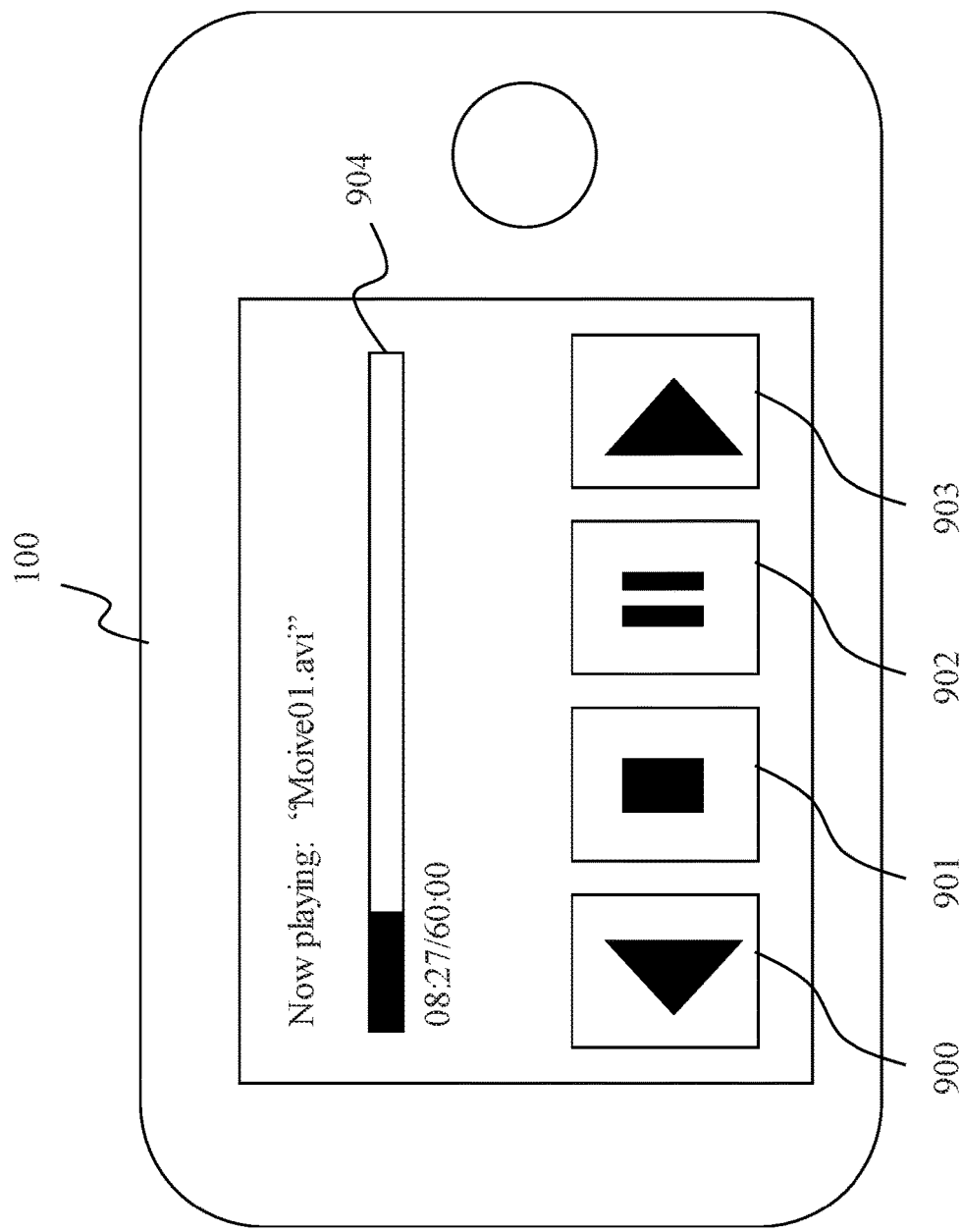
FIG. 28 illustrates how progress information is displayed at the computing device according to the first through tenth aspects of streaming.

Responsive to the notification and the progress information, the computing device 100 starts displaying on the sensitive display 102 information indicative of the streamed media asset and a graphical menu based on the notification and the progress information (S2066). For example, as illustrated in FIG. 28, the sensitive display 102 displays the name of the streamed media asset, a progress bar 904 indicative of how far the media asset has been played within the duration of the played media asset, and a graphical menu consisting of the icons 900 to 903 for operation of the streaming. In the example of FIG. 28, the sensitive display 102 is showing that the media asset with the name of "Movie01.avi" has been played for eight minutes and twenty-seven seconds after the start of the streaming within the duration of sixty minutes. The icons 900 to 903 are icons for operation of streaming of the media asset. Responsive to one of the icons 900 to 903 being tapped through the sensitive display 102, the computing device 100 sends a request to the cloud server computer 500 for operation of the ongoing streaming of the media asset (S2067). For example, responsive to the icon 900 being tapped, the computing device 100 requests the cloud server computer 500 to rewind the ongoing streaming of the media asset. For example, responsive to the icon 901 being tapped, the computing device 100 requests the cloud server computer 500 to stop the ongoing streaming of the media asset. For example, Responsive to the icon 902 being tapped, the computing device 100 requests the cloud server computer 500 to pause the ongoing streaming of the media asset. For example, responsive to the icon 903 being tapped, the computing device 100 requests the cloud server computer 500 to fast-forward the ongoing streaming of the media asset. Responsive to request for operation from the computing device 100, the cloud server computer 500 operates the streaming of the ongoing media asset, namely, rewinds, stops, pauses, or fast-forwards the ongoing streaming of the media asset (S2068).

Second Aspect of Streaming

It is assumable that a media-playing device 200 may be far away from the computing device 100. Such case may occur, for example, when the media-playing device 200 is installed at a living room of a user's house, but the user is outside the house with the computing device 100 put in his/her pocket. In such situation, streaming should not be directed to the media-playing device 200 responsive to a request from the computing device 100 because the user could not watch the streamed media.

Therefore, in a second aspect of streaming, the computing device 100 lets the user choose the media-playing device 200 only when the media-playing device 200 is near the computing device 100.

Figure 16:
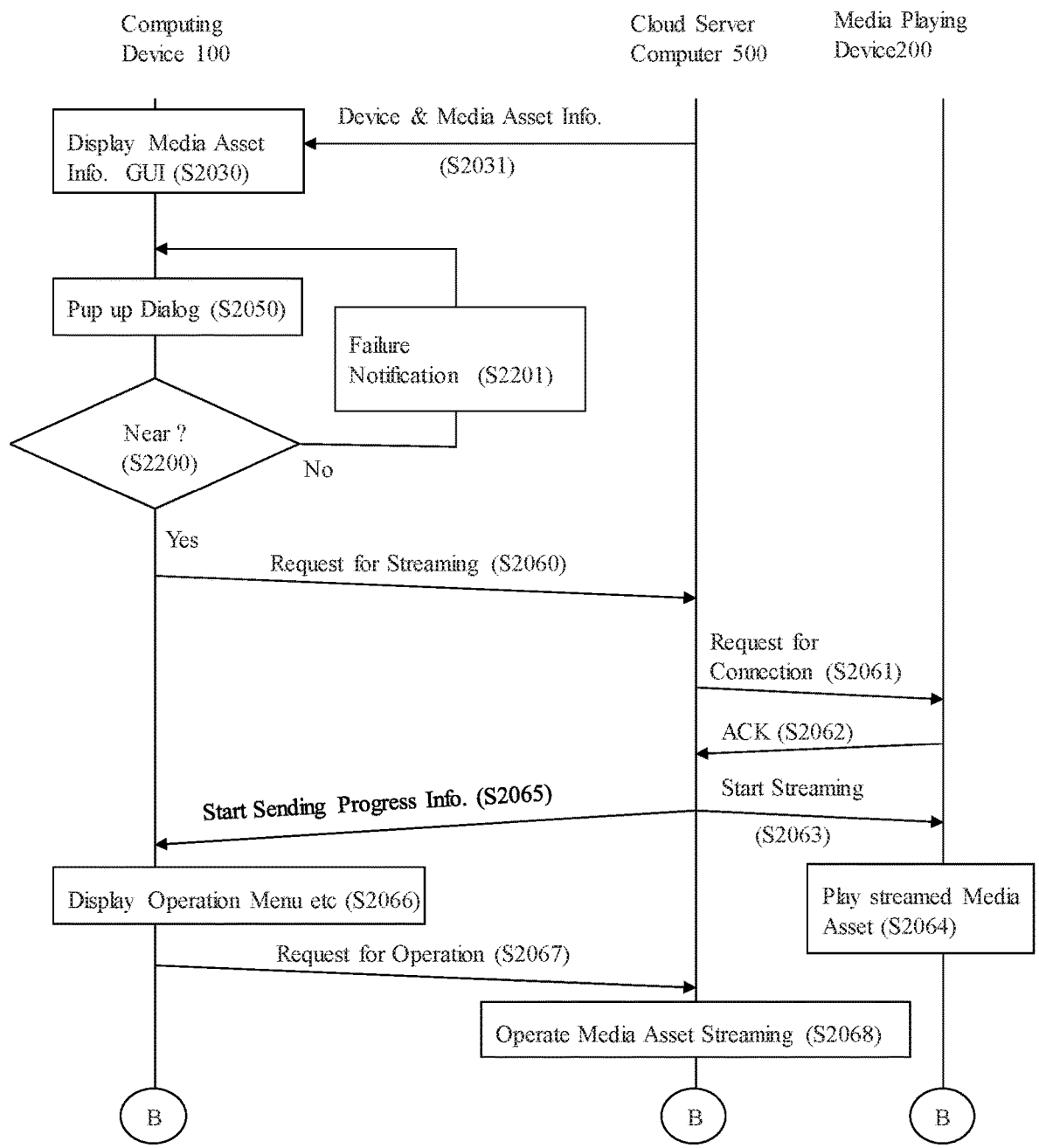
FIG. 16 is a flowchart illustrating operations performed by the computing device, the media-playing device, and the cloud server computer for media asset streaming according to a second aspect of streaming.

FIG. 16 is a flowchart illustrating the second aspect of streaming of media assets. Some steps in the second aspect may be common to those in the first aspect. The common reference numbers may be used to refer to the common steps between the first and the second aspects.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 refers to the device information 601 received at S2031, and pops up a dialog 734 for confirming the destination of streaming as illustrated in FIG. 8J (S2050). The dialog 734 contains icons representing devices listed in the received device information 601. In the example of FIG. 8J, the dialog 734 contains a tappable icon 735 to select the computing device 100 labeled "Handheld Device" and a tappable icon 736 to select the media-playing device 200 labeled "Media Device", with reference to the device information 601 of the user ID 001.

Responsive to the icon 736 being tapped, the computing device 100 activates the close-range communication circuitry 106 and communicates with the media-playing device 200 to determine whether or not the media-playing device 200 is near the computing device 100 (S2200). The determination can be made, for example, by sending a predetermined polling signal from the close-range communication circuitry 106 to the close-range communication circuitry 304 and determining whether or not the close-range communication circuitry 106 receives a reply signal from the close-range communication circuitry 304 in reply to the polling signal. If the reply signal is successfully received through the close-range communication circuitry 106 within a predetermined period after the polling signal, the close-range communication circuitry 106 and 304 can communicate with each other, which means that the media-playing device 200 is near the computing device 100. If the reply signal is not received through the close-range communication circuitry 106 within the predetermined period after the polling signal, the close-range communication circuitry 106 and 304 cannot communicate with each other, which means that the media-playing device 200 is not near the computing device 100.

If the media-playing device 200 is determined to be near the computing device 100 (S2200: Yes), the computing device 100 sends a request to the cloud server 500 for streaming of the selected media asset to the media-playing device 200 corresponding to the icon 736 (S2060).

Figure 31:
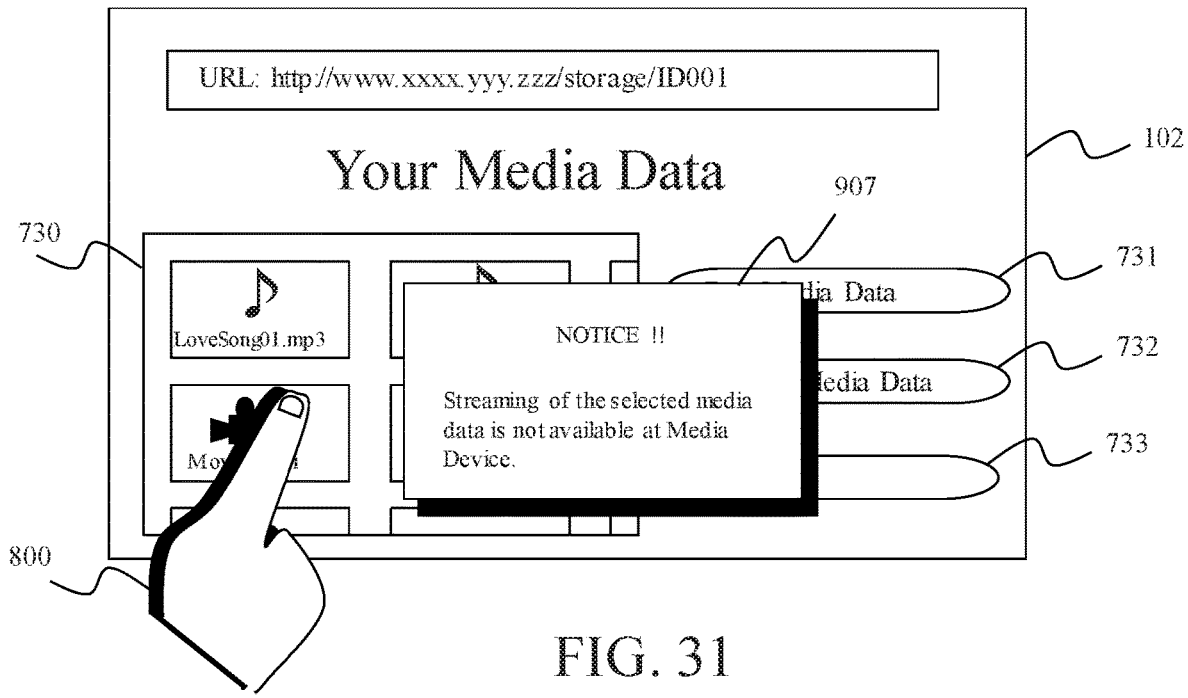
FIG. 31 illustrates how a dialog is displayed for notifying the user of unavailability of streaming at the computing device.

If the media-playing device 200 is determined to be not near the computing device 100 (S2200: No), the computing device 100 does not send the request but displays, on the sensitive display 102, a dialog 907, as illustrated in FIG. 31, for notifying the user that the media-playing device 200 is far from the user and thus streaming to the media-playing device 200 is unavailable (S2201).

After S2060, upon establishment of connection between the cloud server computer 500 and the media-playing device 200 (S2061, S2062), the cloud server computer 500 starts streaming the selected media asset to the media playing device 200 (S2063), and starts sending the progress information to the computing device 100 (S2065).

Third Aspect of Streaming

It is assumable that a media-playing device 200 may be far away from the computing device 100. Such case may occur, for example, when the media-playing device 200 is installed at a living room of a user's house, but the user is outside the house with the computing device 100 put in his/her pocket. In such situation, streaming should not be directed to the media-playing device 200 responsive to a request from the computing device 100 because the user could not watch the streamed media.

Therefore, in a third aspect of streaming, the cloud server computer 500 lets the user choose the media-playing device 200 only when the media-playing device 200 is near the computing device 100.

Figure 17:
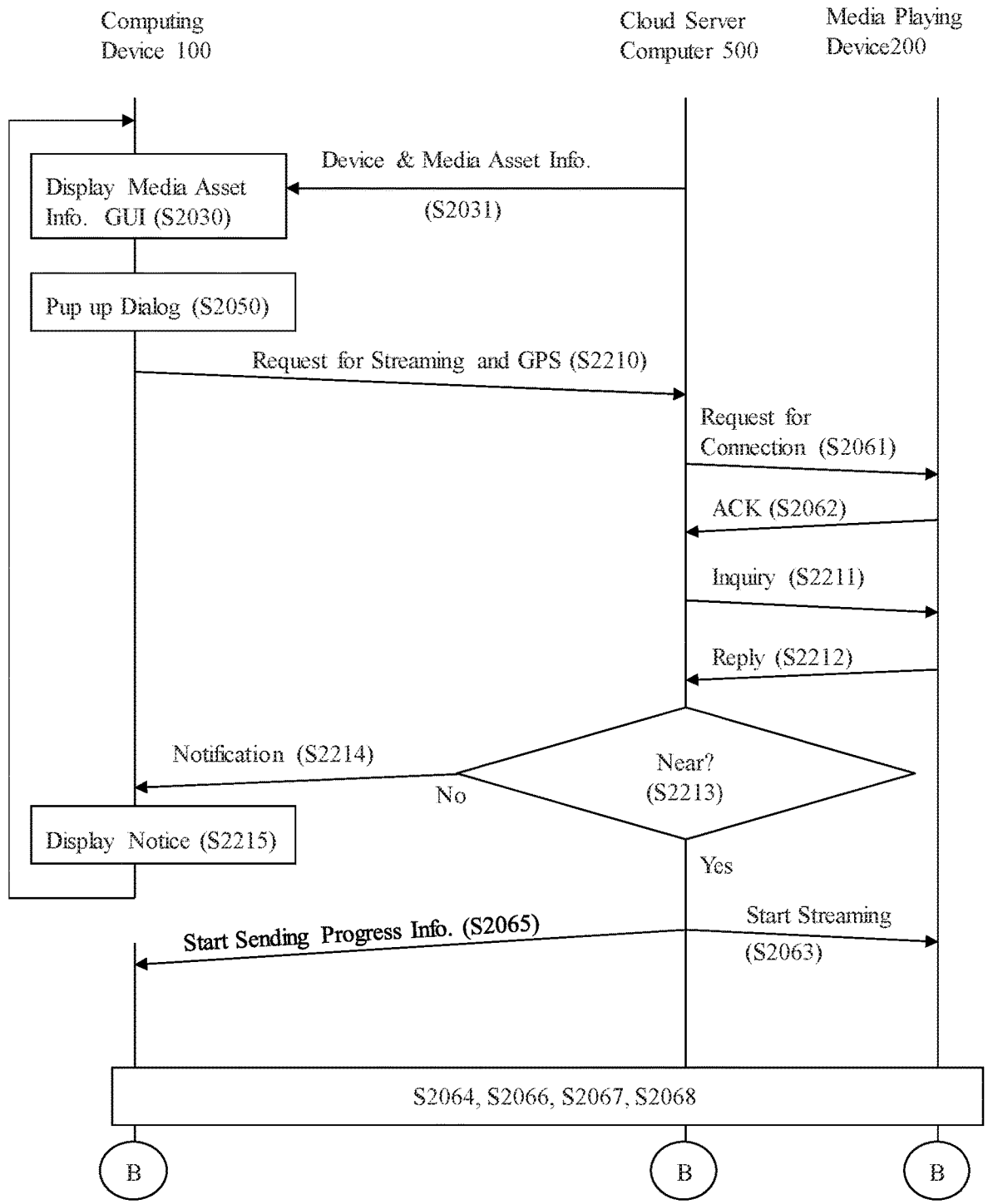
FIG. 17 is a flowchart illustrating operations performed by the computing device, the media-playing device, and the cloud server computer for media asset streaming according to a third aspect of streaming.

FIG. 17 is a flowchart illustrating the third aspect of streaming of media assets. Some steps in the third aspect may be common to those in the first aspect. The common reference numbers may be used to refer to the common steps between the first and the third aspects.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 refers to the device information 601 received at S2031, and pops up a dialog 734 for confirming the destination of streaming as illustrated in FIG. 8J (S2050). The dialog 734 contains icons representing devices listed in the received device information 601. In the example of FIG. 8J, the dialog 734 contains a tappable icon 735 to select the computing device 100 labeled "Handheld Device" and a tappable icon 736 to select the media-playing device 200 labeled "Media Device", with reference to the device information 601 of the user ID 001.

Responsive to the icon 736 being tapped, the computing device 100 acquires location information indicative of the location of the computing device 100 from the GPS circuitry 107, and sends the location information along with a request for streaming of the selected media asset to the media-playing device 200 corresponding to the icon 736, to the cloud server computer 500 (S2210).

Responsive to the location information and the request for streaming from the computing device 100, the cloud server computer 500 requests the media-playing device 200 for connection (S2061). Upon establishment of connection (S2062), the cloud server computer 500 sends to the media-playing device 200 an inquiry about the location of the media-playing device 200 (S2211).

Responsive to the inquiry, the media-playing device 200 acquires location information indicative of the location of the media-playing device 200 from the GPS circuitry 307, and sends the location information to the cloud server computer 500 (S2212).

Responsive to the location information from the media-playing device 200, the cloud server computer 500 determines whether or not the media-playing device 200 is near the computing device 100 by comparing the location information received from the computing device 100 and the media-playing device 200 (S2213). The determination may be made, for example, by determining whether or not the difference from the location indicated by the location information received by the media-playing device 200 and that indicated by the location information received by the computing device 100 is within a predetermined difference.

If the media-playing device 200 is determined to be near the computing device 100 (S2213: Yes), the cloud server computer 500 starts streaming the selected media asset to the media-playing device 200 (S2063), and starts sending the progress information to the computing device 100 (S2065).

On the other hand, if the media-playing device 200 is determined to be not near the computing device 100 (S2213: No), the cloud server computer 500 sends to the computing device 100 a notification indicating that the media-playing device 200 is far from the user and thus streaming to the media-playing device 200 is unavailable (S2214). Responsive to the notification, the computing device 100 displays, on the sensitive display 102, a dialog 907, as illustrated in FIG. 31, for notifying the user of the unavailability of streaming to the media-playing device 200 (S2215). After S2215, the GUI for media-asset information remains (S2030).

Fourth Aspect of Streaming

It is assumable that a media-playing device 200 selected as the destination of the streaming may be able to play only media asset generated pursuant to some specific format because the processor 301 has only a codec pursuant to the specific format. For example, the media-playing device 200 might be able to play only one of audio and visual media asset because the processor 301 has no codec for playing the other. In such situation, streaming would be unavailable at the selected media-playing device 200 if the cloud server computer 500 started streaming media asset unavailable to the selected media-playing device 200.

Therefore, in a fourth aspect of streaming, the cloud server computer 500 determines availability of streaming.

Figure 18:
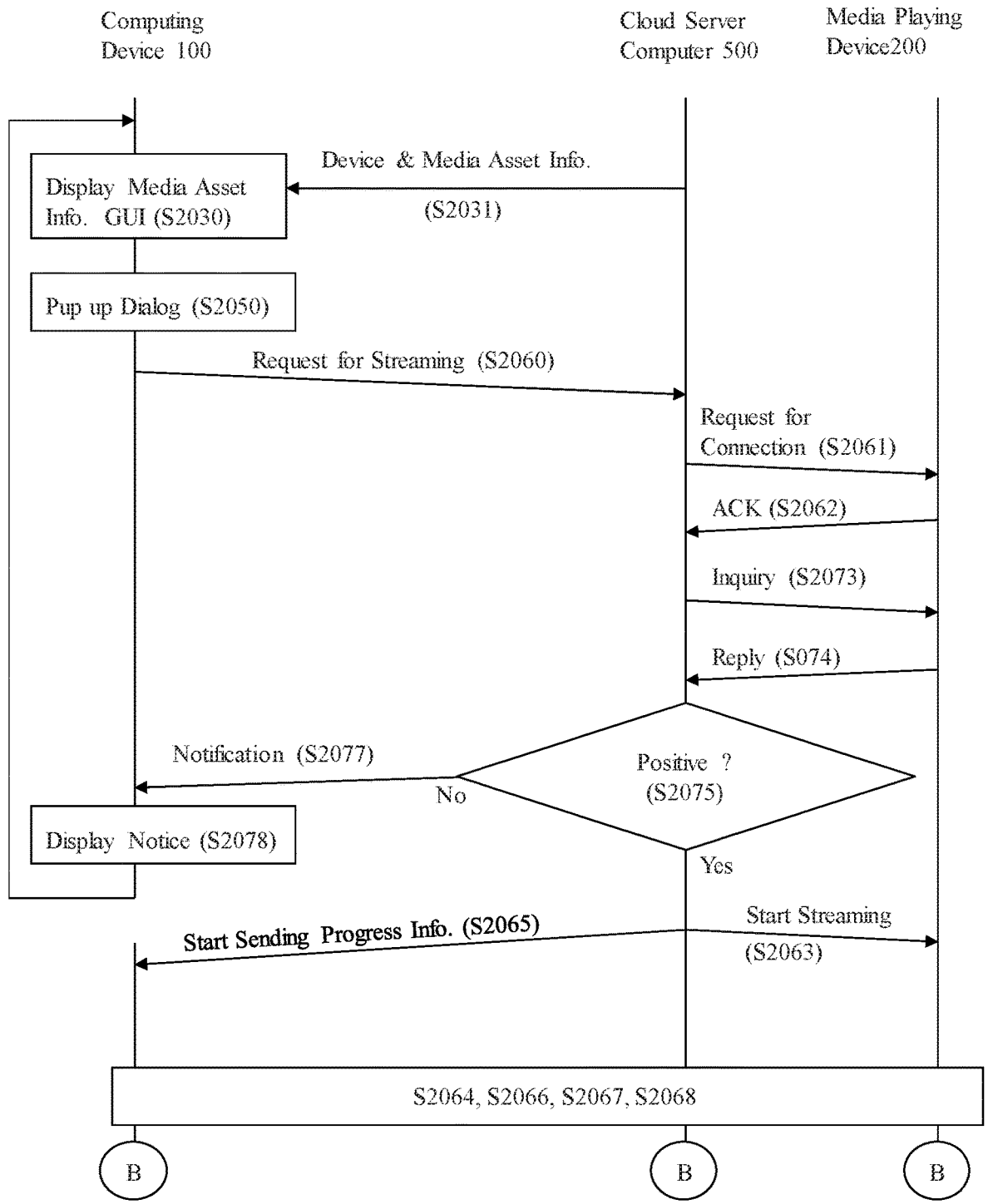
FIG. 18 is a flowchart illustrating operations performed by the computing device, the media-playing device, and the cloud server computer for media asset streaming according to a fourth aspect of streaming.

FIG. 18 is a flowchart illustrating the fourth aspect of streaming of media assets. Some steps in the fourth aspect may be common to those in the first aspect. The common reference numbers may be used to refer to the common steps between the first and the fourth aspects.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 refers to the device information 601 received at S2031, and pops up a dialog 734 for confirming the destination of streaming as illustrated in FIG. 8J (S2050). The dialog 734 contains icons representing devices listed in the received device information 601. In the example of FIG. 8J, the dialog 734 contains a tappable icon 735 to select the computing device 100 labeled "Handheld Device" and a tappable icon 736 to select the media-playing device 200 labeled "Media Device", with reference to the device information 601 of the user ID 001.

Responsive to the icon 736 being tapped, the computing device 100 sends a request to the cloud server 500 for streaming of the selected media asset to the media-playing device 200 corresponding to the icon 736 (S2060). Responsive to the request from the computing device 100, the cloud server computer 500 sends a request to the media-playing device 200 for connection between the cloud server computer 500 and the media-playing device 200 (S2061). Upon establishment of the connection between the cloud server computer 500 and the media-playing device 200 (S2062), the cloud server computer 500 sends to the media-playing device 200 an inquiry whether or not the media-playing device 200 is able to play the selected media asset (S2073) before starting streaming.

For example, the cloud server computer 500 may inquire the media-playing device 200 whether or not the format of the selected media asset is available at the media-playing device 200. The cloud server computer 500 then receives a reply from the media-playing device 200 (S2074).

Responsive to a positive reply indicating that the media-playing device 200 is able to play the selected media asset (S2075: Yes), the cloud server computer 500 starts streaming the selected media asset to the media-playing device 200 (S2063), and starts sending the progress information to the computing device 100 (S2065).

On the other hand, responsive to a negative reply indicating that the media-playing device 200 is not able to play the selected media asset (S2075: No), the cloud server computer 50) sends to the computing device 200 a notification indicating that the streaming to the selected media-playing device 200 is unavailable (S2077).

Responsive to the notification, the computing device 100 displays on the sensitive display 102 a dialog 907 for notifying the user of unavailability of streaming over the GUI for media-asset information, as illustrated in FIG. 31 (S2078). After S2078, the GUI for media-asset information remains (S2030).

Fifth Aspect of Streaming

It is assumable that a media-playing device 200 selected as the destination of the streaming may be able to play only media asset generated pursuant to some specific format because the processor 301 has only a codec pursuant to the specific format. For example, the selected media-playing device 200 might be able to play only one of audio and visual media asset because the processor 301 has no codec for playing the other. Streaming would be unavailable at the selected media-playing device 200 if the cloud server computer 500 started streaming media asset unavailable to the selected media-playing device 200. In such situation, it might be advantageous if the streaming were redirected to the computing device 100 or another media-playing device 200 other than the selected media-playing device 200, if any.

Therefore, in a fifth aspect of streaming, the cloud server computer 500 determines availability of streaming and performs redirection if necessary.

Figure 19:
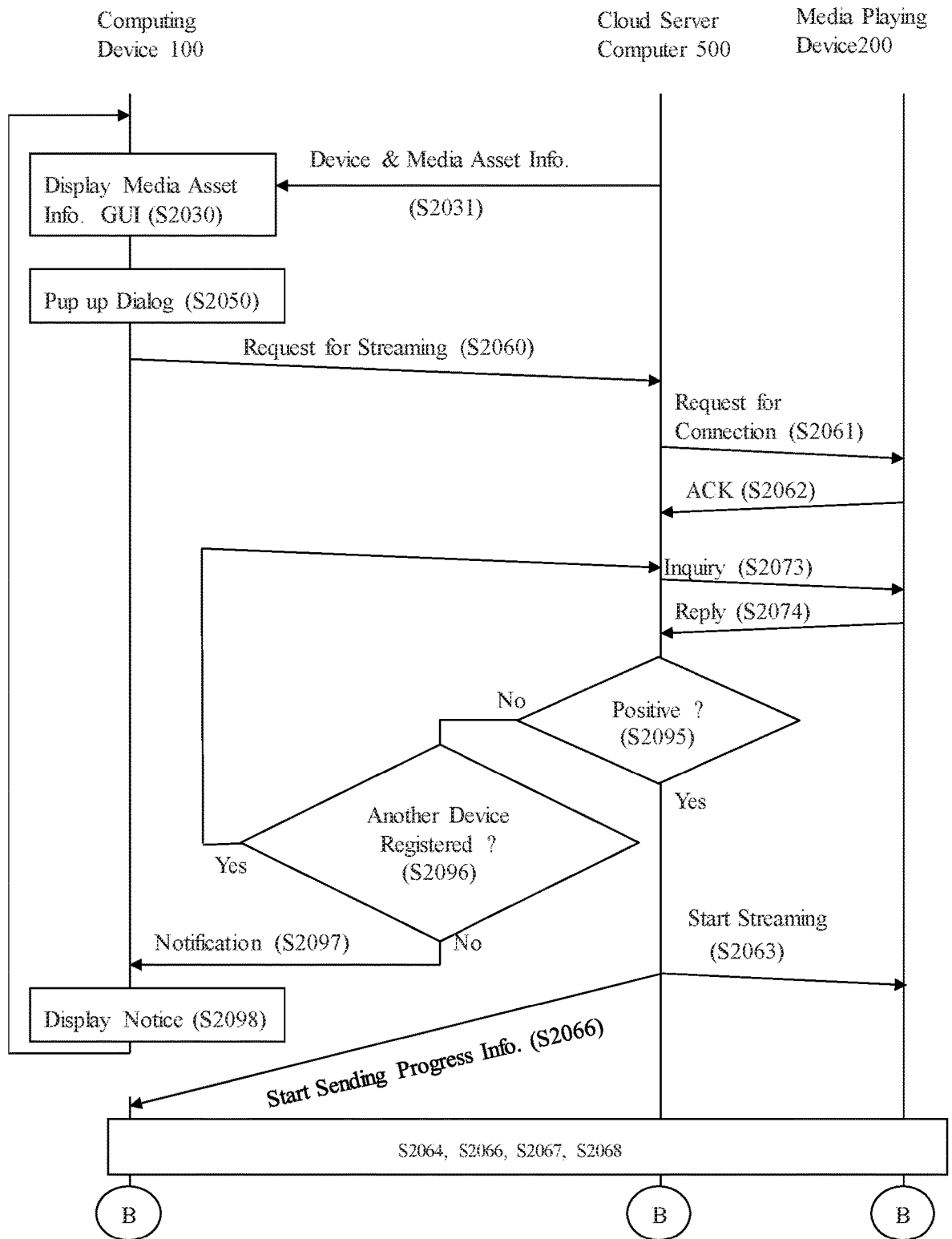
FIG. 19 is a flowchart illustrating operations performed by the computing device, the media-playing device, and the cloud server computer for media asset streaming according to a fifth aspect of streaming.

FIG. 19 is a flowchart illustrating the fifth aspect of streaming of media assets. Some steps in the fifth aspect may be common to those in the first aspect. The common reference numbers may be used to refer to the common steps between the first and the fifth aspects.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 refers to the device information 601 received at S2031, and pops up a dialog 734 for confirming the destination of streaming as illustrated in FIG. 8J (S2050). The dialog 734 contains icons representing devices listed in the received device information 601. In the example of FIG. 8J, the dialog 734 contains a tappable icon 735 to select the computing device 100 labeled "Handheld Device" and a tappable icon 736 to select the media-playing device 200 labeled "Media Device", with reference to the device information 601 of the user ID 001.

Responsive to the icon 736 being tapped, the computing device 100 sends a request to the cloud server 500 for streaming of the selected media asset to the media-playing device 200 corresponding to the icon 736 (S2060). Responsive to the request from the computing device 100, the cloud server computer 500 sends a request to the selected media-playing device 200 for connection between the cloud server computer 500 and the selected media-playing device 200 (S2061). Upon establishment of the connection between the cloud server computer 500 and the selected media-playing device 200 (S2062), the cloud server computer 500 sends to the selected media-playing device 200 an inquiry whether or not the selected media-playing device 200 is able to play the selected media asset (S2073) before starting streaming. The cloud server computer 500 then receives a reply from the media-playing device 200 (S2074).

Responsive to a positive reply indicating that the selected media-playing device 200 is able to play the selected media asset (S2095: Yes), the cloud server computer 500 starts streaming the selected media asset to the selected media-playing device 200 (S2063).

On the other hand, in S2095, responsive to a negative reply indicating that the selected media-playing device 200 is not able to play the selected media asset (S2095: No), the cloud server computer 500 refers to the device information 601 of the user data 600 to determine whether or not another media-playing device 200 is registered in the device information 601 (S2096). For example, if the user has logged in with the user ID 001, the cloud server computer 500 refers to the device information 641 of the user data 600 of the user ID 001.

If another media-playing device 200 is registered in the device information 601 (S2096: Yes), the cloud server computer 50) again sends to said another media-playing device 200 an inquiry whether or not the another media-playing device 200 is able to play the selected media asset (S2073). The cloud server computer 500 then receives a reply from said another media-playing device 200 (S2074). Responsive to a positive reply from said another media-playing device 200 (S2095: Yes), the cloud server computer 500 starts streaming the selected media asset to said another media-playing device 200 (S2060). Responsive to a negative reply again (S2095: No), the cloud server computer 500 repeats S2073, S2074, S2095, and S2096, namely, refers to the device information 601 to determine whether or not a media-playing device 200 capable of playing the selected media asset is registered in the device information 601.

As a result of S2073, S2074, S2095, and S2096, if the cloud server computer 500 finds none of media-playing devices 200 registered in the device information 601 is able to play the selected media asset (S2096: No), the cloud server computer 500 then sends to the computing device 200 a notification indicating that the streaming of the selected media asset is impossible at any of the registered devices 200 of the user (S2097).

Responsive to the notification, the computing device 100 displays on the sensitive display 102 a dialog 908 for notifying the user of unavailability of streaming over the GUI for media-asset information, as illustrated in FIG. 31 (S2098). After S2098, the GUI for media-asset information remains (S2030).

Figure 32:
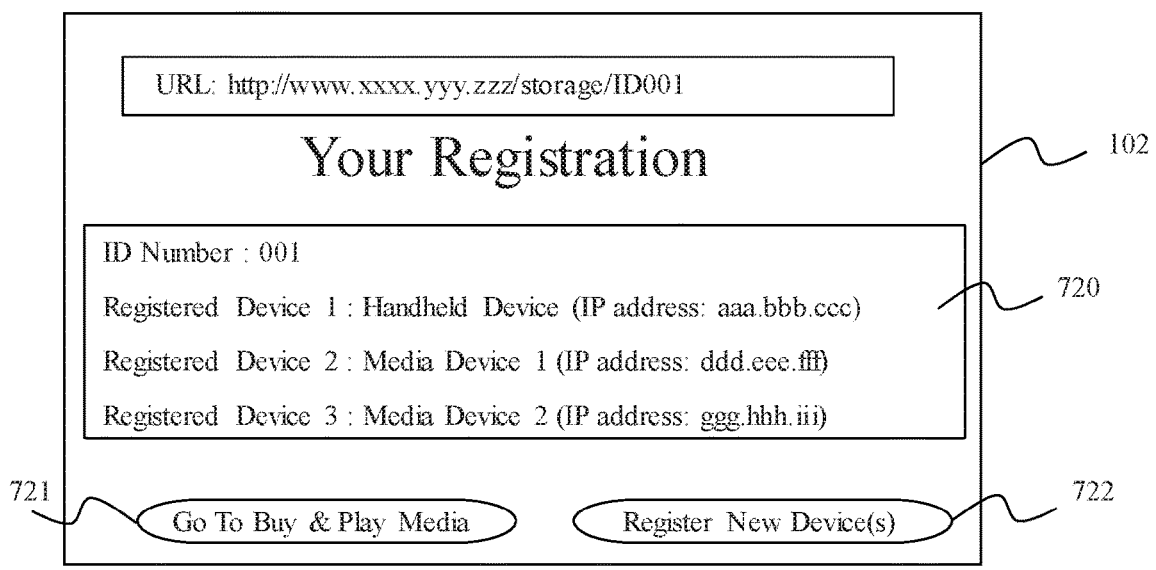
FIG. 32 illustrates exemplary user data in which two or more media-playing devices are registered.

FIG. 32 illustrates an example in which a plurality of media-playing devices 200, namely, "Media Device 1" having the IP address of ddd.eee.fff and another "Media Device 2" having the IP address of ggg.hhh.iii, are registered in the device information 601. In the example of FIG. 32, if the cloud server computer 500 receives a request for streaming the selected media asset to "Media Device 1" (S2060) but finds that "Media Device 1" is not able to play the selected media asset (S2095: No), the cloud server computer 500 then inquires "Media Device 2" whether or not the "Media Device 2" is able to play the selected media asset (S2073, S2074, S2095). In case of a positive reply (S2095: Yes), the cloud server computer 500 starts streaming the selected media asset to "Media Device 2" (S2060). If the cloud server computer 500 finds that none of "Media Device 1" and "Media Device 2" is able to play the selected media asset (S2096: No), the cloud server computer 500 sends the notification to the computing device 100 (S2097).

Sixth Aspect of Streaming

Figure 20:
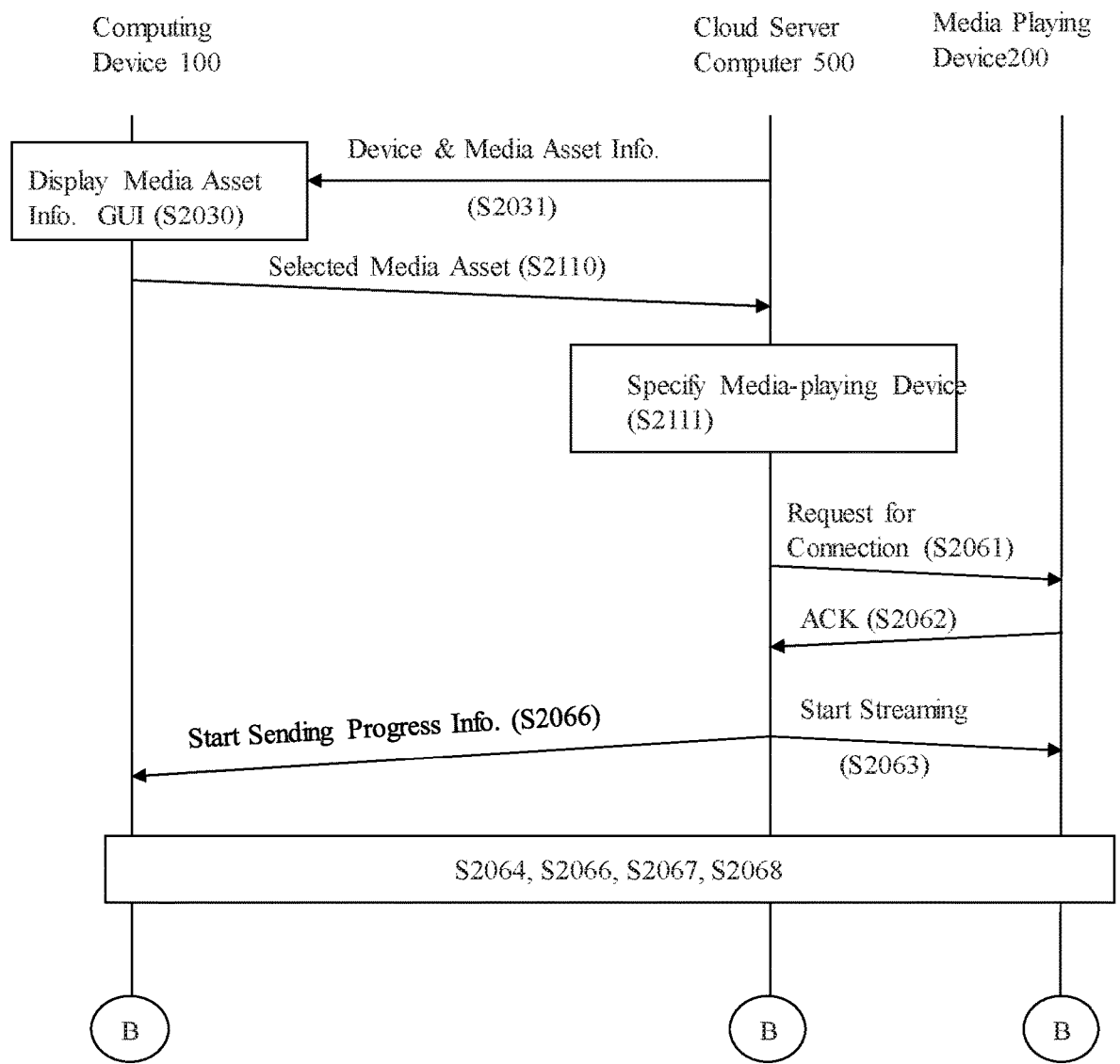
FIG. 20 is a flowchart illustrating operations performed by the computing device, the media-playing device, and the cloud server computer for media asset streaming according to a sixth aspect of streaming.

FIG. 20 is a flowchart illustrating a sixth aspect of streaming of the media assets. Some steps in the sixth aspect may be common to those in the first aspect. The common reference numbers may be used to refer to the common steps between the first and the sixth aspects.

Back in the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 sends a request to the cloud server computer 500 for streaming of a selected media asset corresponding to the tapped thumbnail (S2110). The request may include information indicative of the selected media asset. Responsive to the request from the computing device 100, the cloud server computer 500 refers to the device information of the user of the computing device 100 to specify a media-playing device 200 associated with the computing device 100 (S2111). For example, if the user has logged in with the user ID 001, the cloud server computer 500 specifies a media-playing device 200 with reference to the device information 601 of the user ID 001.

The cloud server computer 500 then sends a request to the specified media-playing device 200 for connection between the cloud server computer 500 and the specified media-playing device 200 (S2061). Responsive to establishment of the connection between the cloud server computer 500 and the specified media-playing device 200 (S2062), the cloud server computer 500 starts streaming the selected media asset to the specified media-playing device 200 (S2063), and starts sending the progress information to the computing device 100 (S2066).

Seventh Aspect of Streaming

It is assumable that a media-playing device 200 may be far away from the computing device 100. Such case may occur, for example, when the media-playing device 200 is installed at a living room of a user's house, but the user is outside the house with the computing device 100 put in his/her pocket. In such situation, streaming should not be directed to the media-playing device 200 responsive to a request from the computing device 100 because the user could not watch the streamed media.

Therefore, in a seventh aspect of streaming, the computing device 100 lets the user request for streaming to the media-playing device 200 only when the media-playing device 200 is near the computing device 100.

Figure 21:
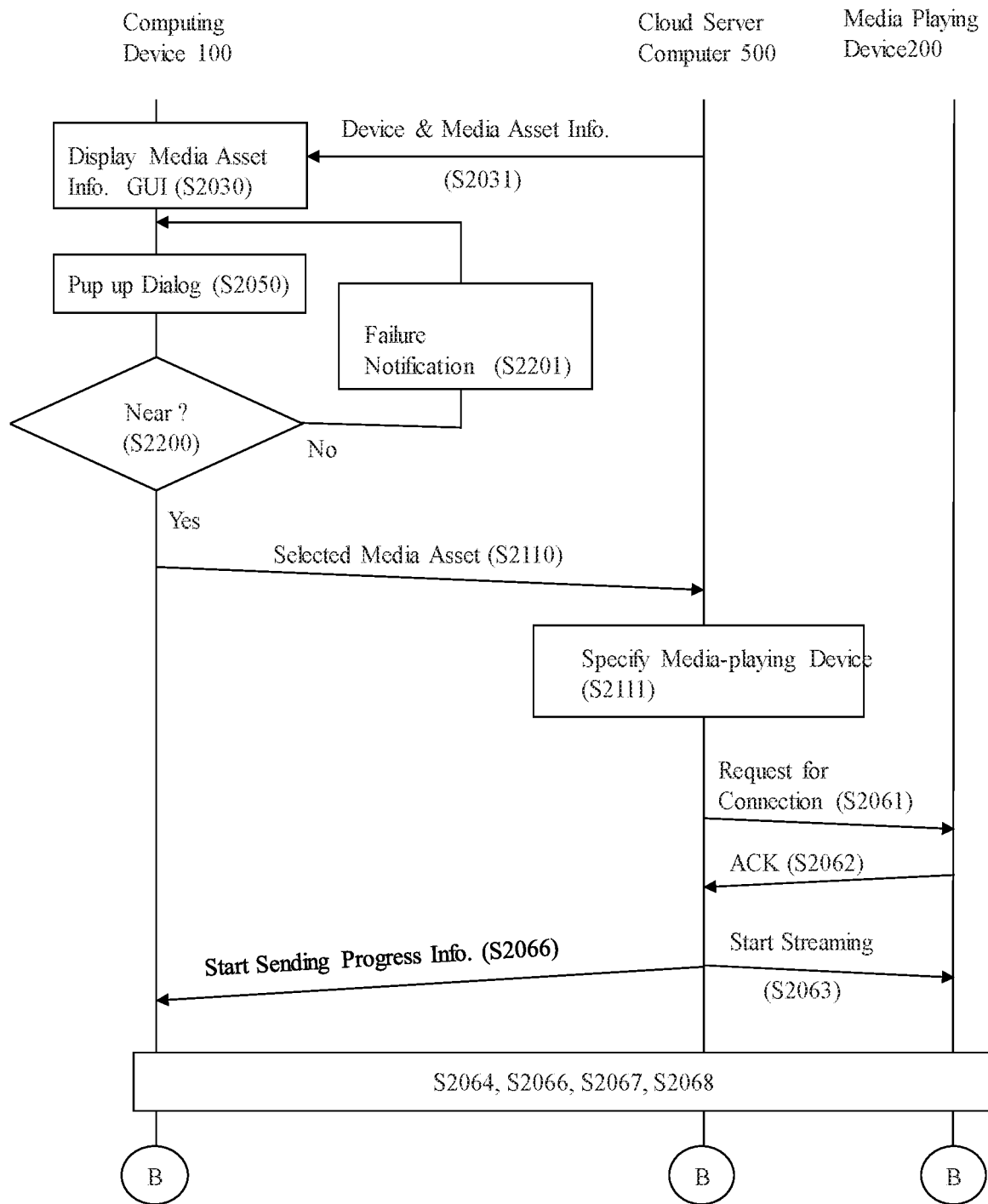
FIG. 21 is a flowchart illustrating operations performed by the computing device, the media-playing device, and the cloud server computer for media asset streaming according to a seventh aspect of streaming.

FIG. 21 is a flowchart illustrating the seventh aspect of streaming of media assets. Some steps in the seventh aspect are common to those in the sixth aspect. The common reference numbers are used to refer to the common steps between the sixth and the seventh aspects.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 activates the close-range communication circuitry 106 and communicates with the media-playing device 200 to determine whether or not the media-playing device 200 is near the computing device 100 (S2200). The determination can be made, for example, by sending a predetermined polling signal from the close-range communication circuitry 106 to the close-range communication circuitry 304 and determining whether or not the close-range communication circuitry 106 receives a reply signal from the close-range communication circuitry 304 in reply to the polling signal. If the reply signal is successfully received through the close-range communication circuitry 106 within a predetermined period after the polling signal, the close-range communication circuitry 106 and 304 can communicate with each other, which means that the media-playing device 200 is near the computing device 100. If the reply signal is not received through the close-range communication circuitry 106 within the predetermined period after the polling signal, the close-range communication circuitry 106 and 304 cannot communicate with each other, which means that the media-playing device 200 is not near the computing device 100.

If the media-playing device 200 is determined to be near the computing device 100 (S2200: Yes), the computing device 100 sends a request to the cloud server computer 500 for streaming of a selected media asset corresponding to the tapped thumbnail (S2110). Responsive to the request from the computing device 100, the cloud server computer 500 refers to the device information of the user of the computing device 100 to specify a media-playing device 200 associated with the computing device 100 (S2111). After S2111, upon establishment of connection between the cloud server computer 500 and the media-playing device 200 (S2061, S2062), the cloud server computer 500 starts streaming the selected media asset to the specified media playing device 200 (S2063), and starts sending the progress information to the computing device 100 (S2064).

On the other hand, if the media-playing device 200 is determined to be not near the computing device 100 (S2200: No), the computing device 100 does not send the request but displays, on the sensitive display 102, a dialog 907, as illustrated in FIG. 31, for notifying the user that the media-playing device 200 is far from the user and thus streaming to the media-playing device 200 is unavailable (S2201).

Eighth Aspect of Streaming

It is assumable that a media-playing device 200 may be far away from the computing device 100. Such case may occur, for example, when the media-playing device 200 is installed at a living room of a user's house, but the user is outside the house with the computing device 100 put in his/her pocket. In such situation, streaming should not be directed to the media-playing device 200 responsive to a request from the computing device 100 because the user could not watch the streamed media.

Therefore, in an eighth aspect of streaming, the cloud server computer 500 allows streaming to the media-playing device 200 only when the media-playing device 200 is near the computing device 100.

Figure 22:
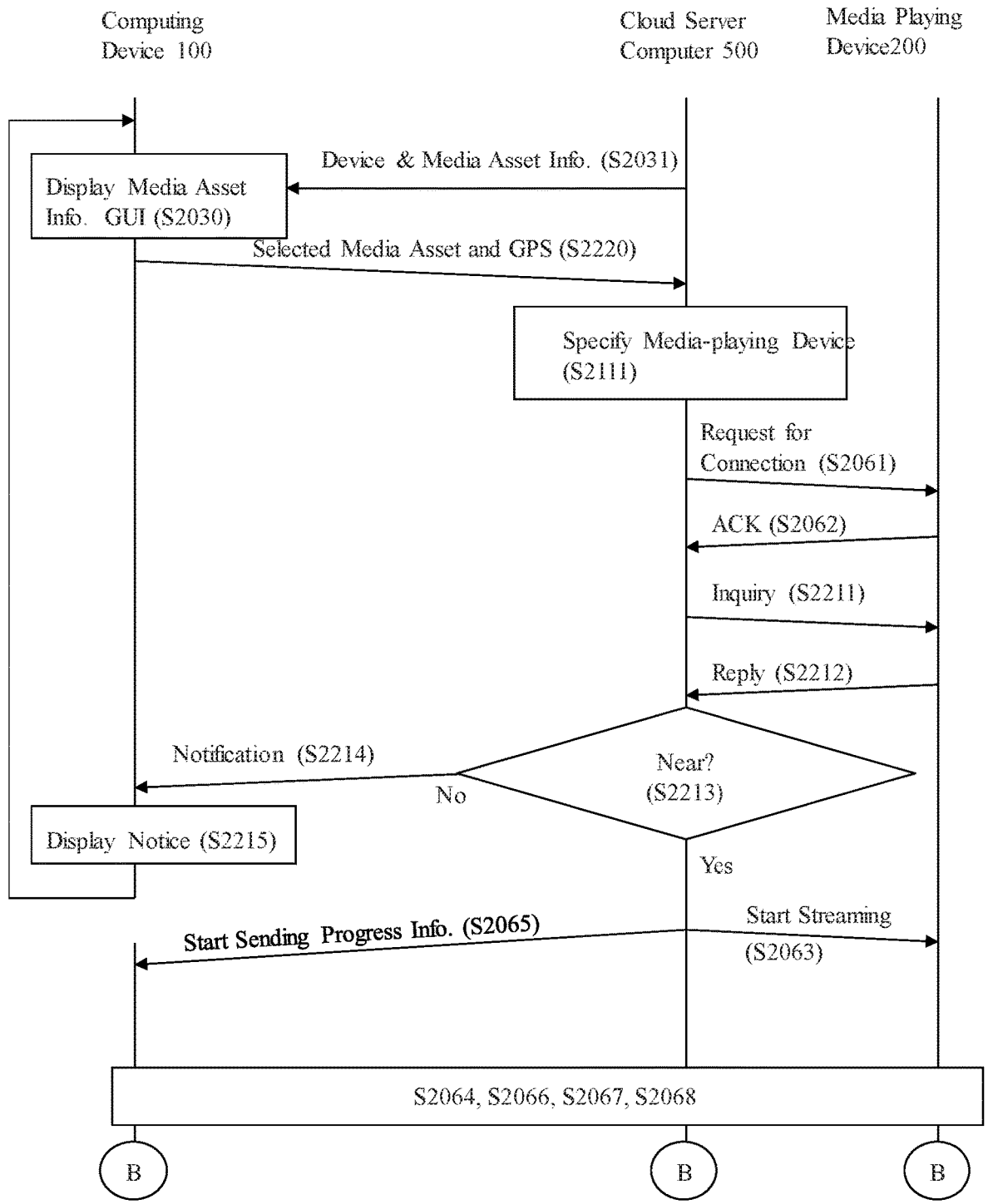
FIG. 22 is a flowchart illustrating operations performed by the computing device, the media-playing device, and the cloud server computer for media asset streaming according to an eighth aspect of streaming.

FIG. 22 is a flowchart illustrating the eighth aspect of streaming of media assets.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Responsive to a thumbnail being tapped, the computing device 100 acquires location information indicative of the location of the computing device 100 from the GPS circuitry 107, and sends the location information along with a request for streaming of the selected media asset corresponding to the tapped thumbnail, to the cloud server computer 500 (S2220).

Responsive to the location information and the request from the computing device 100, the cloud server computer 500 refers to the device information of the user of the computing device 100 to specify a media-playing device 200 associated with the computing device 100 (S2111).

Upon establishment of connection between the cloud server computer 500 and the media-playing device 200 (S2061, S2062), the cloud server computer 500 sends to the media-playing device 200 an inquiry about the location of the media-playing device 200 (S2211).

Responsive to the inquiry, the media-playing device 200 acquires location information indicative of the location of the media-playing device 200 from the GPS circuitry 307, and sends the location information to the cloud server computer 500 (S2212).

Responsive to the location information from the media-playing device 200, the cloud server computer 500 determines whether or not the media-playing device 200 is near the computing device 100 by comparing the location information received from the computing device 100 and the media-playing device 200 (S2213).

If the media-playing device 200 is determined to be near the computing device 100 (S2213: Yes), the cloud server computer 500 starts streaming the selected media asset to the media-playing device 200 (S2063), and starts sending the progress information to the computing device 100 (S2065).

On the other hand, if the media-playing device 200 is determined to be not near the computing device 100 (S2213: No), the cloud server computer 50) sends to the computing device 100 a notification indicating that the media-playing device 200 is far from the user and thus streaming to the media-playing device 200 is unavailable (S2214). Responsive to the notification, the computing device 100 displays, on the sensitive display 102, a dialog 907, as illustrated in FIG. 31, for notifying the user of the unavailability of streaming to the media-playing device 200 (S2215). After S2215, the GUI for media-asset information remains (S2030).

Ninth Aspect of Streaming

It is assumable that a media-playing device 200 specified as the destination of the streaming may be able to play only media asset generated pursuant to some specific format because the processor 301 has only a codec pursuant to the specific format. For example, the media-playing device 200 might be able to play only one of audio and visual media asset because the processor 301 has no codec for playing the other. In such situation, streaming would be unavailable at the specified media-playing device 200 if the cloud server computer 500 started streaming media asset unavailable to the specified media-playing device 200.

Therefore, in a ninth aspect of streaming, the cloud server computer 500 determines availability of streaming.

Figure 23:
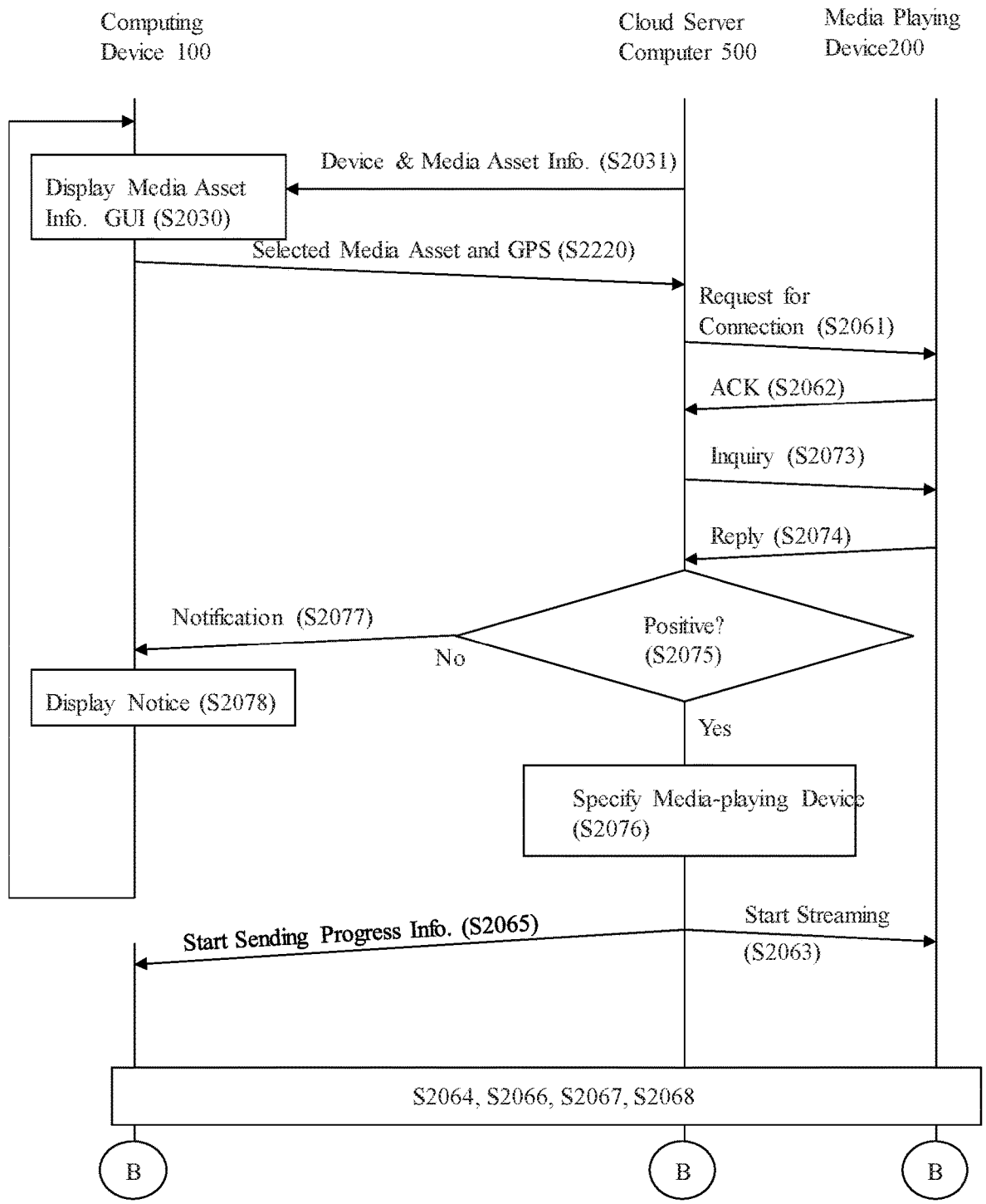
FIG. 23 is a flowchart illustrating operations performed by the computing device, the media-playing device, and the cloud server computer for media asset streaming according to a ninth aspect of streaming.

FIG. 23 is a flowchart illustrating the ninth aspect of streaming of media assets. Some steps in the ninth aspect are common to those in the sixth aspect. The common reference numbers are used to refer to the common steps between the sixth and the ninth aspects. The ninth aspect of streaming may be preferable especially when two or more media-playing devices 200 are registered associated with the computing device 100 in the user data 600.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 10 sends a request to the cloud server computer 500 for streaming of a selected media asset (S2110). Responsive to the request from the computing device 100, the cloud server computer 500 the cloud server computer 500 refers to the device information 601 of the user, and sends requests for connection to media-playing devices 200 registered in the device information 601 (S2061). For example, if the user has logged in with the user ID 001, the cloud server computer 500 refers to the device information 601 of the user ID 001. The requests for connection may be sent to the media-playing devices 200 in series.

Upon establishment of connection (S2062), the cloud server computer 500 sends to each of the connected media-playing devices 200 an inquiry whether or not the media-playing device 200 is able to play the selected media asset (S2073) before starting streaming. For example, the cloud server computer 500 may inquire the media-playing devices 200 whether or not the format of the selected media asset is available at the media-playing devices 200. The cloud server computer 500 then receives replies from the media-playing devices 200 (S2074).

Responsive to the replies (S2075: Yes), the cloud server computer 500 selects and specifies a media-playing device 200, as the destination of streaming, out of media-playing devices 200 that presented positive replies indicating that they are able to play the selected media asset at S2074 (S2076). For example, if only one media-playing device 200 replies positively at S2074, the cloud server computer 500 specifies said one media-playing device 200 at S2076. For example, if two or more media-playing devices 200 reply positively at S2074, the cloud server computer 500 may advantageously specify a media-playing device 200 with which the cloud server computer 500 can connect at the higher performance, out of the positive media-playing devices 200. The performance may be determined, for example, from the bandwidth or the connection speed available on the network 400. The cloud server computer 500 then starts streaming the selected media asset to the specified media-playing device 200 (S2063), and starts sending the progress information to the computing device 100 (S2065).

In S2075, on the other hand, if every media-playing device 200 replies negatively indicating it is not able to play the selected media asset (S2075: No), the cloud server computer 500 sends to the computing device 100 a notification indicating that streaming of the selected media asset is not available at any of the registered media-playing devices 200 (S2077).

Responsive to the notification, the computing device 100 displays on the sensitive display 102 a dialog 908 for notifying the user of unavailability of streaming over the GUI for media-asset information, as illustrated in FIG. 31 (S2078). After S2078, the GUI for media-asset information remains (S2030).

FIG. 32 illustrates an example in which two media-playing devices 200, namely, "Media Device 1" having the IP address of ddd.eee.fff and another "Media Device 2" having the IP address of ggg.hhh.iii, are registered in the device information 601. In the example of FIG. 32, the cloud server computer 500 inquires "Media Device 1" and "Media Device 2" (S2073, S2074). If, for example, only "Media Device 1" replies positively at S2074, the cloud server computer 500 specifies "Media Device 1" as the streaming destination (S2076). If, for example, both of "Media Device 1" and "Media Device 2" reply positively at S2074, the cloud server computer 500 selects one of them as the streaming destination (S2076). For example, if the cloud server computer finds that it can connect to "Media Device 1" at a higher speed than to "Media Device 2", the cloud server computer 500 may select "Media Device 1". If the cloud server computer 500 finds that none of "Media Device 1" and "Media Device 2" is able to play the selected media asset (S2075: No), the cloud server computer 500 sends the notification to the computing device 100 (S2077).

Modification to Ninth Aspect

The ninth aspect of streaming may be modified as follows. Instead of the inquiry and determination in S2073 and S2074, the cloud server computer 500 may manage format information indicative of one or more available formats in association with each registered media-playing device 200 in the device information 601.

Figure 34:
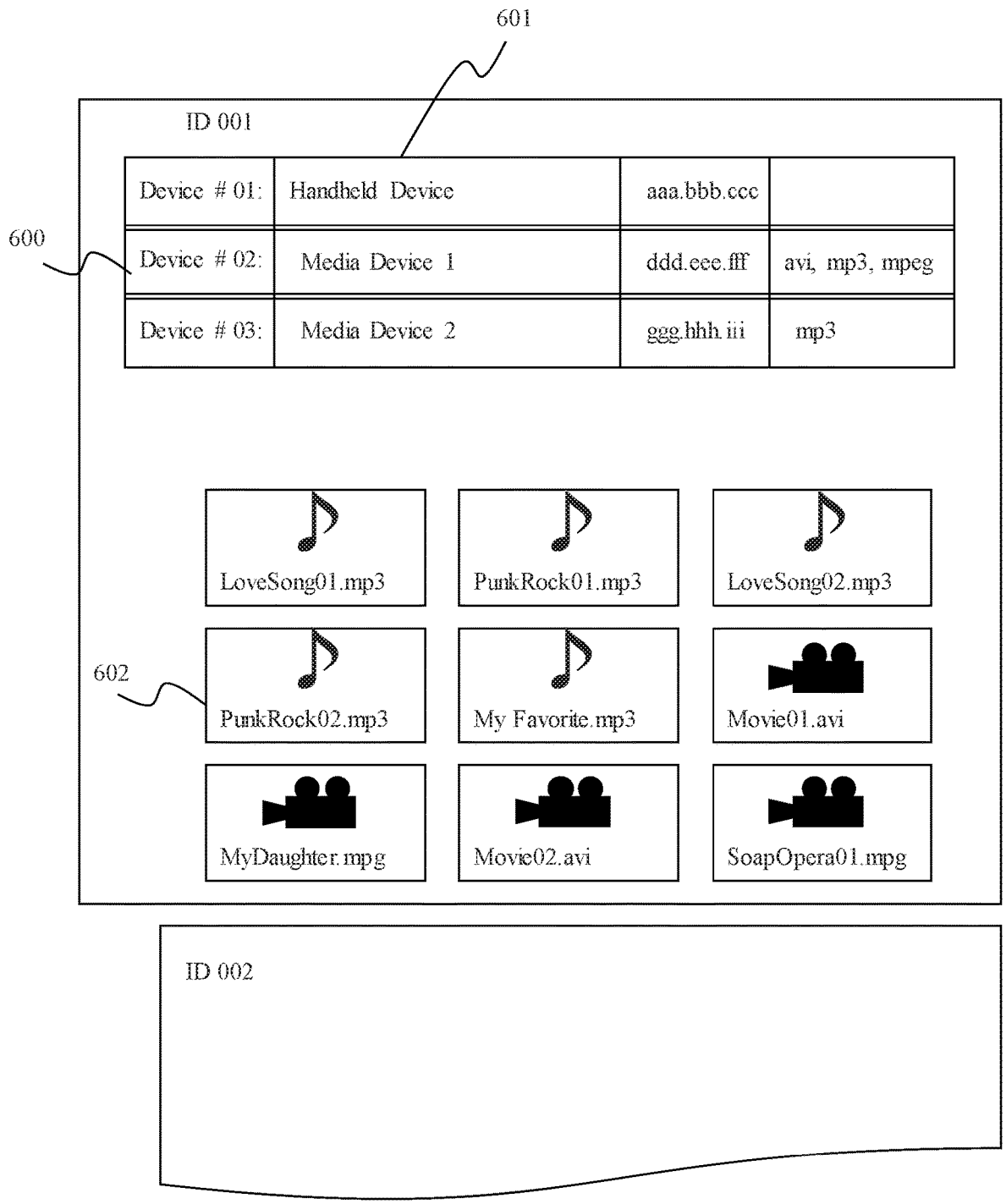
FIG. 34 illustrates device information including information indicative of available format in association with registered media-playing device(s).

FIG. 34 illustrates device information 601 including information indicative of available format in association with each registered media-playing device 200. In the example of FIG. 34, the device information 601 shows that a media-playing device 200 labeled "Media Device 1" is able to play media asset with the format of "avi", "mp3", and "mpeg" and that a media-playing device 200 labeled "Media Device 2" is able to play media asset with the format of "mp3" only.

The format information in the device information 601 may be stored, for example, by the user through the GUI for device registration as illustrated in FIG. 8D in S2023.

Figure 24:
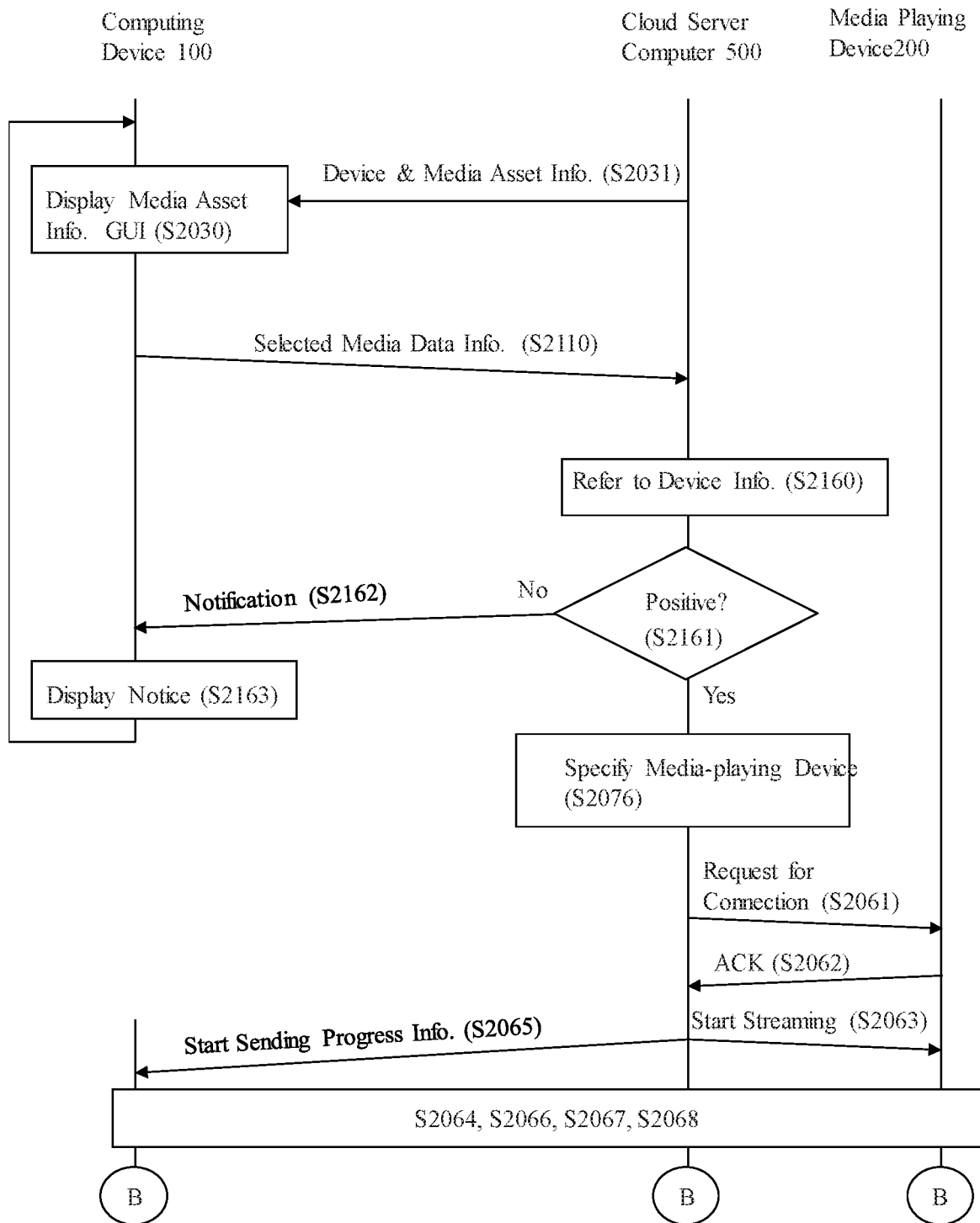
FIG. 24 is a flowchart illustrating operations performed by the computing device, the media-playing device, and the cloud server computer for media asset streaming according to a modified ninth aspect of streaming.

FIG. 24 is a flowchart illustrating streaming of media assets according to the modified ninth aspect of streaming.

In response to the request for streaming of the selected media asset (S2110), the cloud server computer 500 refers to the device information 601 to determine whether or the registered media-playing devices 200 associated with the computing device 100 are able to play the selected media asset (S2160). More specifically, the cloud server computer 500 may determine whether or not the format of the selected media asset is available at each of the media-playing devices 200.

If the cloud server computer 500 finds at least one positive media-playing devices 200 capable of playing the selected media asset (S2161: Yes), the cloud server computer 500 specifies a media-playing device 200 out of the positive devices 200 (S2076). The cloud server computer 500 then sends to the specified media-playing device 500 a request for connection (S2061).

Upon establishment of connection (S2062), the cloud server computer 500 then starts streaming the selected media asset to the specified media-playing device 200 (S2063).

If the cloud server computer 500 finds none of the registered media-playing devices 200 is not able to play the selected media asset (S2161: No), the cloud server computer 500 sends to the computing device 100 a notification indicating that streaming of the selected media asset is not available at any of the registered media-playing devices 200 (S2162).

Responsive to the notification, the computing device 100 displays on the sensitive display 102 a dialog 908 for notifying the user of unavailability of streaming over the GUI for media-asset information, as illustrated in FIG. 31 (S163). After S163, the GUI for media-asset information remains (S2030).

Tenth Aspect of Streaming

It is assumable that a media-playing device 200 specified as the destination of the streaming may be able to play only media asset generated pursuant to some specific format because the processor 301 has only a codec pursuant to the specific format. For example, the media-playing device 200 might be able to play only one of audio and visual media asset because the processor 301 has no codec for playing the other. In such situation, streaming would be unavailable at the specified media-playing device 200 if the cloud server computer 500 started streaming media asset unavailable to the specified media-playing device 200.

Therefore, in a tenth aspect of streaming, the cloud server computer 500 determines availability of streaming.

Figure 25:
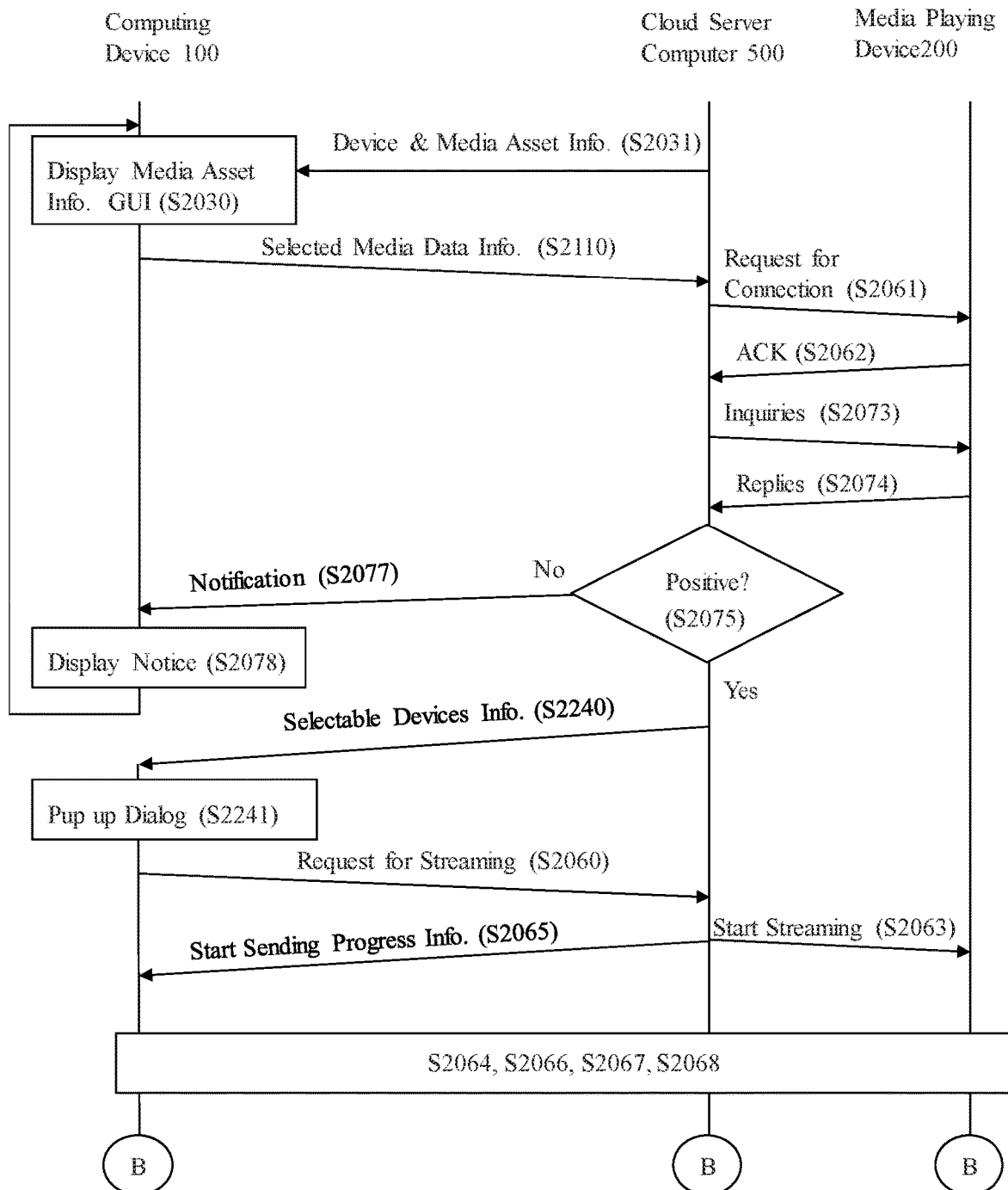
FIG. 25 is a flowchart illustrating operations performed by the computing device, the media-playing device, and the cloud server computer for media asset streaming according to a tenth aspect of streaming.

FIG. 25 is a flowchart illustrating the tenth aspect of streaming of media assets. Some steps in the tenth aspect are common to those in the sixth aspect. The common reference numbers are used to refer to the common steps between the sixth and the tenth aspects. The tenth aspect of streaming may be preferable when two or more media-playing devices 200 are registered in association with the computing device 100 in the user data 600.

In the GUI for media-asset information as illustrated in FIG. 8E again (S2030, S2031), the list 730 displays media assets 602 stored as the user data 600 of the user, with reference to the information received at S2031. For example, if the user has logged in with the user ID 001, the list 730 displays the media data 602 stored as the user data 600 of the user ID 001. In the example of FIG. 8E, the list 730 lists the media assets 602 by way of thumbnails representing the media assets 602.

Through the GUI for media-asset information, the user can select one of the media assets 602 listed in the list 730 for making the cloud server computer 500 stream the selected media asset. For selection, the user can tap a thumbnail corresponding to a media asset he/she selects to enjoy through the sensitive display 102. Responsive to a thumbnail being tapped, the computing device 100 sends a request to the cloud server computer 500 for streaming of a selected media asset (S2110). Responsive to the request from the computing device 100, the cloud server computer 500 refers to the device information 601 of the user, and sends requests for connection to media-playing devices 200 registered in the device information 601 (S2061).

Upon establishment of connection (S2062), the cloud server computer 500 inquires the registered media-playing devices 200 whether or not the media-playing devices 200 are able to play the selected media asset (S2074) before starting streaming.

Responsive to the replies (S2075: Yes), the cloud server computer 500 sends information indicative of one or more selectable media-playing devices 200, which have given positively replies indicating that they are able to play the selected media asset at S2074, to the computing device 100 (S2240). Each of the selectable media-playing devices 200 is capable of playing the selected media asset, and thus streaming of the selected media asset should be directed to one of the selectable media-playing devices 200.

Figure 33:
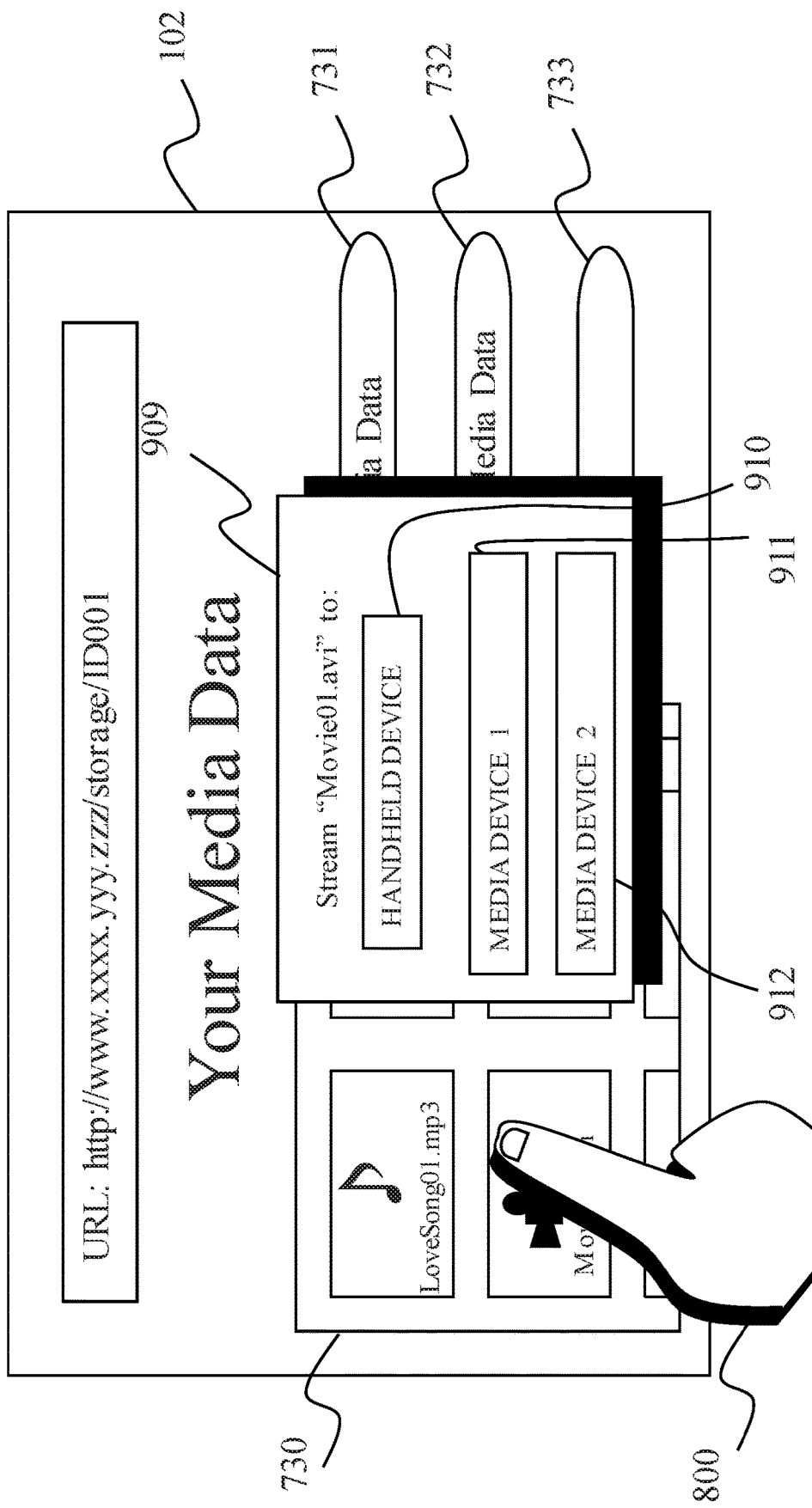
FIG. 33 illustrates how a dialog is displayed for confirming the destination of streaming at the computing device.

Responsive to the information (S2240), the computing device 100 pops up a dialog 909 for confirming the destination of streaming as illustrated in FIG. 33 (S2241). The dialog 909 contains icons representing the selectable media-playing devices 200. In the example of FIG. 33, the dialog 909 contains a tappable icon 911 representing "Media Device 1" and a tappable icon 912 representing "Media Device 2", in addition to a tappable icon 910 representing "Handheld Device".

Responsive to, for example, the icon 912 being tapped through the sensitive display 102, the computing device 100 sends to the cloud server computer 500 a request for streaming of the selected media asset to the "Media Device 2" (S2060).

Responsive to the request, the cloud server computer 500 then starts streaming the selected media asset to the requested media-playing device 200 (S2063), and starts sending the progress information to the computing device 100 (S2065).

Back in S2075, on the other hand, if every media-playing device 200 replies negatively indicating it is not able to play the selected media asset (S2075: No), the cloud server computer 500 sends to the computing device 100 a notification indicating that streaming of the selected media asset is not available at any of the registered media-playing devices 200 (S077).

Responsive to the notification, the computing device 100 displays on the sensitive display 102 a dialog 907 for notifying the user of unavailability of streaming over the GUI for media-asset information, as illustrated in FIG. 31 (S2078). After S2078, the GUI for media-asset information remains (S2030).

Modification to Tenth Aspect

The tenth aspect of streaming may be modified as follows. Instead of the inquiry and determination in S2073 through S2075, the cloud server computer 500 may manage format information indicative of available format in association with each registered media-playing device 200 in the device information 601.

FIG. 34 illustrates device information 601 including information indicative of available format in association with each registered media-playing device 200. In the example of FIG. 34, the device information 601 shows that a media-playing device 200 labeled "Media Device 1" is able to play media asset with the format of "avi", "mp3", and "mpeg" and that a media-playing device 200 labeled "Media Device 2" is able to play media asset with the format of "mp3" only.

The format information in the device information 601 may be stored, for example, by the user through the GUI for device registration as illustrated in FIG. 8D in S2023.

Figure 26:
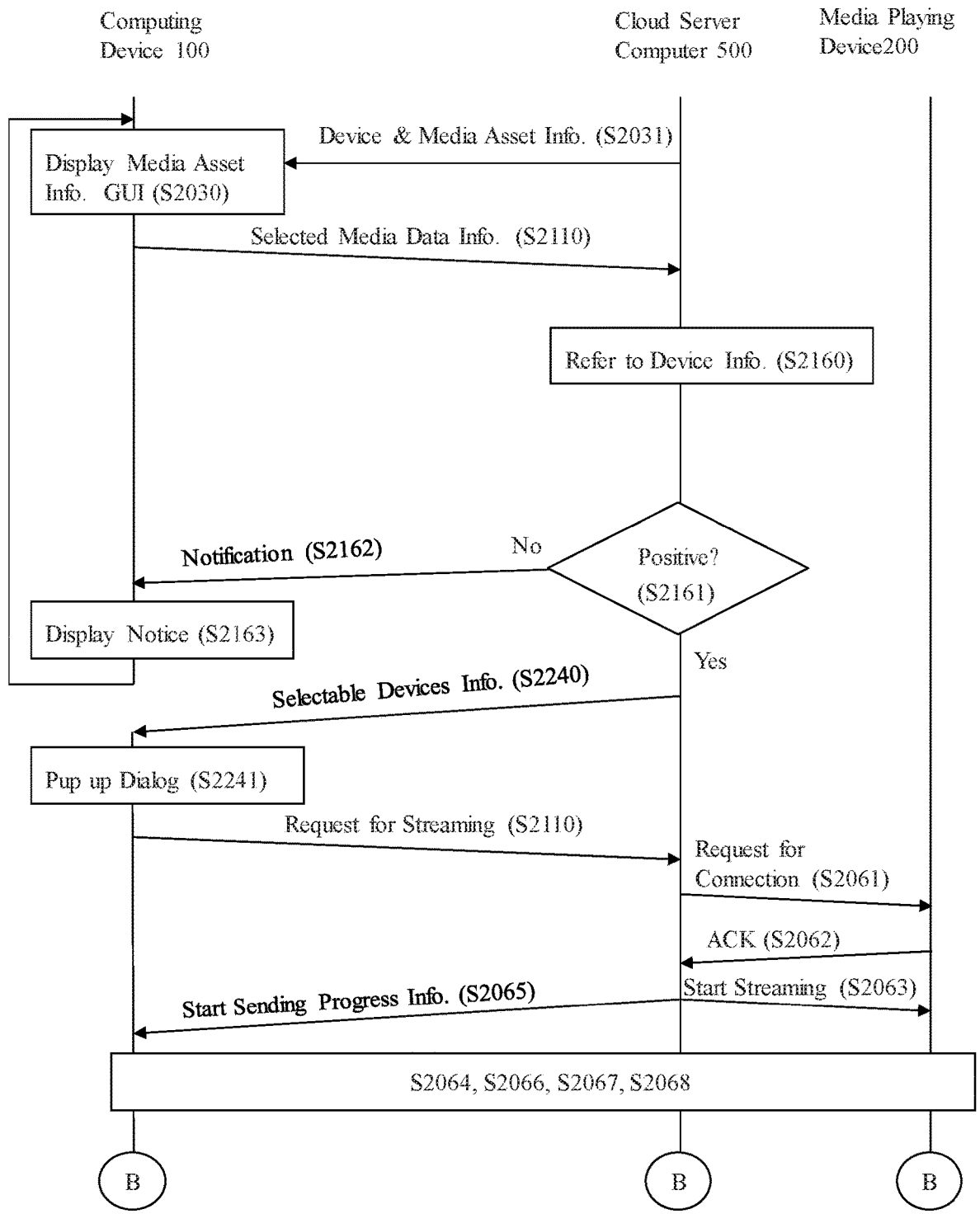
FIG. 26 is a flowchart illustrating operations performed by the computing device, the media-playing device, and the cloud server computer for media asset streaming according to a modified tenth aspect of streaming.

FIG. 26 is a flowchart illustrating streaming of media assets according to the modified tenth aspect of streaming.

In response to the request for streaming of the selected media asset (S2110), the cloud server computer 500 refers to the device information 601 to determine whether or the registered media-playing devices 200 associated with the computing device 100 are able to play the selected media asset (S2160).

If the cloud server computer 500 finds at least one selectable media-playing devices 200 capable of playing the selected media asset (S2161: Yes), the cloud server computer 500 sends to the computing device 100 information indicative of the selectable media-playing devices 200 (S2240).

Responsive to the request at S2100, the cloud server computer 500 sends to the requested media playing device 200 a request for connection (S2061). Upon establishment of connection (S2062), the cloud server computer 500 starts streaming the selected media asset to the requested media-playing device 200 (S2063), and starts sending the progress information to the computing device 100 (S2065).

On the other hand, if the cloud server computer 500 finds none of the registered media-playing devices 200 is not able to play the selected media asset (S2161: No), the cloud server computer 500 sends to the computing device 100 a notification indicating that streaming of the selected media asset is not available at any of the registered media-playing devices 200 (S2162).

Modification to Aspects

According to the third, fourth, eighth, and ninth aspects of streaming, if the cloud server computer 500 finds that streaming of the selected media asset to the media-playing device 200 cannot be made (S2213: No, S2075: No), the cloud server computer 500 sends the notification (S2214, S2077).

Instead thereof, in S2214 and S2077, the cloud server computer 500 may start streaming the selected media to the computer device 100. In other words, the cloud server computer 500 may redirect the streaming from the media-playing device 200 to the computing device 100.

According to this modification, the computing device 100 may start playing the streamed media asset in S2215 and S2078 instead of displaying the notification.

Redirection of Streaming

While streaming the media asset after S2053 or S2063 according to the aspects of streaming, the cloud server computer 500 may change the streaming destination, namely, redirect the streaming responsive to a predetermined operation made by a user.

First Aspect of Redirection

While streaming the media asset after S2053 according to the first aspect of streaming, the cloud server computer 500 may redirect streaming of the media asset from the computing device 100 to the media-playing device 200 responsive to a predetermined operation being made by a user through the sensitive display 102.

Figure 47:
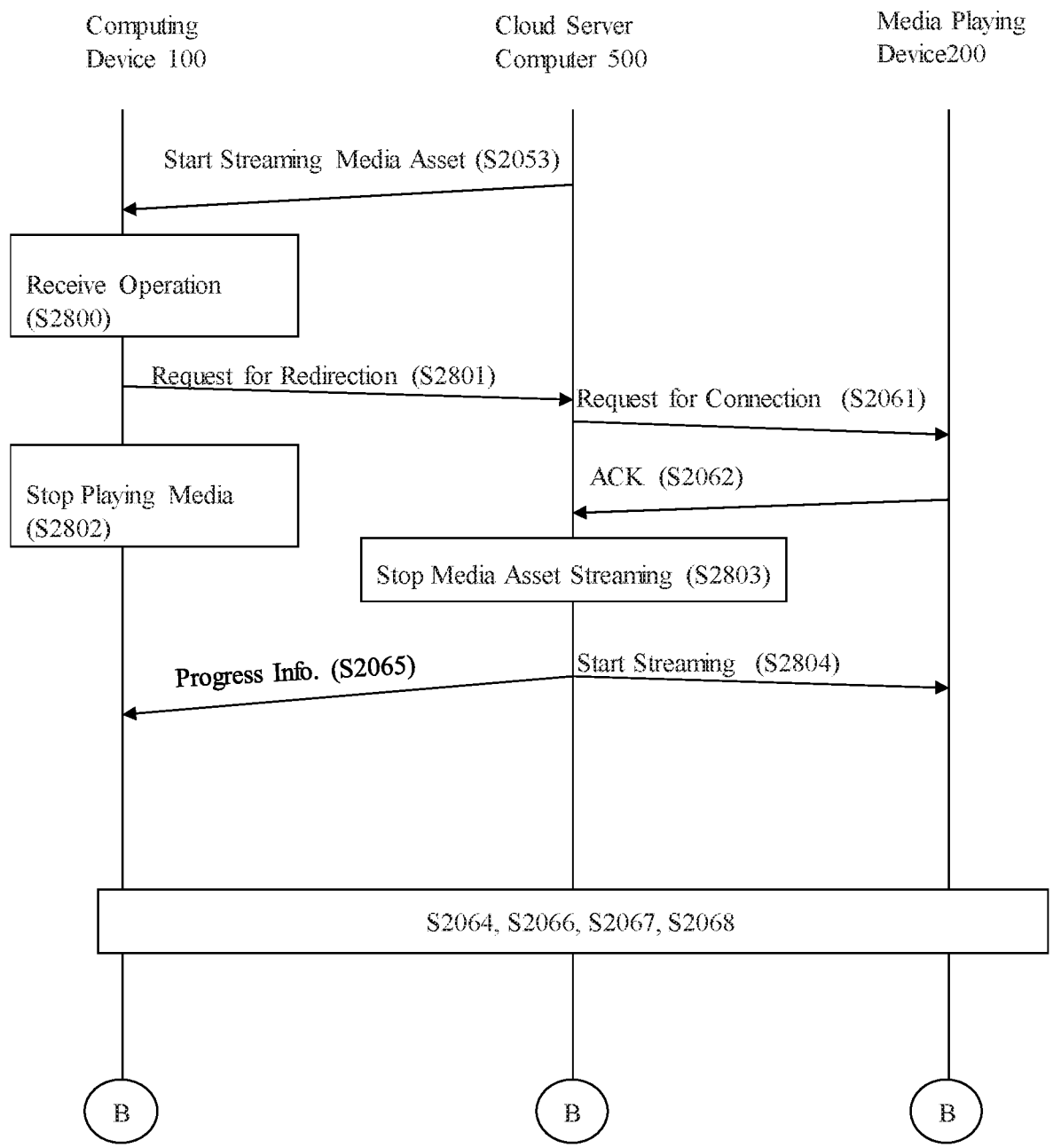
FIG. 47 is a flowchart illustrating operations performed by the computing device, the media-playing device, and the cloud server computer according to a first aspect of streaming redirection responsive to a user's operation.

FIG. 47 is a flowchart illustrating redirection of streaming responsive to a user's operation.

Figure 52:
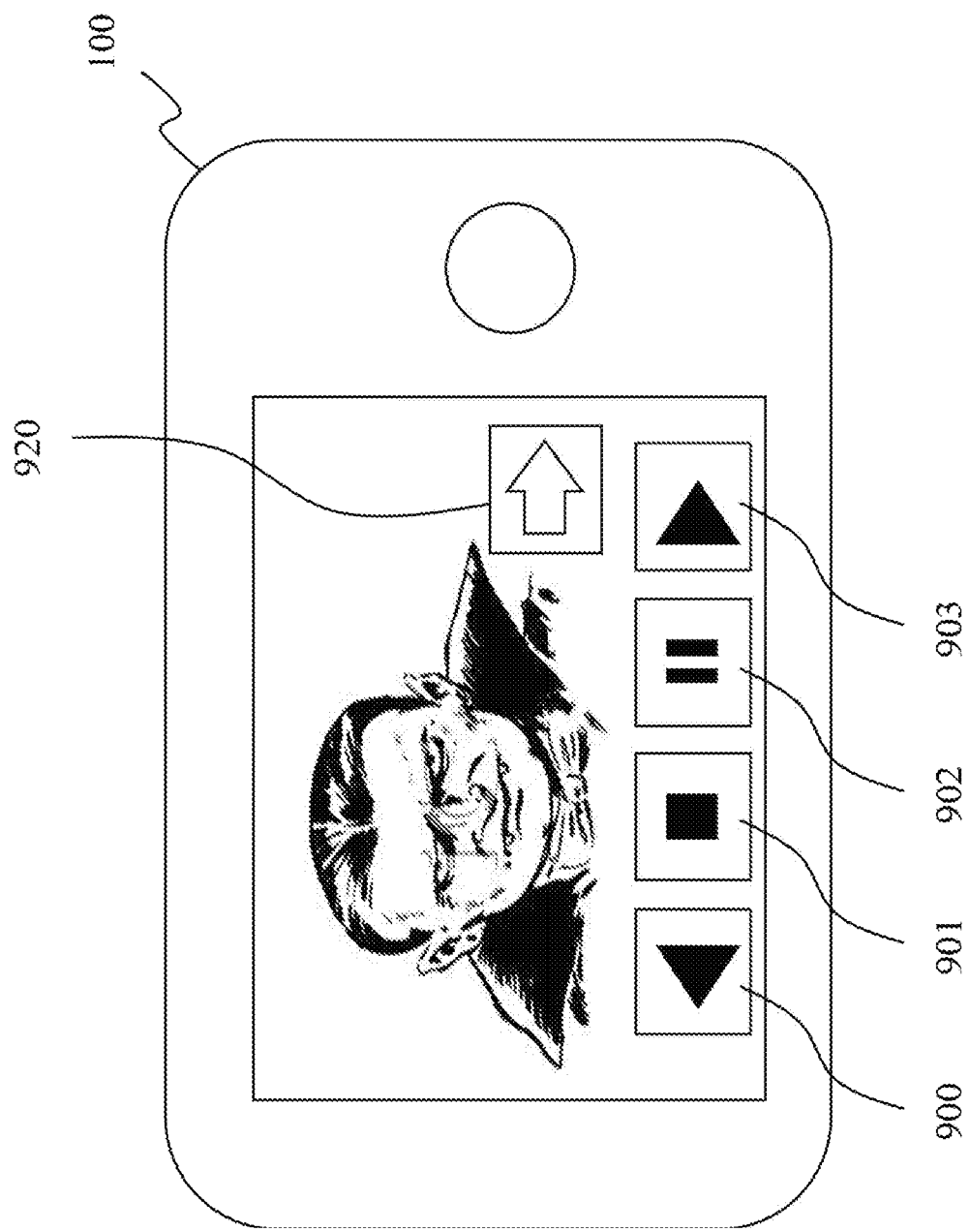
FIG. 52 illustrates how the computing device receives the user's operation for redirection by way of tapping on an icon.
Figure 53:
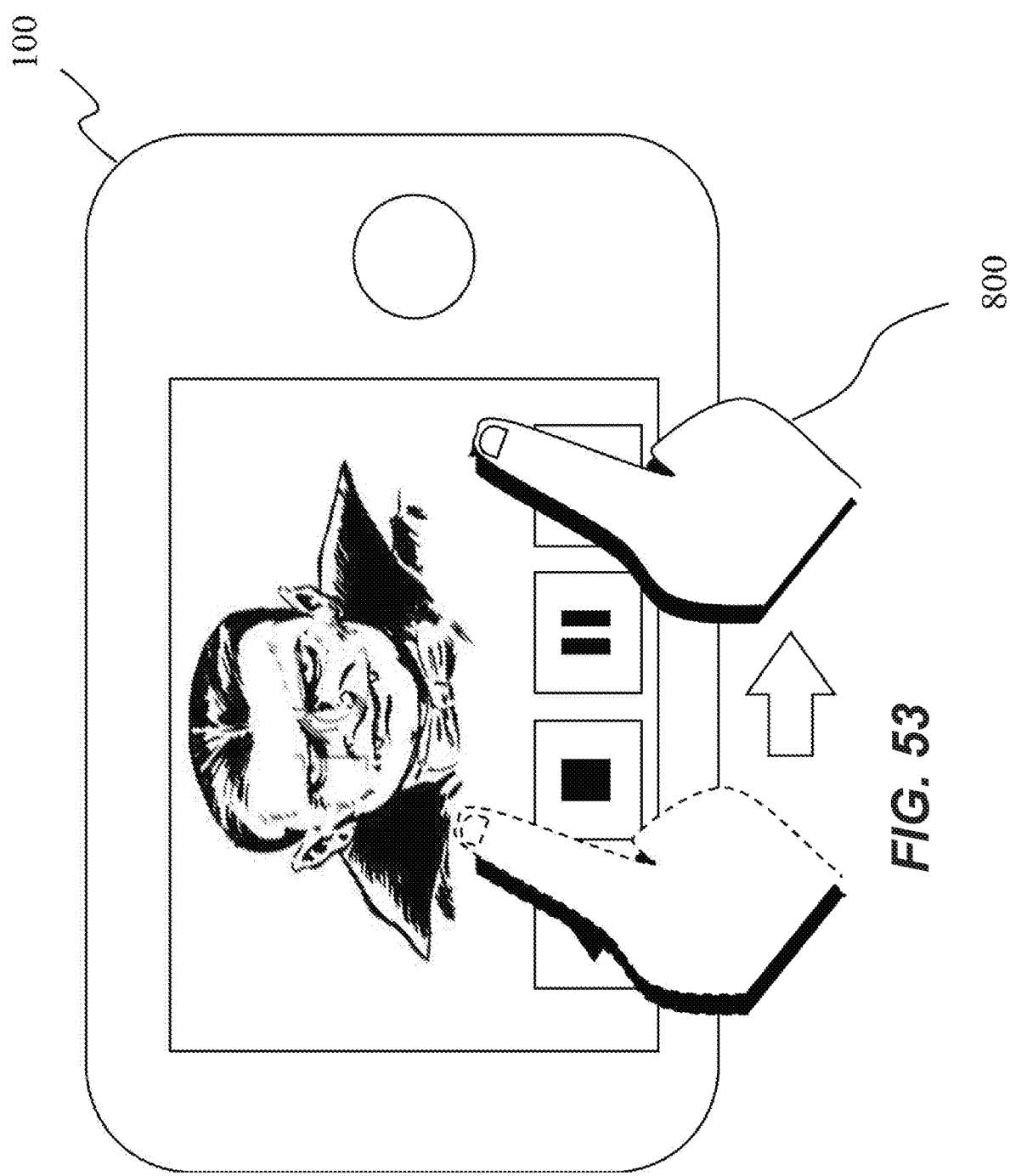
FIG. 53 illustrates how the computing device receives the user's operation for redirection by way of the user's gesture.

While the media asset is streamed to the computing device 100 (S2053), the computing device 100 can receive a predetermined operation by the user made onto the sensitive display 102. For example, the predetermined operation may be to tap on a predetermined icon 920 that appears with the graphical menu on the sensitive display 102, as illustrated in FIG. 52. In this example, the computing device 100 receives the predetermined operation if the sensitive display 102 detects a tap made onto the icon 920. In another example, the predetermined operation may be a predetermined gesture by an object like the user's finger made onto or above the sensitive display 102. The computer device 100 receives the predetermined operation if the sensitive display 102 detects the gesture by continuously detecting hover of the user's finger above the sensitive display 102 or continuously detecting a movement of the finger while a tap is maintained on the sensitive display 102. FIG. 53 illustrates an exemplary gesture consisting of a left-to-right "drag" or "flick" movement of the finger 800 on the sensitive display 102.

Responsive to the predetermined operation (S2800), the computing device 100 sends a request to the cloud server computer 500 for redirection of streaming (S2801).

Responsive to the request, the cloud server computer 500 sends a request to the media-playing device 200 for connection with the cloud server computing device 500 (S2061). Upon establishment of connection (S2062), the cloud server computer 50) stops the ongoing streaming of the media asset to the computing device 100 (S2803), and instead, starts streaming the media asset to the media-playing device 200 (S2804). In other words, the cloud server computer 500 redirects the streaming from the computing device 100 to the media-playing device 200. More specifically, in S2804, the cloud server computer 500 may preferably start streaming the media asset at a temporal or chronological point at which the streaming has been stopped in S2803 within the duration of the media asset.

Upon starting the streaming to the media-playing device 200 (S2084), the cloud server computer 500 starts sending the progress information to the computing device 100 (S2065).

In the course of the redirection of streaming, the computing device 100 stops playing the media asset (S2802). In S2802, the computing device 100 may voluntarily stop playing the media asset responsive to sending the request in S2801, or may naturally stop playing the media asset due to absence of the media asset streamed from the cloud server computer 500 after S2803.

Thanks to the redirection of streaming, the user is able to continue enjoying playing, at the media-playing device 200, the media asset the user enjoyed playing at the computing device 100. This may be advantageous, for example, in a situation where the user returns to his/her house in which the media-playing device 200 is installed from outside where he/she played the media asset at the computing device 100 carried by him/her.

Second Aspect of Redirection

It is assumable that a media-playing device 200 may be far away from the computing device 100. Such case may occur, for example, when the user erroneously performs the predetermined operation when he/she is outside far away from his/her house where the media-playing device 200 is installed. In such situation, streaming should not be redirected from the computing device 100 to the media-playing device 200 because the user could not continue watching or listening to the media asset played at the media-playing device 200.

Therefore, in a second aspect of redirection, the computing device 100 requests for the redirection only when the media-playing device 200 is near the computing device 100.

Figure 48:
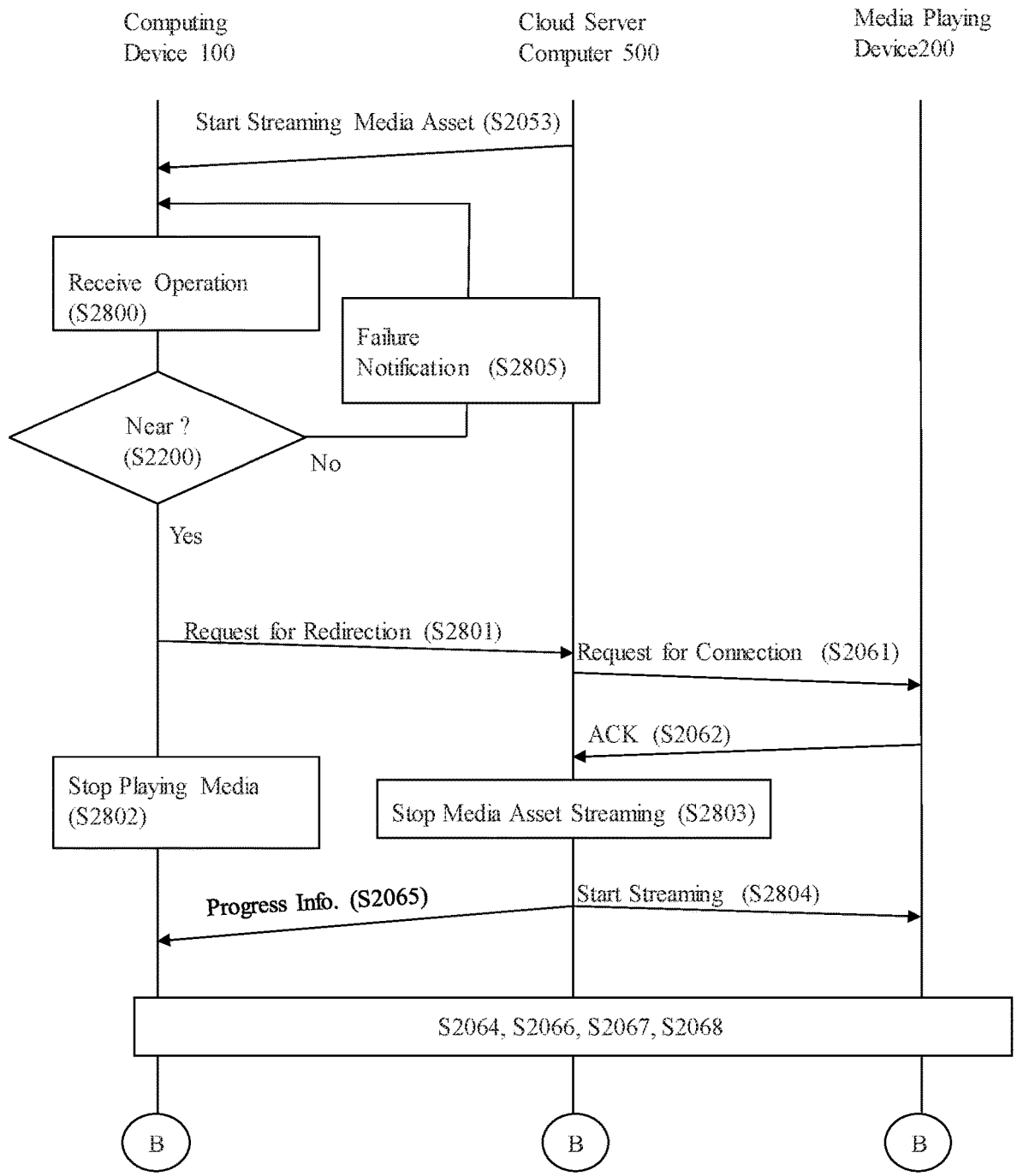
FIG. 48 is a flowchart illustrating operations performed by the computing device, the media-playing device, and the cloud server computer according to a second aspect of streaming redirection responsive to a user's operation.

FIG. 48 is a flowchart illustrating the second aspect of redirection of streaming. Some steps in the second aspect may be common to those in the first aspect. The common reference numbers may be used to refer to the common steps between the first and the second aspects.

In the second aspect, responsive to the predetermined operation (S2800), the computing device 100 activates the close-range communication circuitry 106 and tries to communicate with the media-playing device 200 to determine whether or not the media-playing device 200 is near the computing device 100 (S2200). The determination can be made, for example, by sending a predetermined polling signal from the close-range communication circuitry 106 to the close-range communication circuitry 304 and determining whether or not the close-range communication circuitry 106 receives a reply signal from the close-range communication circuitry 304 in reply to the polling signal. If the reply signal is successfully received through the close-range communication circuitry 106 within a predetermined period after the polling signal, the close-range communication circuitry 106 and 304 can communicate with each other, which means that the media-playing device 200 is near the computing device 100. If the reply signal is not received through the close-range communication circuitry 106 within the predetermined period after the polling signal, the close-range communication circuitry 106 and 304 cannot communicate with each other, which means that the media-playing device 200 is not near the computing device 100.

If the media-playing device 200 is determined to be near the computing device 100 (S2200: Yes), the computing device 100 sends the request to the cloud server computer 500 for redirection of streaming (S2801) so that the cloud server computer 500 stops the ongoing streaming and starts streaming to the media-playing device 200 (S2803, S2804).

Figure 54:
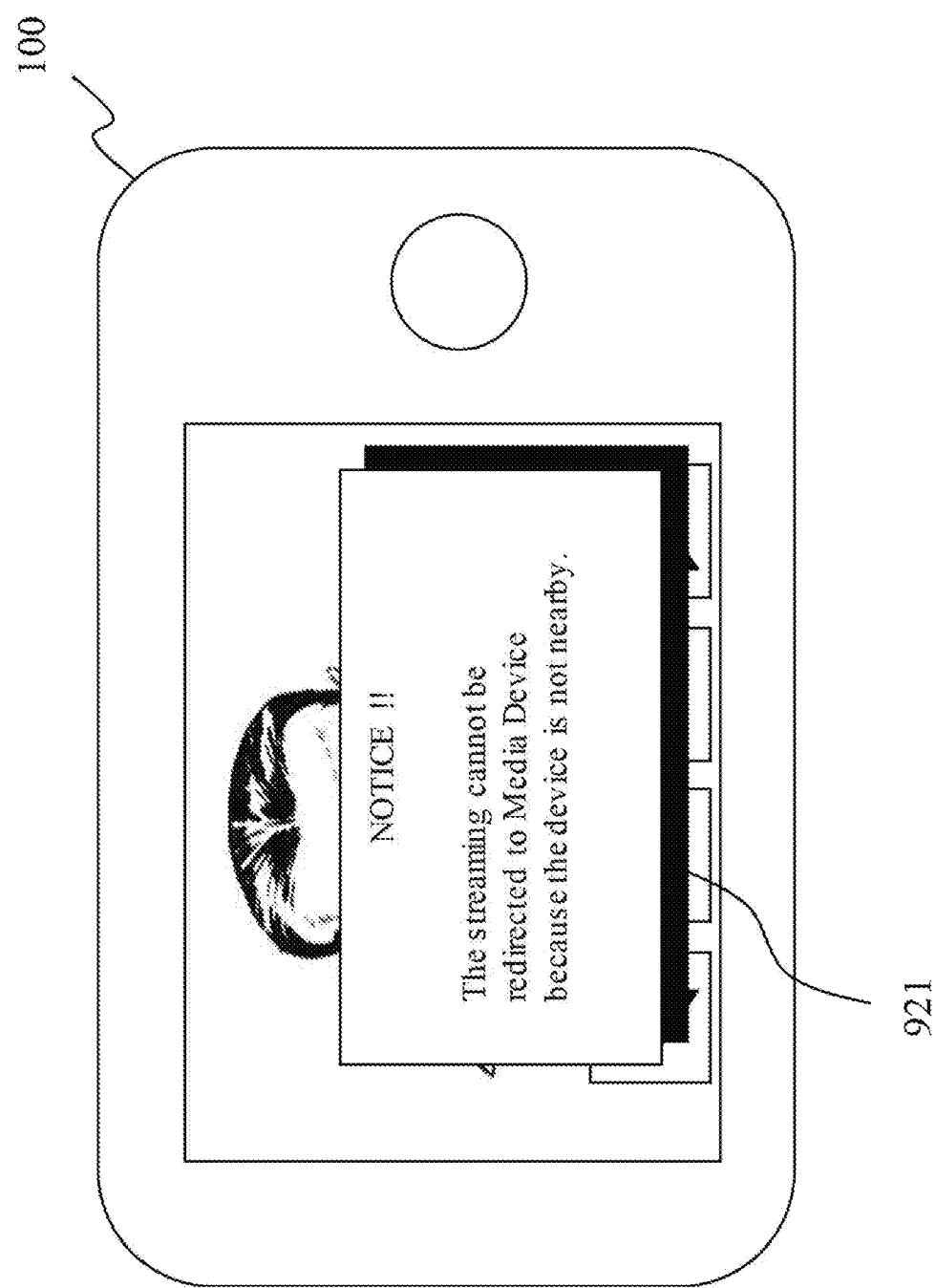
FIG. 54 illustrates a dialog displayed, at the computing device, for notifying the user of unavailability of streaming redirection.

If the media-playing device 200 is determined to be not near the computing device 100 (S2200: No), the computing device 100 does not send the request but displays, along with the graphical menu on the sensitive display 102, a dialog 921, as illustrated in FIG. 54, for notifying the user that the media-playing device 200 is far from the user and thus redirection of streaming is unavailable (S2805).

Third Aspect of Redirection

It is assumable that a media-playing device 200 may be far away from the computing device 100. Such case may occur, for example, when the user erroneously performs the predetermined operation when he/she is outside far away from his/her house where the media-playing device 200 is installed. In such situation, streaming should not be redirected from the computing device 100 to the media-playing device 200 because the user could not continue watching or listening to the media asset played at the media-playing device 200.

Therefore, in a third aspect of redirection, the cloud server computer 500 performs the redirection only when the media-playing device 200 is near the computing device 100.

Figure 49:
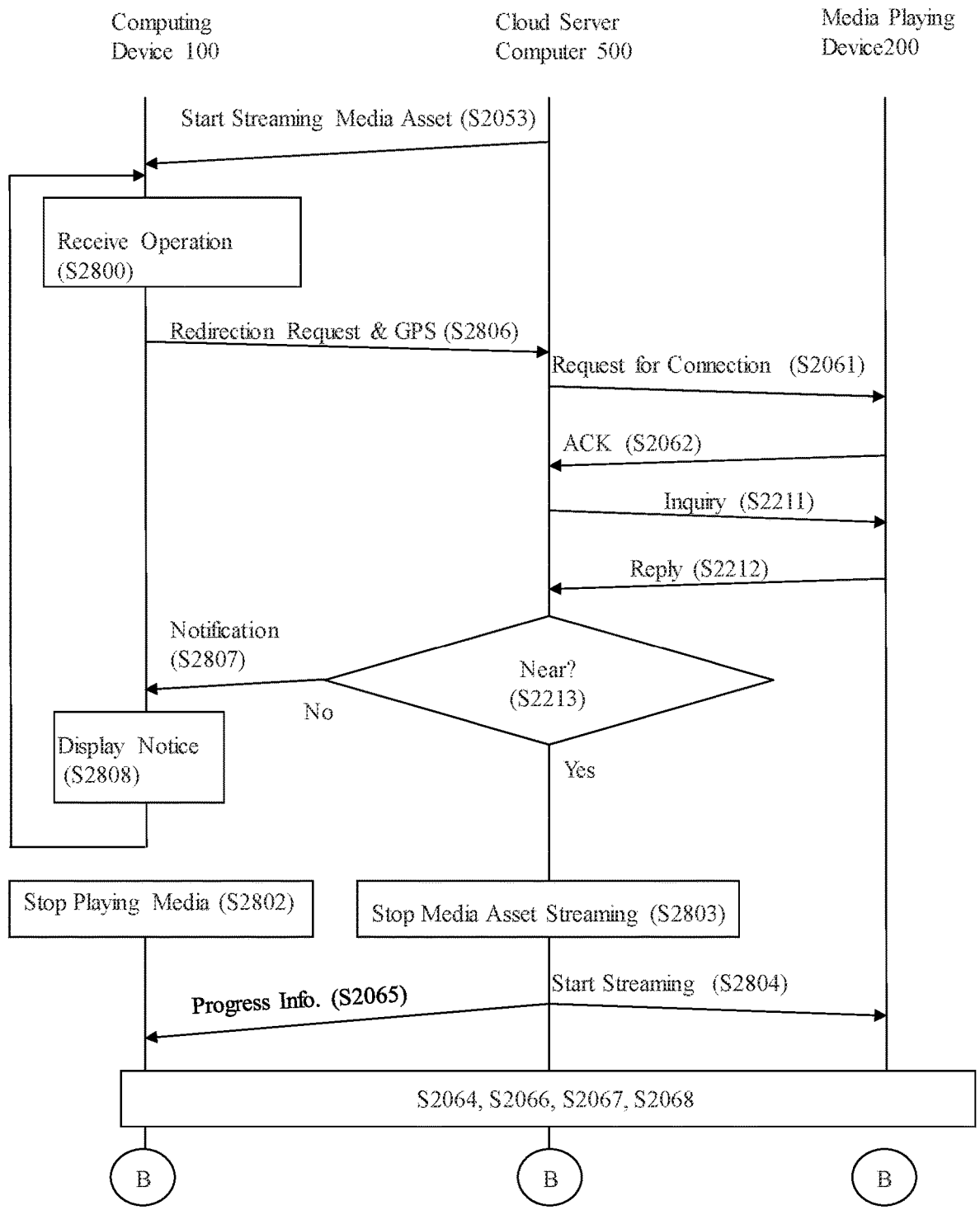
FIG. 49 is a flowchart illustrating operations performed by the computing device, the media-playing device, and the cloud server computer according to a third aspect of streaming redirection responsive to a user's operation.

FIG. 49 is a flowchart illustrating the third aspect of redirection of streaming. Some steps in the third aspect may be common to those in the first aspect. The common reference numbers may be used to refer to the common steps between the first and the third aspects.

In the third aspect, responsive to the predetermined operation (S2800), the computing device 100 acquires location information indicative of the location of the computing device 100 from the GPS circuitry 107, and sends the location information along with the request for redirection of streaming to the cloud server computer 500 (S2806).

Responsive to the location information and the request for redirection of streaming from the computing device 100, the cloud server computer 500 requests the media-playing device 200 for connection (S2061). Upon establishment of connection (S2062), the cloud server computer 500 sends to the media-playing device 200 an inquiry about the location of the media-playing device 200 (S2211).

Responsive to the inquiry, the media-playing device 200 acquires location information indicative of the location of the media-playing device 200 from the GPS circuitry 307, and sends the location information to the cloud server computer 500 (S2212).

Responsive to the location information from the media-playing device 200, the cloud server computer 500 determines whether or not the media-playing device 200 is near the computing device 100 by comparing the location information received from the computing device 100 and the media-playing device 200 (S2213). The determination may be made, for example, by determining whether or not the difference between the location indicated by the location information received by the media-playing device 200 and that indicated by the location information received by the computing device 100 is within a predetermined difference.

If the media-playing device 200 is determined to be near the computing device 100 (S2213: Yes), the cloud server computer 500 stops the ongoing streaming to the computing device 100 (S2803), and starts streaming the media asset to the media-playing device 200 (S2804).

On the other hand, if the media-playing device 200 is determined to be not near the computing device 100 (S2213: No), the cloud server computer 500, without stopping the ongoing streaming, sends to the computing device 100 a notification indicating that the media-playing device 200 is far from the user and thus the redirection is unavailable (S2807). Responsive to the notification, the computing device 100 displays, along with the graphical menu on the sensitive display 102, a dialog 921, as illustrated in FIG. 54, for notifying the user of the unavailability of redirection of streaming (S2808). After S2808, the GUI for media-asset information remains (S2030).

Fourth Aspect of Redirection

It is assumable that a plurality of media-playing devices 200 are registered in the device information 601 as illustrated in FIG. 32 or FIG. 34. In such case, it is preferable for a user to select a media-playing device 200 to which a streaming is redirected.

Therefore, in a fourth aspect of redirection, the cloud server computer 500 makes the computing device 100 allow a user to select a media-playing device 200 as the destination of redirection.

Figure 50:
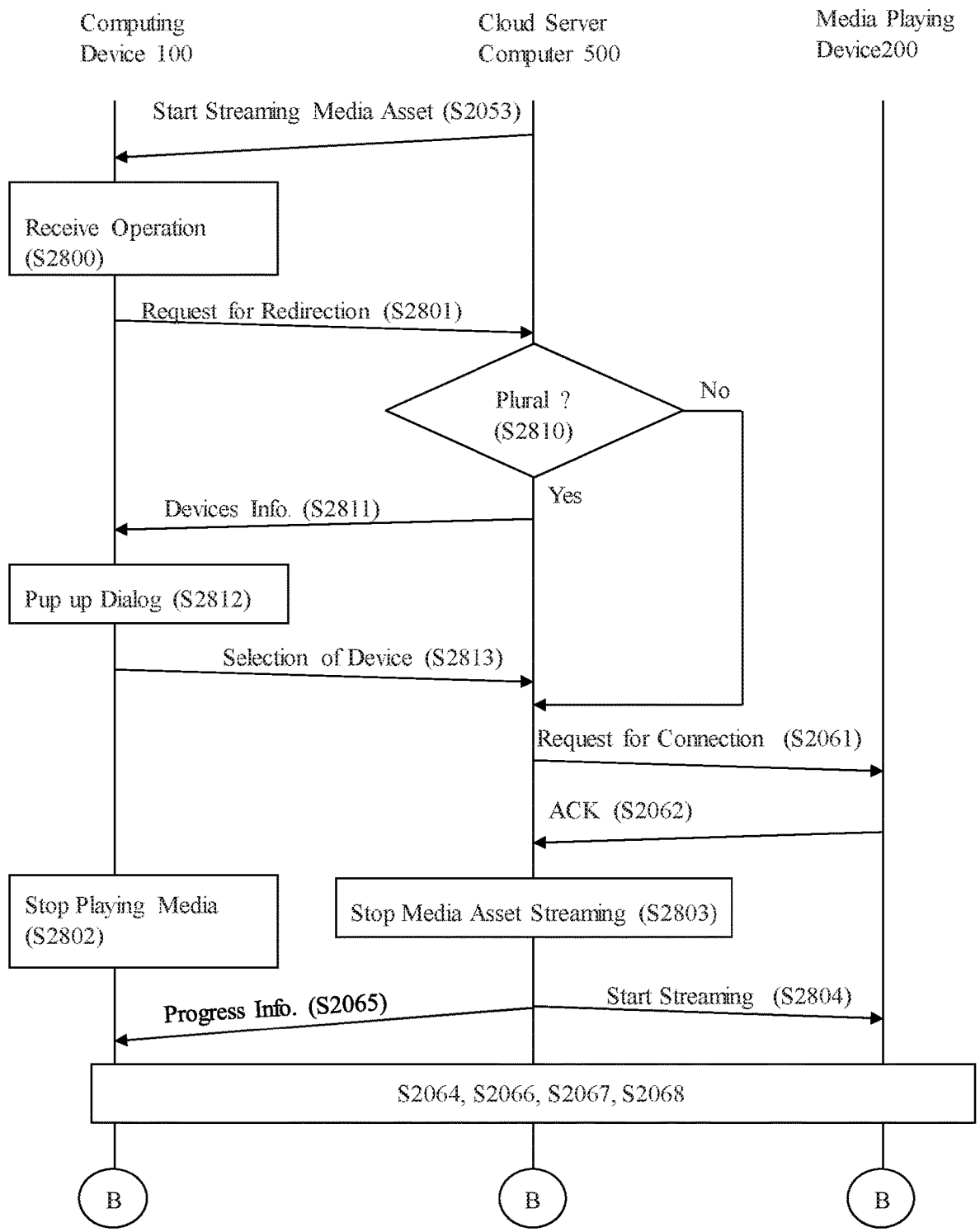
FIG. 50 is a flowchart illustrating operations performed by the computing device, the media-playing device, and the cloud server computer according to a fourth aspect of streaming redirection responsive to a user's operation.

FIG. 50 is a flowchart illustrating the fourth aspect of redirection of streaming. Some steps in the fourth aspect may be common to those in the first aspect. The common reference numbers may be used to refer to the common steps between the first and the fourth aspects.

In the fourth aspect, responsive to the request for redirection of streaming (S2801), the cloud server computer 500 determines whether or not the device information 601 registers a plurality of media-playing devices 200 associated with the computing device 100, with reference to the device information 601 (S2810).

Figure 55:
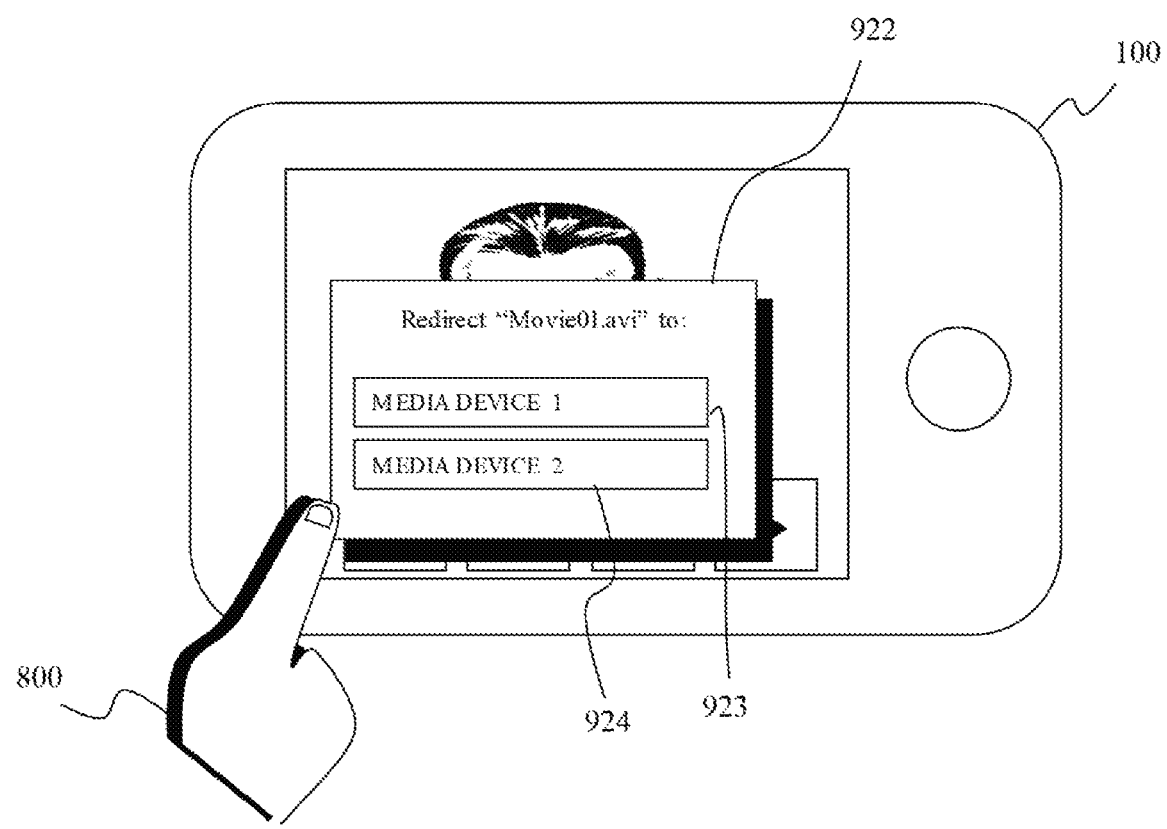
FIG. 55 illustrates a dialog displayed, at the computing device, for presenting devices registered in the device information for selection.

If a plurality of media-playing devices 200 are registered in the device information 601 (S2810: YES), the cloud server computer 500 sends the device information 601 to the computing device 100 (S2811). Responsive to the device information 601 sent from the cloud server computer 500, the computing device 100 displays, along with the graphical menu on the sensitive display 102, a dialog 922, as illustrated in FIG. 55, for presenting a list of the media-playing devices 200 registered in the device information 601 with reference to the device information 601 (S2812). The dialog 922 may contain tappable icons corresponding to the media-playing devices 200 for selection of one of the devices 200. For example, the dialog 922 illustrated in FIG. 55 contains icons 923 and 924 corresponding respectively to "Media Device 1" and "Media Device 2" registered in the device information 601 according to the example illustrated in FIG. 32 or FIG. 34. While displaying the dialog 922, the computing device 100 receives a user's selection of one of the presented devices 200 by way of tapping on one of the icons 923 and 934. Responsive to an icon being tapped, the computing device 100 sends to the cloud server computer 500 information indicative of a selected media-playing device 200 corresponding to the tapped icon (S2813).

Responsive to the information indicative of a selected media-playing device 200 from the computing device 100, the cloud server computer 500 sends a request to the selected media-playing device 200 for connection with the cloud server computing device 500 (S2061). Upon establishment of connection (S2062), the cloud server computer 500 stops the ongoing streaming of the media asset to the computing device 100 (S2803), and instead, starts streaming the media asset to the media-playing device 200 (S2804).

Back in S2810, if just one media-playing device 200 is registered in the device information 601 (S2810: NO), the cloud server computer 500 may connect to the media-playing device 200 soon without sending the device information 601 to the computing device 100.

Thanks to the fourth aspect of redirection, streaming of the selected media asset can be redirected to one of the registered media-playing devices 200 through which the user wants to enjoy the streaming.

Some modifications can be applied to the fourth aspect of redirection. For example, the cloud server computer 500 does not need to make the determination in S2810 before sending the device information 601 in S2811. Instead, the cloud server computer 500 may send the device information 601 to the computing device 100 regardless of whether a plurality of media-playing devices 200 are registered or just one media-playing device 200 is registered in the device information 601, in response to the request for redirection in S2801.

Fifth Aspect of Redirection

It is assumable that a plurality of media-playing devices 200 are registered in the device information 601 as illustrated in FIG. 32 or FIG. 34. In such case, it is preferable for a user to select a media-playing device 200 to which a streaming is redirected.

Therefore, in a fifth aspect of redirection, the computing device 100 allows a user to select a media-playing device 200 as the destination of redirection.

Figure 51:
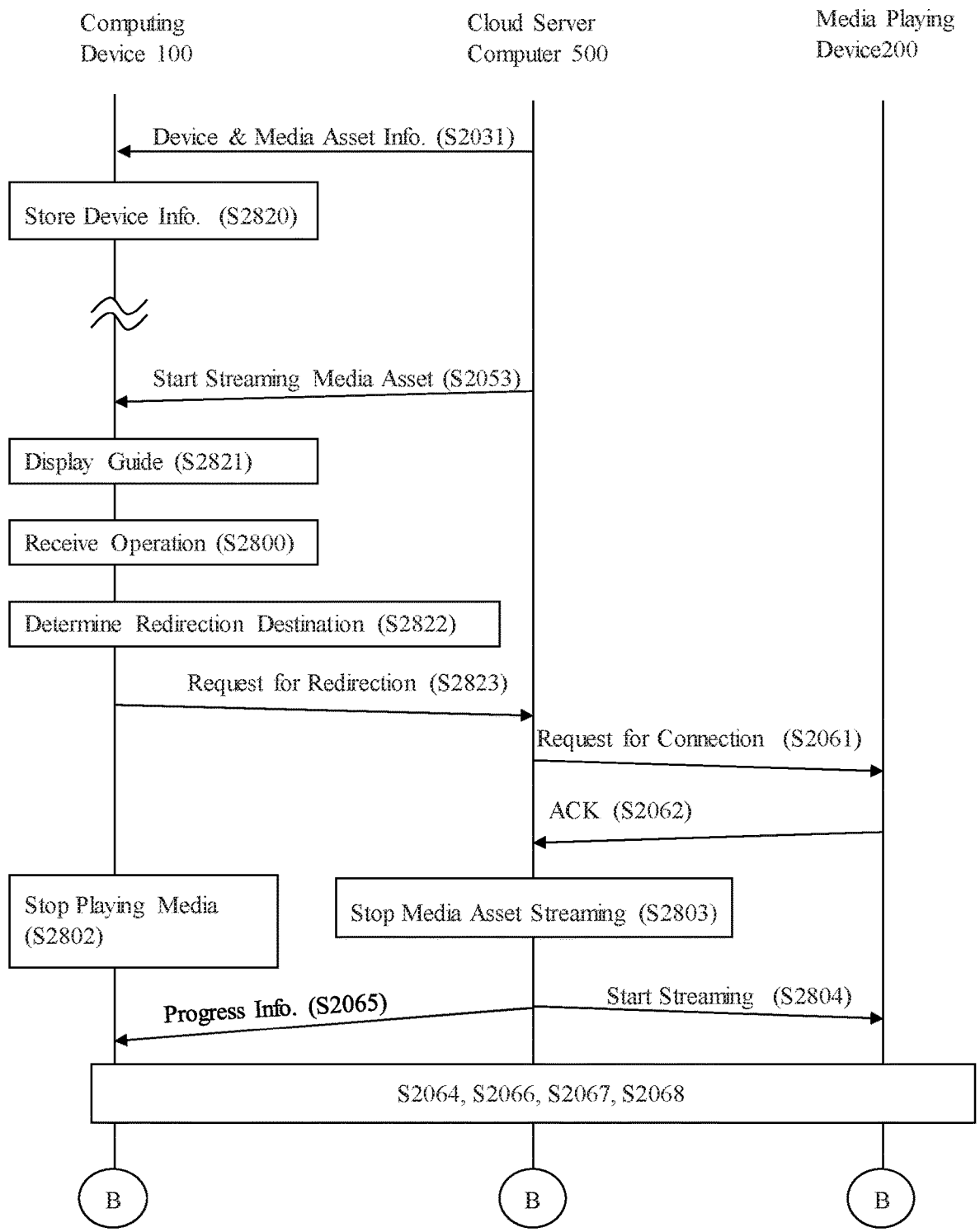
FIG. 51 is a flowchart illustrating operations performed by the computing device, the media-playing device, and the cloud server computer according to a fifth aspect of streaming redirection responsive to a user's operation.

FIG. 51 is a flowchart illustrating the fifth aspect of redirection of streaming. Some steps in the fifth aspect may be common to those in the first aspect. The common reference numbers may be used to refer to the common steps between the first and the fifth aspects.

In the fifth aspect, the computing device 100 preliminarily stores the device information 601 received in S2031 before the streaming was initiated, in the memory 104 (S2820).

Figure 57:
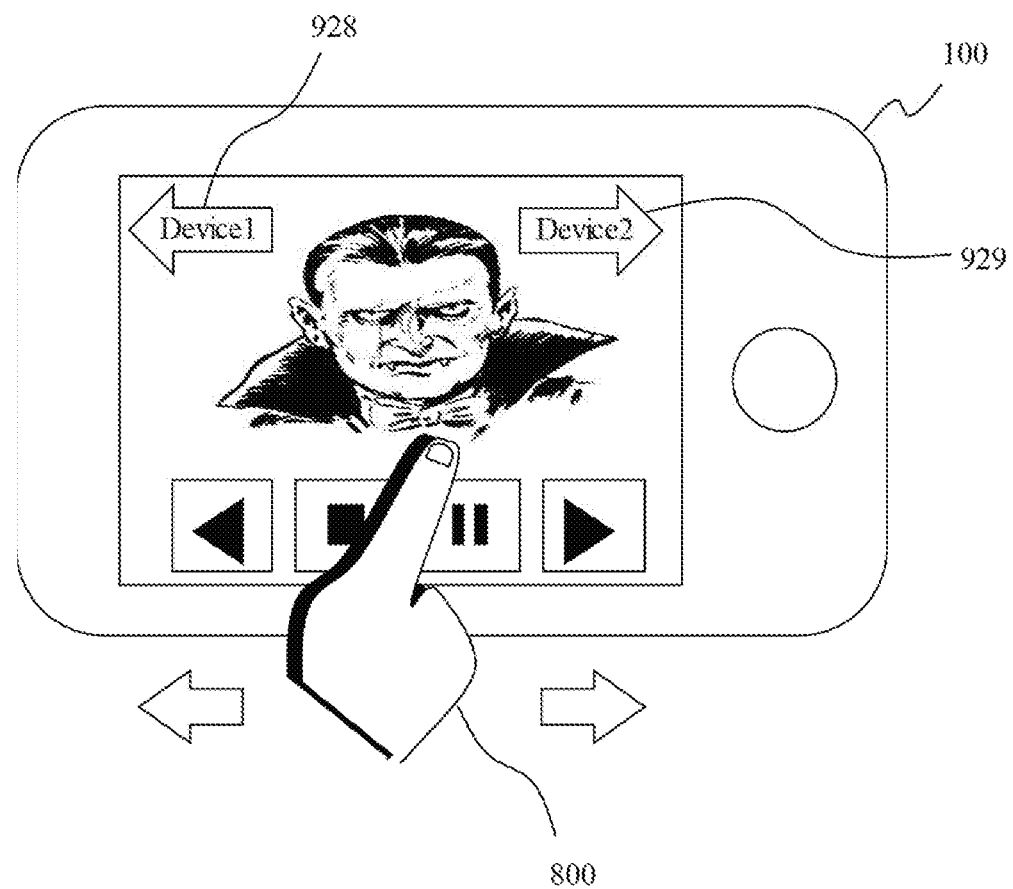
FIG. 57 illustrates guides displayed at the computing device and illustrates how the computing device receives the user's operation for redirection by way of the user's gesture.

While the streaming is ongoing to the computing device 100 (S2053), the computing device 100 generates one or more guides which are associated with one or more devices other than the computing device 100 registered in the device information 601 and which are also associated with given directions, to display the generated guides on the sensitive display 102 (S28221), with reference to the stored device information 601. In detail, each guide is associated with each media-playing device 200 registered in the device information 601. The guides are also associated with directions which are different from each other. Each direction represents the direction in which the movement of an object like the user's finger should be made to form a gesture for request for redirection. For example, with reference to the device information 601 as illustrated in FIG. 32 or FIG. 34, the computing device 100 may generate a first guide 928 associated with the left direction and with the "Media Device 1", and a second guide 929 associated with the right direction and with the "Media Device 2", to display the guides 928 and 929 as illustrated in FIG. 57. The guide 928 shows that a gesture consisting of a right-to-left "drag" or "flick" movement of an object like the user's finger 800 on or above the screen initiates the request for redirection to the "Media Device 1", whereas the guide 929 shows that a gesture consisting of a left-to-right "drag" or "flick" movement of an object like the user's finger 800 on or above the screen initiates the request for redirection to the "Media Device 2". The guides may be displayed along with the graphical menu on the screen as illustrated in FIG. 57.

While displaying the guides (S2821), the computing device 100 receives a user's operation of the gestures defined by the guides (S2822). In the example of FIG. 57, the computing device 100 receives the user's gestures of his/her finger 800 moving on or above the screen in the left or right directions.

Responsive to the user's operation received in S2822, the computing device 100 determines a media-playing device 200 as the destination of redirection (S2823). In the example of FIG. 57, the computing device 100 determines the "Media Device 1" to be the redirection destination responsive to receiving the user's gesture of moving his/her finger from the right to the left on or above the screen, whereas the computing device 100 determines the "Media Device 2" to be the redirection destination responsive to receiving the user's gesture of moving his/her finger from the left to the right on or above the screen.

Then, the computing device 100 sends to the cloud server computer 500 a request for redirection to the determined media-playing device 200, namely, the "Media Device 1" or the "Media Device 2" in the example of FIG. 57.

Responsive to the request, the cloud server computer 500 establishes connection with the requested media-playing device 200 (S2061, S2062). Upon establishment of connection, the cloud server computer 500 stops the ongoing streaming to the computing device 100 (S2803), and instead starts streaming the media asset to the connected media-playing device 200 (S2804).

Modifications

Some modifications may be applied to the above aspects of redirection of streaming. For example, although the aspects illustratively show that the cloud server computer 500 performs the redirection when the media asset is streamed to the computing device according to S2053, the cloud server computer 500 may perform the redirection when the media asset is streamed to the media-playing device 200 according to S2063 as well.

In one modified aspect, as well as in the first aspect, the cloud server computer 500 may receive the request for redirection (S2801) sent from the computing device 100 responsive to the predetermined operation (S2800) while the streaming is ongoing to the media-playing device 200 (S2063). Responsive to the request, the cloud server computer 500 may stop the ongoing streaming and instead start streaming the media asset to the computing device 100.

Figure 56:
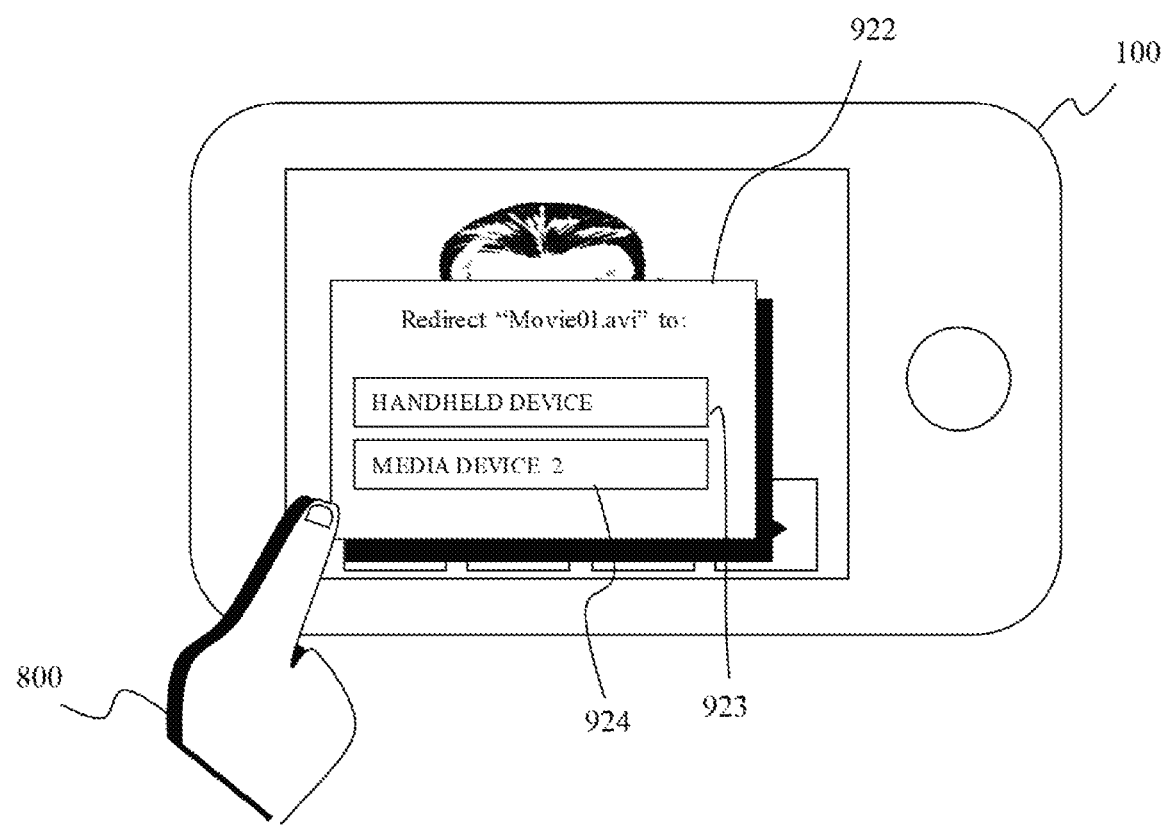
FIG. 56 illustrates a dialog displayed, at the computing device, for presenting devices registered in the device information for selection.

In another modified aspect, as well as the fourth aspect, the cloud server computer 500 may receive the request for redirection (S2801) sent from the computing device 100 responsive to the predetermined operation (S2800) while the streaming is ongoing to the media-playing device 200 (S2063). Responsive to the request, the cloud server computer 500 may send the device information 601 to the computing device 100 (S2811) so that the computing device 100 may display the dialog for selection of the computing device 100 or another media-playing device 200 if any, other than the media-playing device 200 to which the streaming is ongoing, with reference to the device information 601 (S2812). For example, the computing device 100 may display the dialog 922 containing the icon 923 representing the "Handheld Device" and the icon 924 representing the "Media Device 2" as illustrated in FIG. 56, with reference to the device information according to the example as illustrated in FIG. 32 or FIG. 34. Then, responsive to receiving information indicating that the computing device 100 is selected (S2813), the cloud server computer 500 may stop the ongoing streaming and instead start streaming the media asset to the computing device 100. Or, responsive to receiving information indicating that said another media-playing device 200 is selected (S2813), the cloud server computer 500 may stop the ongoing streaming and instead start streaming the media asset to said another media-playing device 200.

Figure 58:
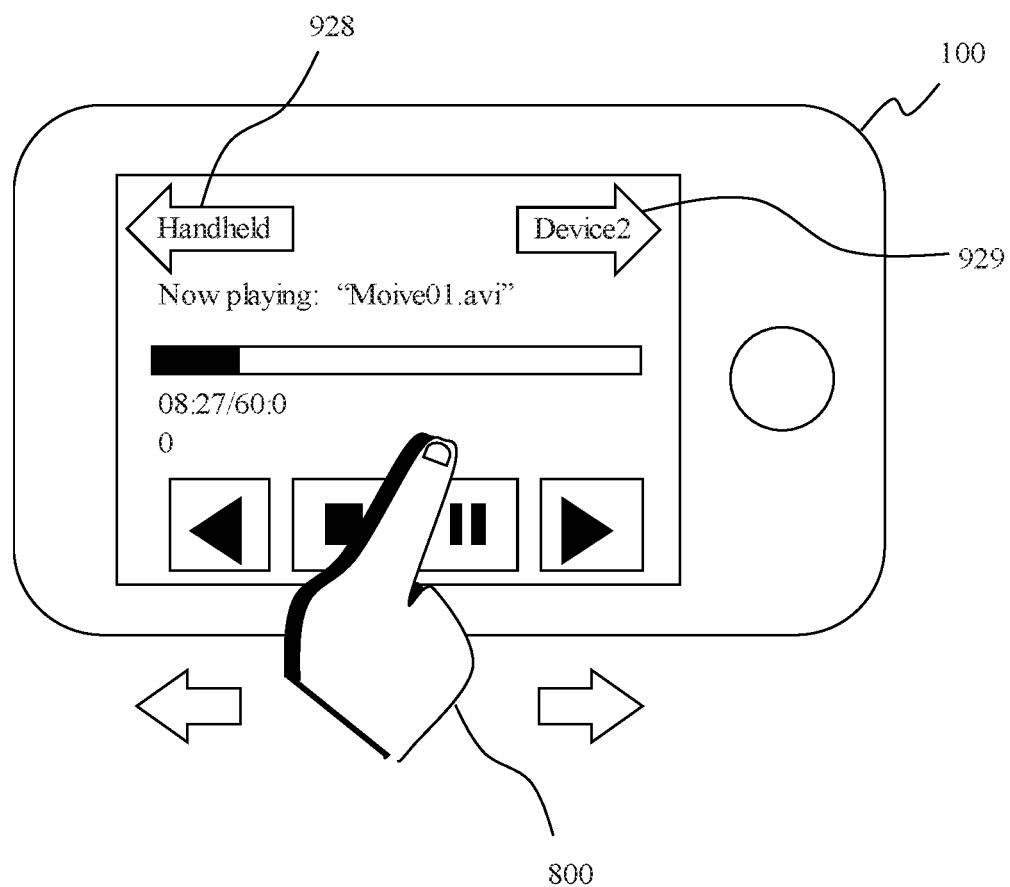
FIG. 58 illustrates guides displayed at the computing device and illustrates how the computing device receives the user's operation for redirection by way of the user's gesture.

In further another modified aspect, as well as in the fifth aspect, the computing device 100 may display the guides with reference to the device information 601 preliminarily stored in the memory 104 while the streaming is ongoing to the media-playing device 200 (S2821). The guides may be associated with the computing device 100 and another media-playing device 200 if any, other than the media-playing device 200 to which the streaming is ongoing. For example, the guide 928 associated with the computing device 100 and the guide 929 associated with said another media-playing device 200 may be displayed as illustrated in FIG. 58, with reference to the device information 601 according to the example as illustrated in FIG. 32 or FIG. 34. Then, responsive to receiving the request for redirection to the computing device 100 determined in S2822 based on the right-to-left movement gesture (S2823), the cloud server computer 500 may stop the ongoing streaming and instead start streaming the media asset to the computing device 100. Or, responsive to receiving the request for redirection to said another media-playing device 200 determined in S2822 based on the left-to-right movement gesture (S2823), the cloud server computer 500 may stop the ongoing streaming and instead start streaming the media asset to said another media-playing device 200.

Operation During Streaming

While the media asset streaming is in progress in accordance with one of the first to tenth aspects of streaming, the cloud server computer 500 can operate the streaming responsive to a request from the computing device 100 (S2057, S2068). Details of the operation are described below.

Figure 35:
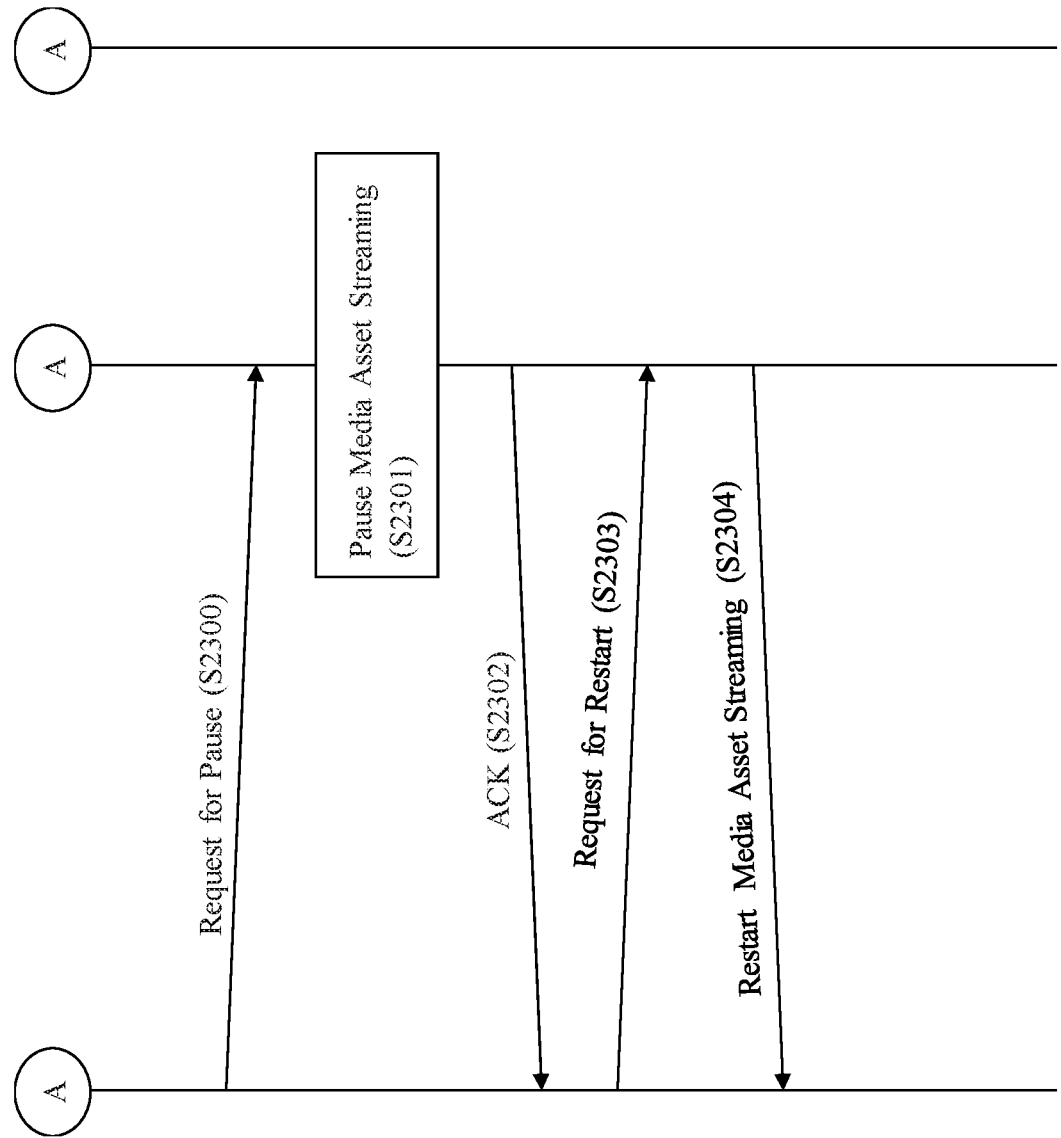
FIG. 35 is a flowchart illustrating operations performed by the computing device and the cloud server computer for pausing streaming while the streaming is in progress to the computing device.
Figure 36:
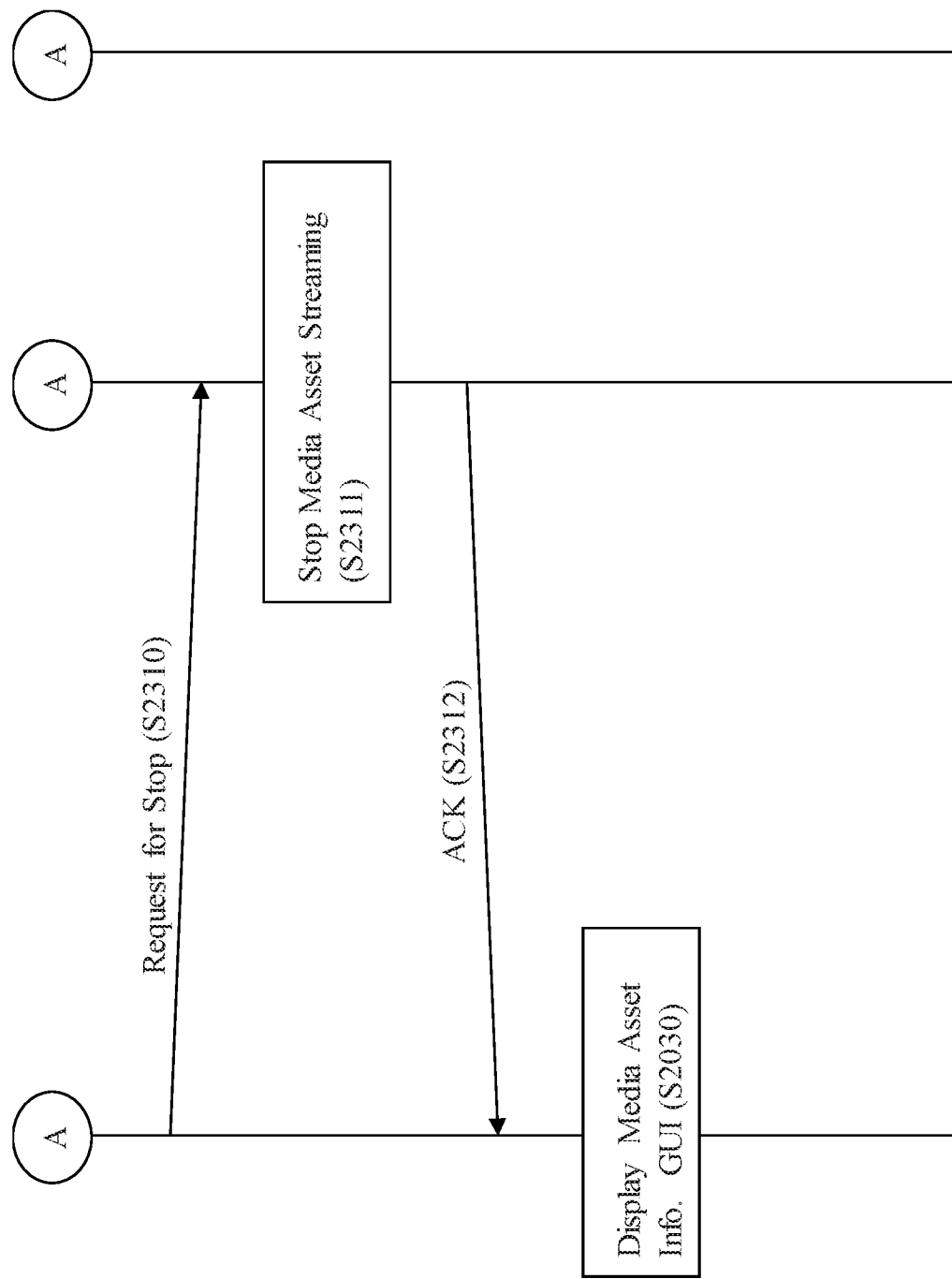
FIG. 36 is a flowchart illustrating operation performed by the computing device and the cloud server computer for stopping streaming while the streaming is in progress to the computing device.

FIGS. 35 and 36 are flowcharts illustrating how the cloud server computer 500 operates while streaming is in progress to the computing device 100 according to S2053.

While the media asset is streamed to the computing device 100 according to S2053, in case of response to the request for pause of the streaming by way of the icon 902 being tapped in S2056 (S2300), the cloud server computer 500 pauses the ongoing streaming (S2301) The cloud server computer 500 then sends an acknowledgement to the computing device 100 (S2302). After the acknowledgement, the computing device 100 can send to the cloud server computer 500 for restart of the paused streaming responsive to the icon 902 being tapped (S2303). Responsive to the request for restart, the cloud server computer 500 then restarts the streaming of the media asset again (S2304).

In case of response to the request for stop of the streaming by way of the icon 901 being tapped in S2056 (S2310), the cloud server computer 500 stops the ongoing streaming (S2311). The cloud server computer 500 then sends an acknowledgement to the computing device 100 (S2312).

Responsive to the acknowledgement, the computing device 100 returns to S2030, namely, starts displaying the GUI for media-asset information again as illustrated in FIG. 8E (S2030).

Figure 37:
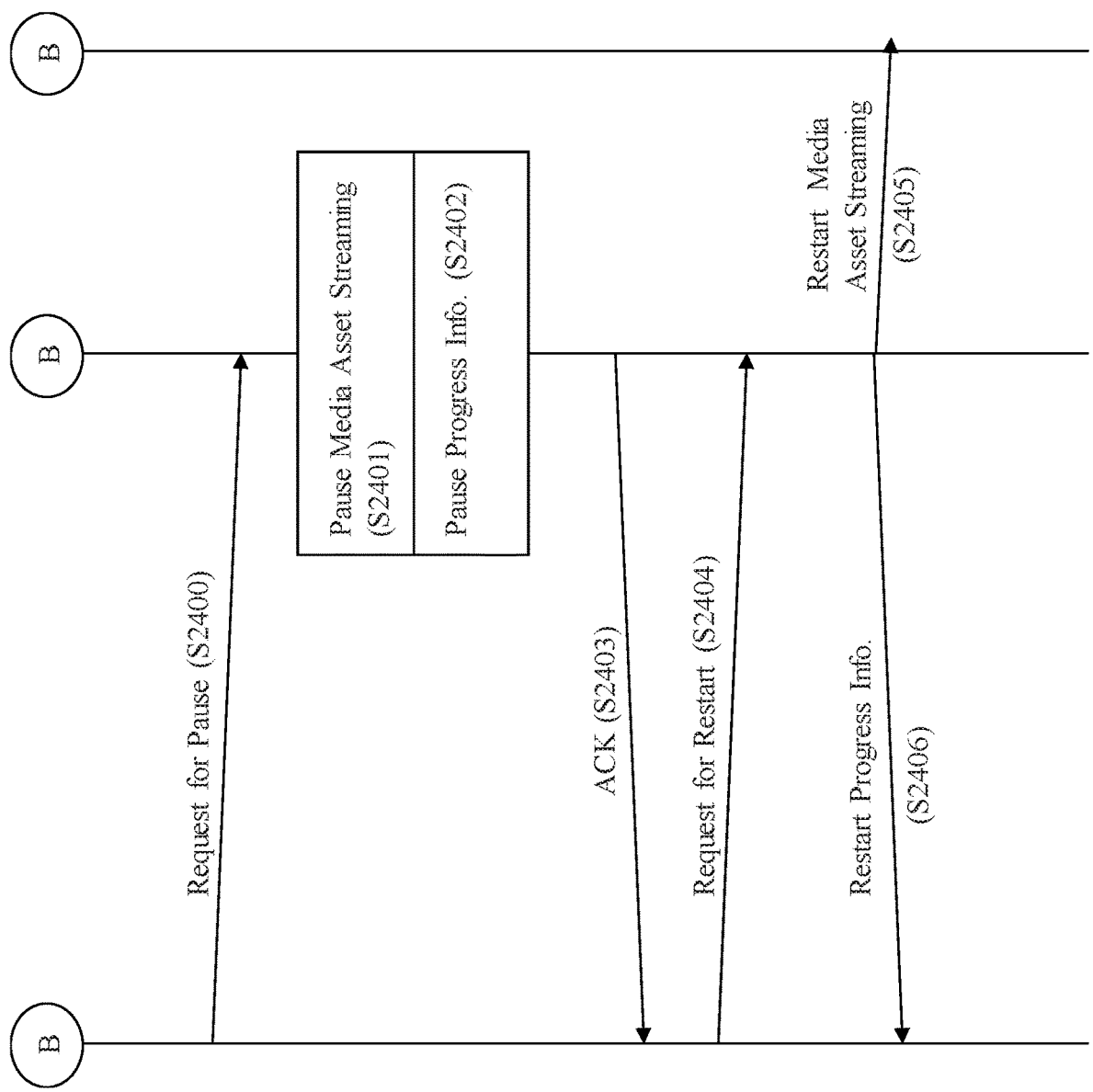
FIG. 37 is a flowchart illustrating operation performed by the computing device, the media-playing device, and the cloud server computer for pausing streaming while the streaming is in progress to the media-playing device.
Figure 38:
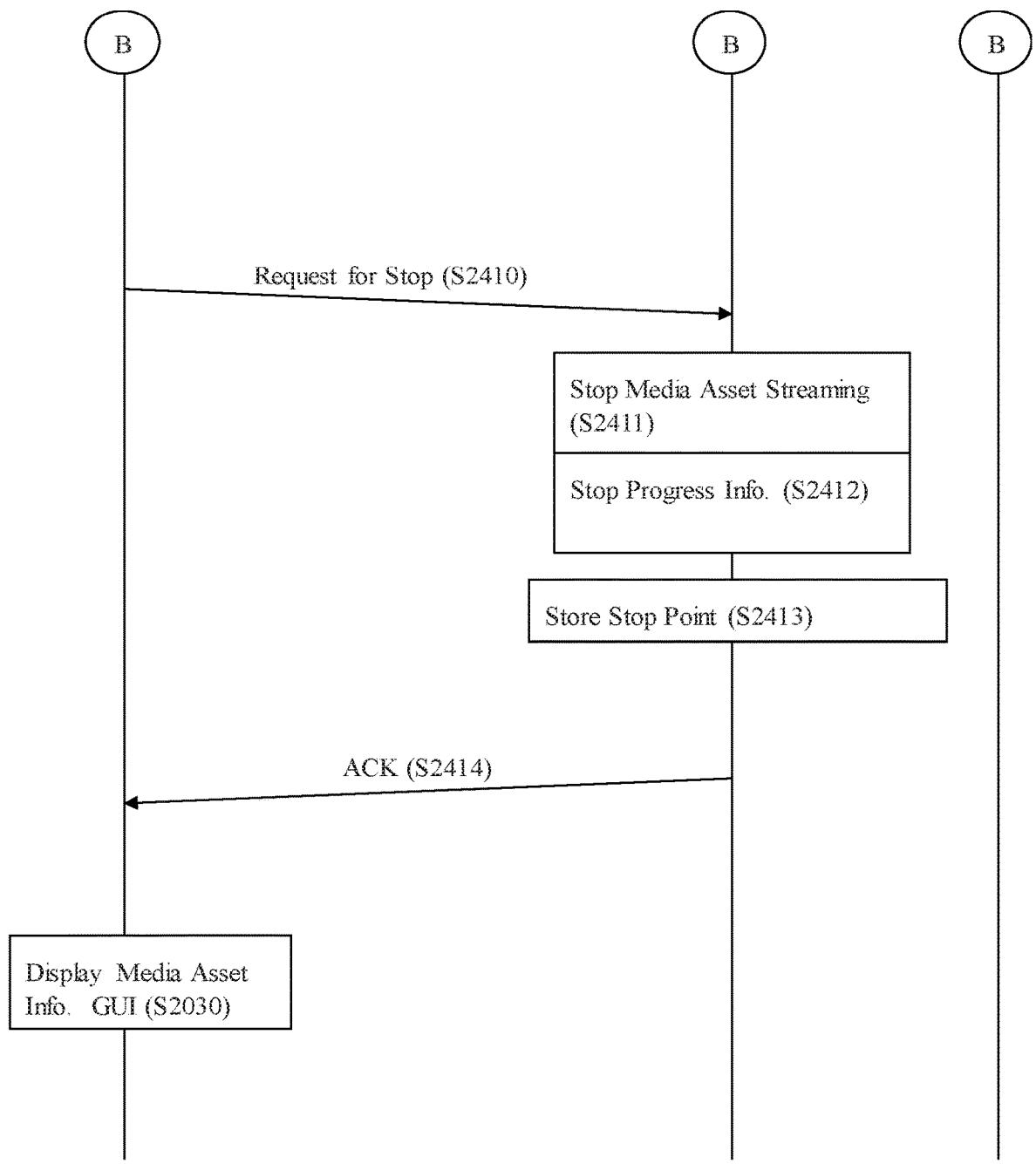
FIG. 38 is a flowchart illustrating operation performed by the computing device, the media-playing device, and the cloud server computer for stopping streaming while the streaming is in progress to the media-playing device.

FIGS. 37 and 38 are flowcharts illustrating how the cloud server computer 500 operates while streaming is in progress to the media-playing device 200 according to S2063 or S2804.

While the media asset is streamed to the media-playing device 200 according to S2063 or S2804, in case of response to the request for pause of the streaming by way of the icon 902 being tapped in S2067 (S2400), the cloud server computer 500 pauses the ongoing streaming (S2401) and pauses the transmission of intermittent progress information to the computing device 100 (S2402). Upon pausing the streaming and the intermittent progress information (S2401, S2402), the cloud server computer 500 sends an acknowledgement to the computing device 100 (S2403). After the acknowledgement, the computing device 100 can send to the cloud server computer 500 for restart of the paused streaming responsive to the icon 902 being tapped again (S2404). Responsive to the request for restart, the cloud server computer 500 restarts the streaming of the media asset again to the media-playing device 200 (S2405) as well as restarts the transmission of intermittent progress information to the computing device 100 (S2406).

In case of response to the request for stop of the streaming by way of the icon 901 being tapped in S2067 (S2410), the cloud server computer 500 stops the ongoing streaming (S2411) and stops the transmission of intermittent progress information (S2412). Upon stopping the streaming and the intermittent progress information (S2411, S2412), the cloud server computer 500 stores a stop point indicative of a temporal or chronological point at which the streaming is stopped within the duration of the media asset (S2413). The cloud server computer 500 stores the stop point in association with the stopped media asset as the user data 600 corresponding to the logged-in user ID. The cloud server computer 500 will start streaming of the once-stopped media asset at the stop point stored in association with the media asset responsive to request for streaming the once-stopped media asset again from the computing device 100. Assuming that the streaming is stopped at the moment illustrated in FIG. 28, the cloud server computer 500 stores a stop point indicative of eight minutes and twenty-seven seconds within the sixty minute duration in association with "Movies01.avi" as the user data 600 of the user ID 001, and the cloud server computer 500 will start streaming "Movies01.avi" at eight minutes and twenty-seven seconds responsive to request for streaming "Movie01.avi" again from the computing device 100.

Also, upon stopping the streaming and the intermittent progress information (S2411, S2412), the cloud server computer 500 sends an acknowledgement to the computing device 100 (2414). Responsive to the acknowledgement, the computing device 100 returns to S2030, namely, starts displaying the GUI for media-asset information again as illustrated in FIG. 8E (S2030).

Connection Monitoring

Figure 39:
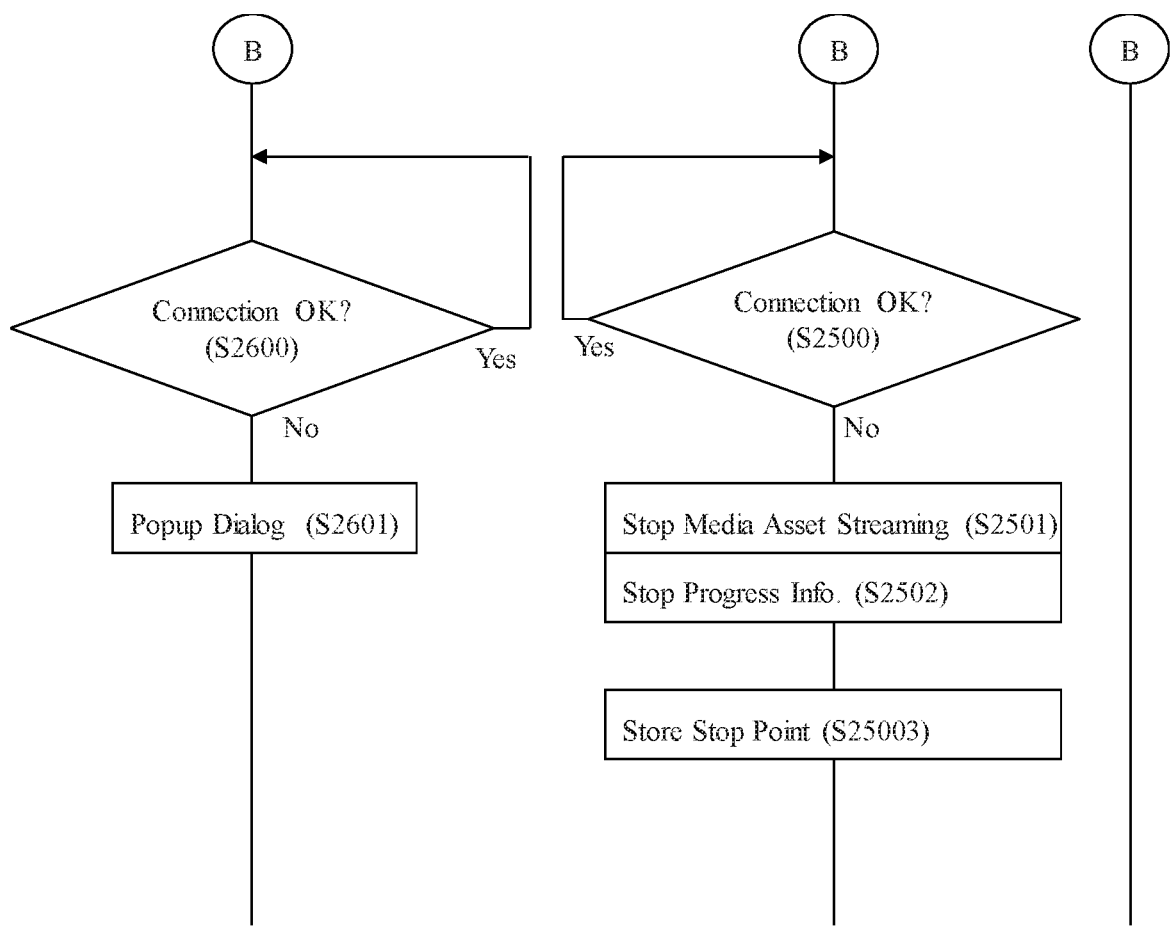
FIG. 39 is a flowchart illustrating operation performed by the computing device and the cloud server computer for monitoring connection.

While streaming the media asset according to S2063 or S2804, in addition to the streaming to the media-playing device 200, the cloud server computer 500 may continuously monitor connection between the cloud server computer 500 and the computing device 100, as illustrated in FIG. 39 (S2500). The monitoring of connection may be made by, for example, sending polling signals intermittently from the cloud server computer 500 to the computing device 100. As long as the cloud server computer 500 receives an acknowledgement from the computing device 100 in reply to the polling signals, the cloud server computer 500 determines that the connection is kept established between the computing device 100 and the cloud server computer 500. If the cloud server computer 500 does not receive an acknowledgement from the computing device 100 in reply to the polling signals, the cloud server computer 500 determines that the computing device 100 and the cloud server computer 500 have been disconnected from each other for some reason. Note that the cloud server computer 500 may become disconnected from the computing device 100 if, for example, the computing device 100 has been powered off or has been carried by the user to some place where the computing device 100 cannot wirelessly communicate over the network 400 via the communication circuitry 103.

Responsive to determining that the cloud server computer 500 and the computing device 100 have been disconnected from each other (S2500: No), the cloud server computer 500 stops the ongoing streaming of the media asset (S2501) and stops the transmission of intermittent progress information (S2502). Upon stopping the streaming and the intermittent progress information (S2501, S2502), the cloud server computer 500 stores a stop point indicative of a temporal or chronological point at which the streaming is stopped within the duration of the media asset (S2503). The cloud server computer 500 stores the stop point in association with the stopped media asset as the user data 600 corresponding to the logged-in user ID The cloud server computer 500 will start streaming of the once-stopped media asset at the stop point stored in association with the media asset responsive to request for streaming the once-stopped media asset again from the computing device 100. Assuming that the streaming is stopped at the moment illustrated in FIG. 28, the cloud server computer 500 stores a stop point indicative of eight minutes and twenty seven seconds within the sixty minute duration in association with "Movies01.avi" as the user data 600 of the user ID 001, and the cloud server computer 500 will start streaming "Movies01.avi" at the time of eight minutes and twenty seven seconds responsive to request for streaming "Movie01.avi" again from the computing device 100.

Thanks to S2500 through S2503, if the cloud server computer 500 becomes unable to receive requests from the computing device 100 and so the streaming of the media asset may become out of control, the streaming automatically stops. Accordingly, the media asset can be avoided from being streamed out of control in case of some communication trouble between the computing device 100 and the cloud server computer 500.

Similar to the cloud server computer 500, the computing device 100 may also continuously monitor connection between the computing device 100 and the cloud server computer 500, as illustrated in FIG. 39 (S2600). The monitoring of connection may be made by, for example, determining reception of the progress information intermittently sent from the cloud server computer 500. As long as the computing device 100 succeeds in receiving the progress information, the computing device 100 may determine the connection is kept established between the computing device 100 and the cloud server computer 500. If the computing device 100 fails to receive the progress information, the computing device 100 may determine that the computing device 100 and the cloud server computer 500 have been disconnected from each other for some reason.

Figure 41:
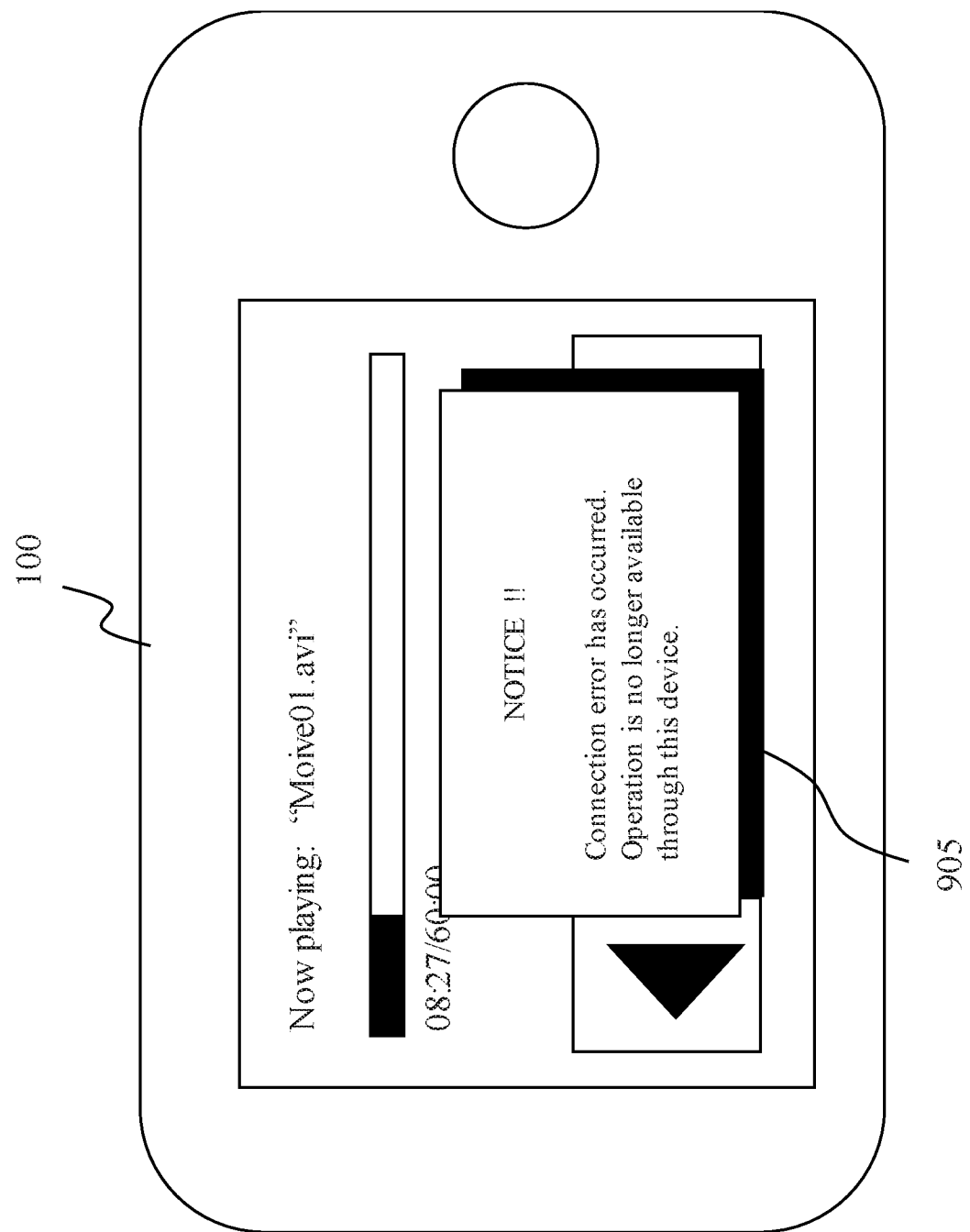
FIG. 41 illustrates how a dialog is displayed, at the computing device, for notifying the user of disconnection between the computing device and the cloud server computer.

Responsive to determining that the cloud server computer 500 and the computing device 100 have been disconnected from each other (S2600: No), the computing device 100 displays a dialog 905 for notifying the user of the disconnection and that the user can no longer operate the streaming through the computing device 100, as illustrated in FIG. 41 (S2601).

Figure 40:
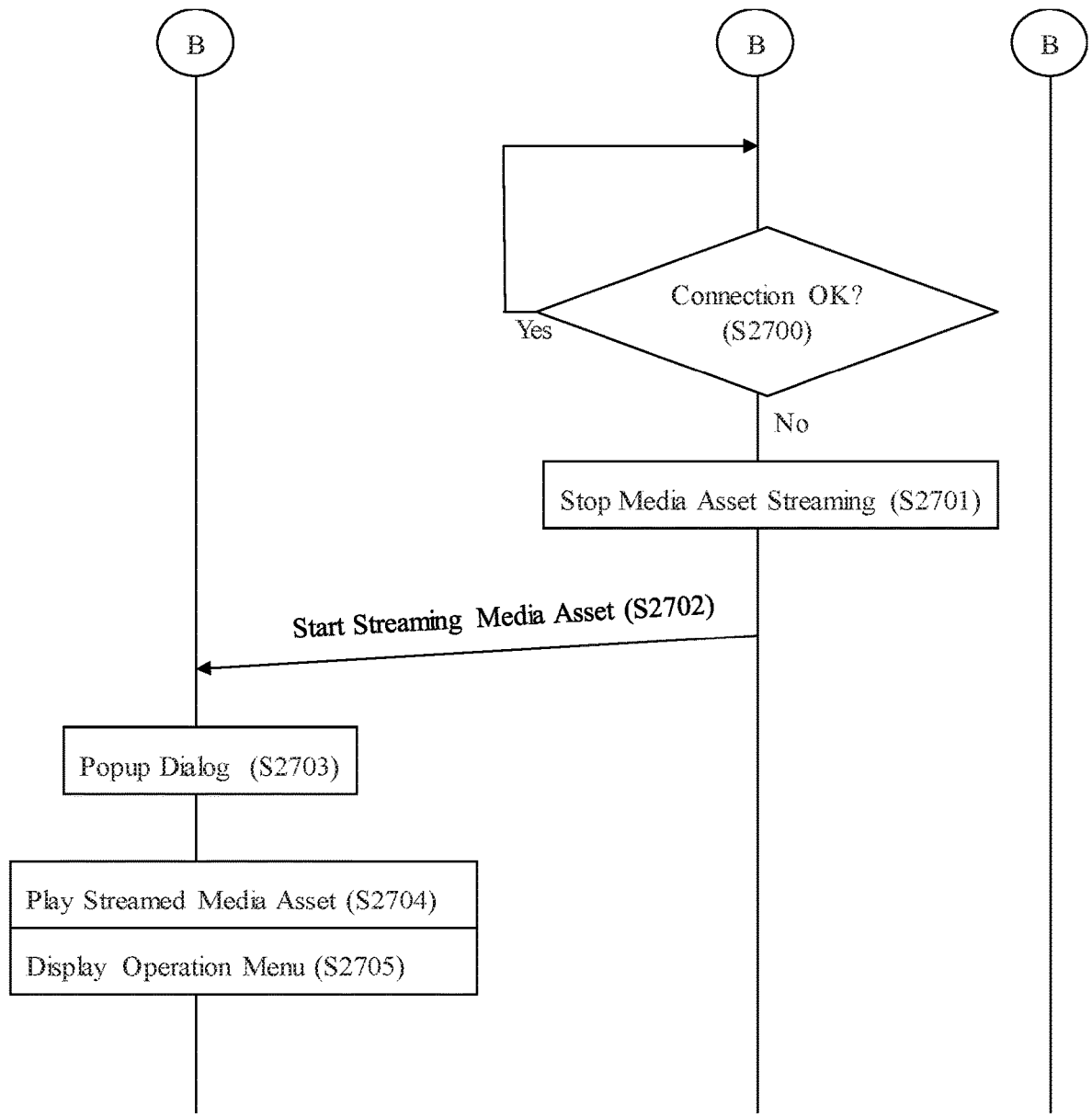
FIG. 40 is a flowchart illustrating operation performed by the computing device and the cloud server computer for redirecting streaming in case of disconnection between the cloud server computer and the media-playing device.

Further, while streaming the media asset according to S2063 or S2804, in addition to the streaming to the media-playing device 200, the cloud server computer 500 may continuously monitor connection between the cloud server computer 500 and the media-playing device 200, as illustrated in FIG. 40 (S2700). The monitoring of connection may be made by, for example, receiving acknowledgements responsive to the streaming of the media asset from the media-playing device 200, or by sending polling signals intermittently from the cloud server computer 500 to the media-playing device 200. As long as the cloud server computer 500 receives an acknowledgement in reply to the streaming or to the polling signals from the media-playing device 200, the cloud server computer 500 may determine that the connection is kept established between the media-playing device 200 and the cloud server computer 500. If the cloud server computer 500 does not receive an acknowledgement in reply to the streaming or polling signals from the media-playing device 200, the cloud server computer 500 may determine that the media-playing device 200 and the cloud server computer 500 have been disconnected from each other for some reason. Note that the cloud server computer 500 may become disconnected from the media-playing device 200 if, for example, the media-playing device 200 has been powered off, or a LAN cable has been removed from the communication circuitry 302.

Responsive to determining that the cloud server computer 500 and the media-playing device 200 have been disconnected from each other (S2700: No), the cloud server computer 500 stops the ongoing streaming of the media asset to the media-playing device 200 (S2701), and instead, starts streaming the media asset to the computing device 100 (S2702). In other words, the cloud server computer 500 redirects the streaming from the media-playing device 200 to the computing device 100. More specifically, in S2702, the cloud server computer 500 starts streaming the media asset at a temporal or chronological point at which the streaming has been stopped within the duration of the media asset in S2701.

Figure 42:
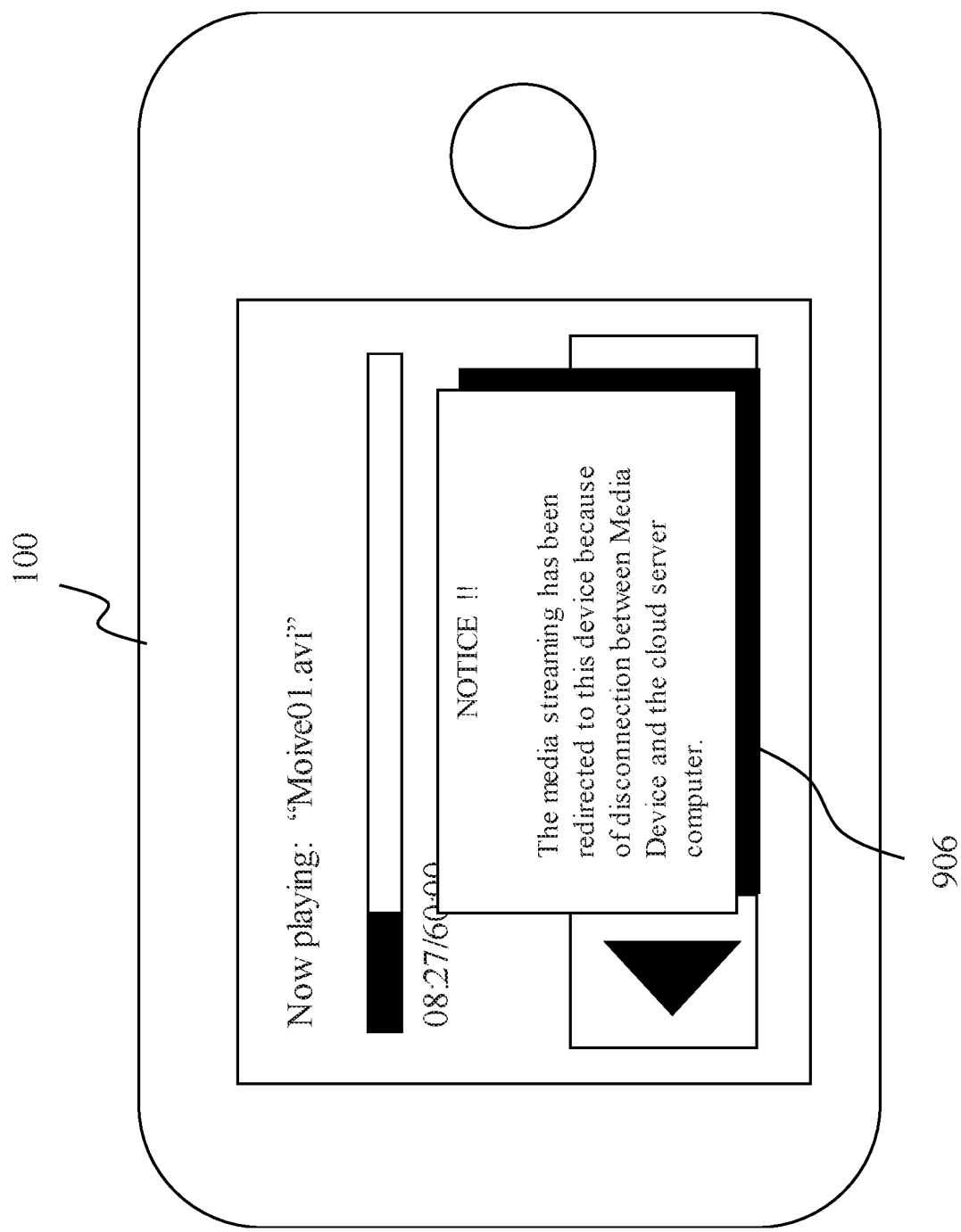
FIG. 42 illustrates how a dialog is displayed, at the computing device, for notifying the user of redirection of streaming.

Responsive to the redirection, the computing device 100 pops up a dialog 906 for notifying the user of the redirection as illustrated in FIG. 42 (S2703), and then starts playing the streamed media asset (S2704) as well as starts displaying the operation menu (S2705) as illustrated in FIG. 27.

Thanks to S2700 through S2705, if the media-playing device 200 becomes unable to receive streamed media asset, the streaming can be recovered at the computing device 100. Accordingly, the user can continue to enjoy playing the media asset in case of some communication trouble between the media-playing device 200 and the cloud server computer 500.

Detailed Embodiments of Media Playing Device

The media-playing device 200 can be embodied in any manner as long as it is configured to play media assets.

Figure 29:
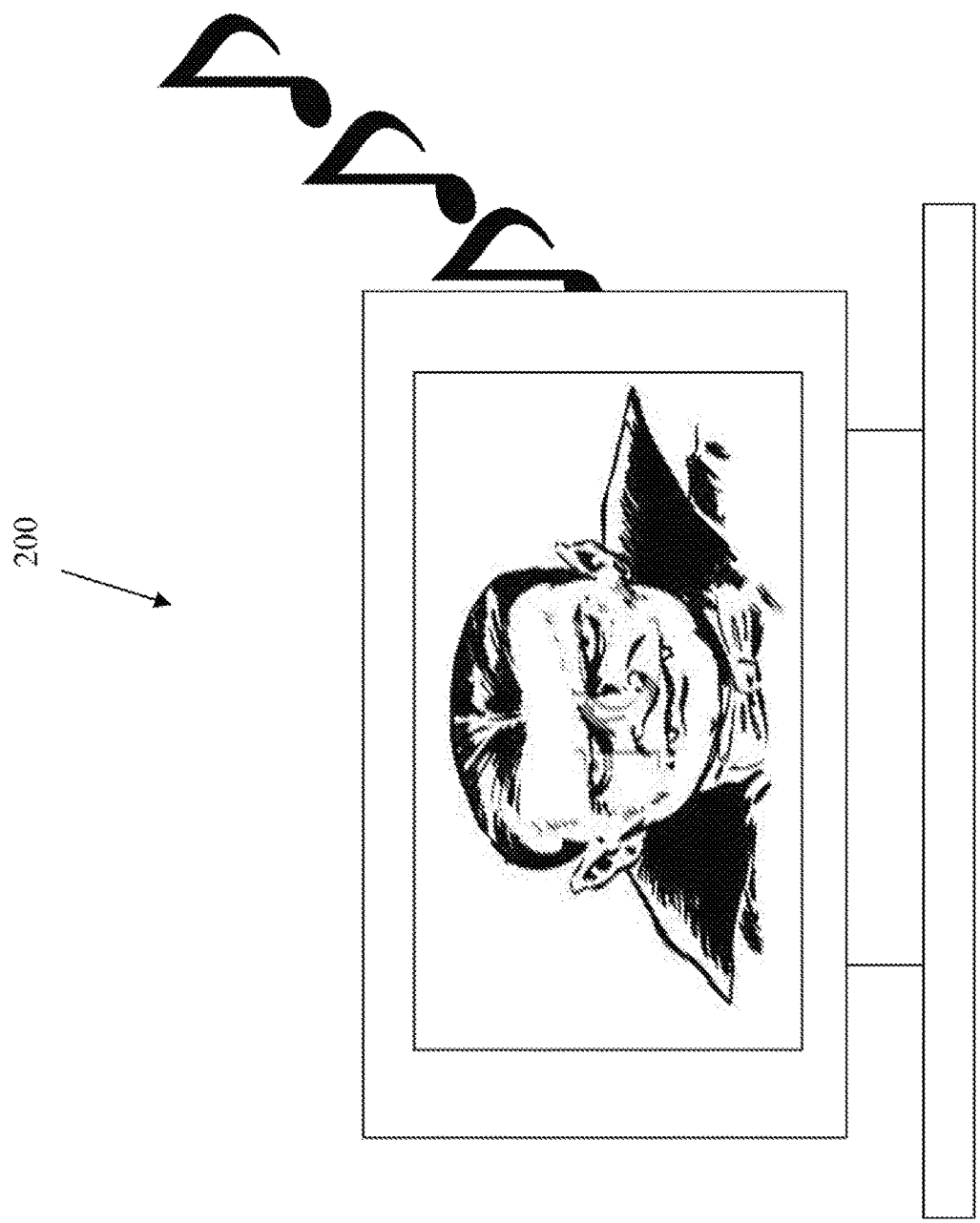
FIG. 29 illustrates how a streamed visual media asset is played and output at the media-playing device if the media-playing device has a display unit and a loudspeaker unit.

For example, as illustrated in FIG. 29, the media-playing device 200 may be a desktop television having a display unit and a loudspeaker unit as the output unit 303. The display unit may display graphics and video generated as a result of visual media assets being played at the processor 301, whereas the loudspeaker unit may output sound generated as a result of audio media assets being played at the processor 301. In the example of FIG. 29, the desktop television 200 is displaying video of the media asset "Movie01.avi" on the display unit as well as outputting sound of the media asset "Movie01.avi" from the loudspeaker unit, the video and the sound both being generated as a result of the media asset "Movie01.avi" being played.

Figure 30:
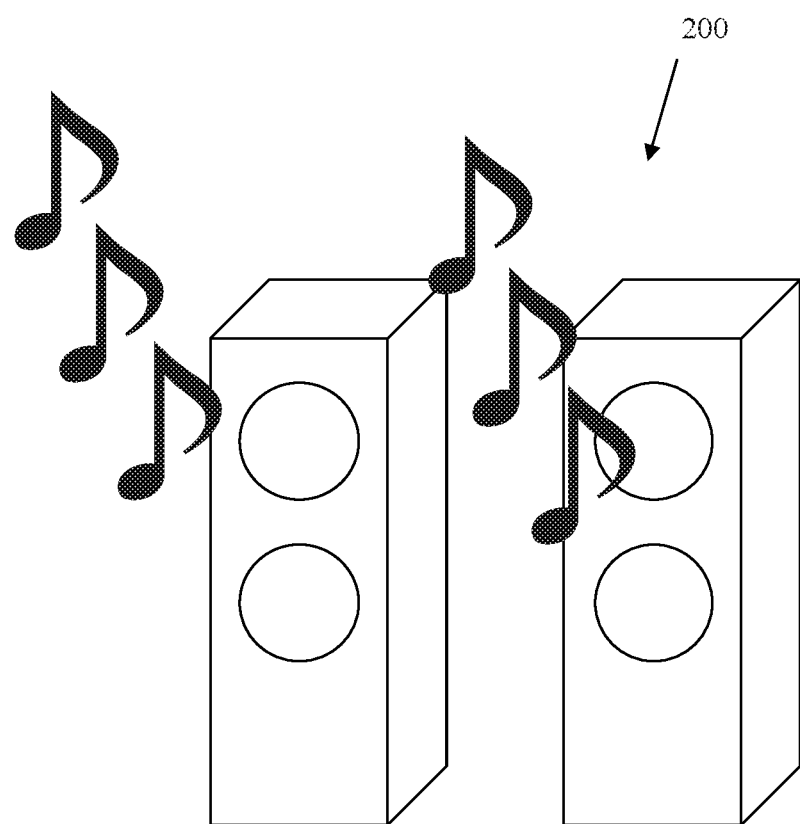
FIG. 30 illustrates how a streamed audio media asset is played and output at the media-playing device if the media-playing device has a loudspeaker unit.

In another example, as illustrated in FIG. 30, the media-playing device 200 may be a desktop loudspeaker having a loudspeaker unit as the output unit 303. The loudspeaker unit may output sound generated as a result of audio media asset being played at the processor 301. In the example of FIG. 30, the desktop loudspeaker 200 is outputting sound of the media asset "LoveSong01.mp3" from the loudspeaker unit, the sound being generated as a result of the media asset "LoveSong01.mp3" being played.

Other examples of the media-playing device 200 may include a head-mounted display, a digital signage, a video projector, and the likes.

Media-playing devices having capability of connecting network are disclosed, for example, in the U.S. patent publications Nos. US2012-36525 entitled "Unified User Interface for Viewing Desired Multi-media Content on an Internet Television", US2012-36524 entitled "System and Method for Social Network", US2009-316688 entitled "Method for Controlling Advanced Multimedia Features and Supplementary Services in Sip-based Phones and a System Employing Thereof", U.S. Pat. No. 8,074,248 entitled "System and method for providing video content associated with a source image to a television in a communication network", US201147568 entitled "TV User Interface with Recommended Content Entry in Favorites Menu", US2009-217323 entitled "Expanded Playlist for TV Video Player", and US2008-51917 entitled "Network Audio Speaker System", the contents of which are incorporated herein by reference.

Modification to Embodiment

Modification 1

As discussed above with reference to FIGS. 15 to 26, a connection between the cloud server computer 500 and the media-playing device 200 is requested (S2061) in response to a streaming request from the computing device 100 (S2060, S2210, S2110, S2220).

Instead thereof, a connection between the cloud server computer 500 and the media-playing device 200 may be requested in response to the login process in S2009.

Figure 43:
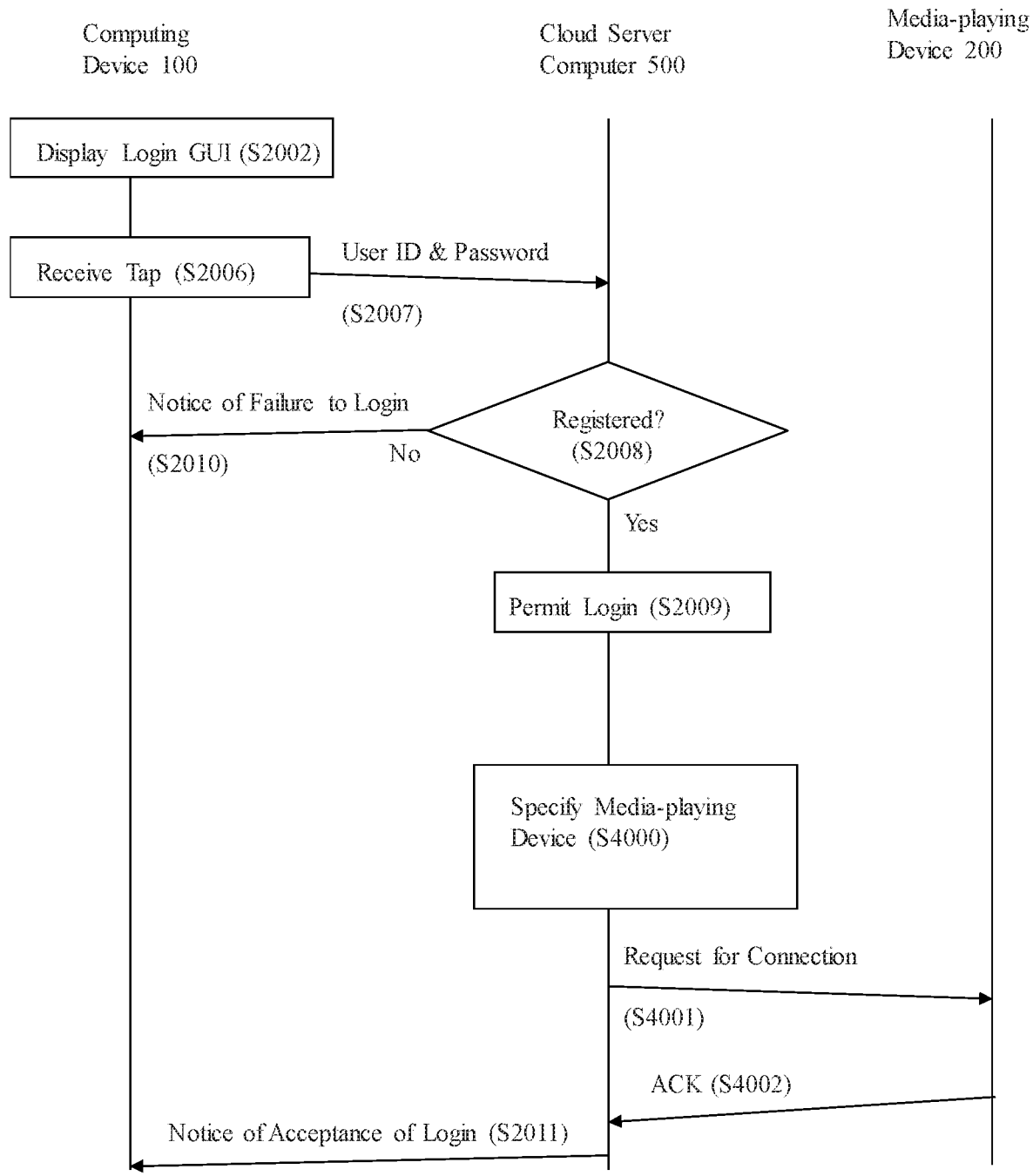
FIG. 43 is a flowchart illustrating operations performed by the computing device, the media-playing device, and the cloud server computer according to a modified first embodiment.

According to this modified embodiment, as illustrated in FIG. 43, responsive to accepting a login from the computing device 100 in S2009, the cloud server computer 500 specifies one or more media-playing devices 200 associated with the computing device 100 with reference to the device information 601 (S4000). For example, if the user has logged in with the user ID 001, the cloud server computer 500 refers to the device information 601 as the user data 600 of the user ID 001. Then, the cloud server computer 500 sends to the specified media-playing device 200 a request for connection between the media-playing device 200 and the cloud server computer 500 (S4001). Upon establishment of the connection (S4002), the cloud server computer 500 sends the notification of acceptance of login to the computing device 100 (S2011).

Figure 44:
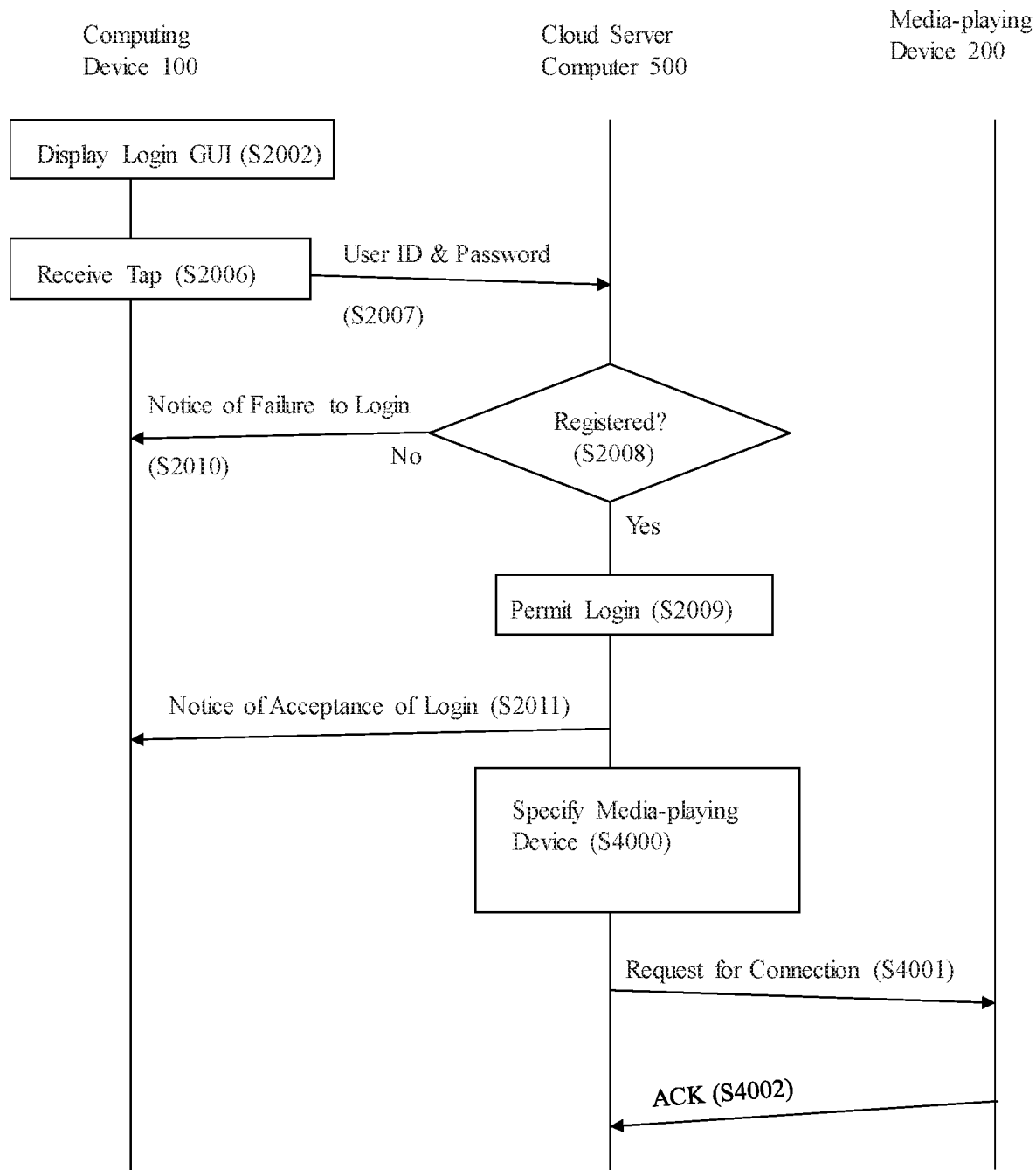
FIG. 44 is a flowchart illustrating operations performed by the computing device, the media-playing device, and the cloud server computer according to the modified first embodiment.

Or, as illustrated in FIG. 44, responsive to accepting a login from the computing device 100 in S2009, the cloud server computer 500, as well as sending the notification of acceptance of login in S2011, specifies one or more media-playing devices 200 associated with the computing device 100 with reference to the device information 601 (S4000), and requests the specified media-playing device 200 for connection (S4001). In other words, specifying and connecting to the media-playing device 200 in S4000 through S4002 may be performed in parallel to or soon after sending the notification in S2011.

Advantageously, according to the modified embodiment, connection between the cloud server computer 500 and the media-playing device 200 is established at a time from the acceptance of login (S2009) until the start of streaming (S2063). the connection establishment process in S2061 and S2062 may be unnecessary upon the streaming request in S2060, S2210, S2110, or S2220 because connection between the cloud server computer 500 and the media-playing device 200 may be already established, at the time of the streaming request, in accordance with the connection process in S4000 through S4002. Therefore, in the modified embodiment, the cloud server computer 500 may start streaming quickly without the connection establishment process (S2061, S2062) after the request for streaming from the computing device 100.

Modification 2

As discussed above with reference to FIG. 9, a request for connection to the cloud server computer 500 is sent from the computing device 100, and the login process is initiated by the computing device 100 through the login GUI as illustrated in FIG. 8A.

Instead thereof, the request may be sent from the media-playing device 200, and the login process may be initiated by the media-playing device 200 through a GUI at the media-playing device 200.

Figure 45:
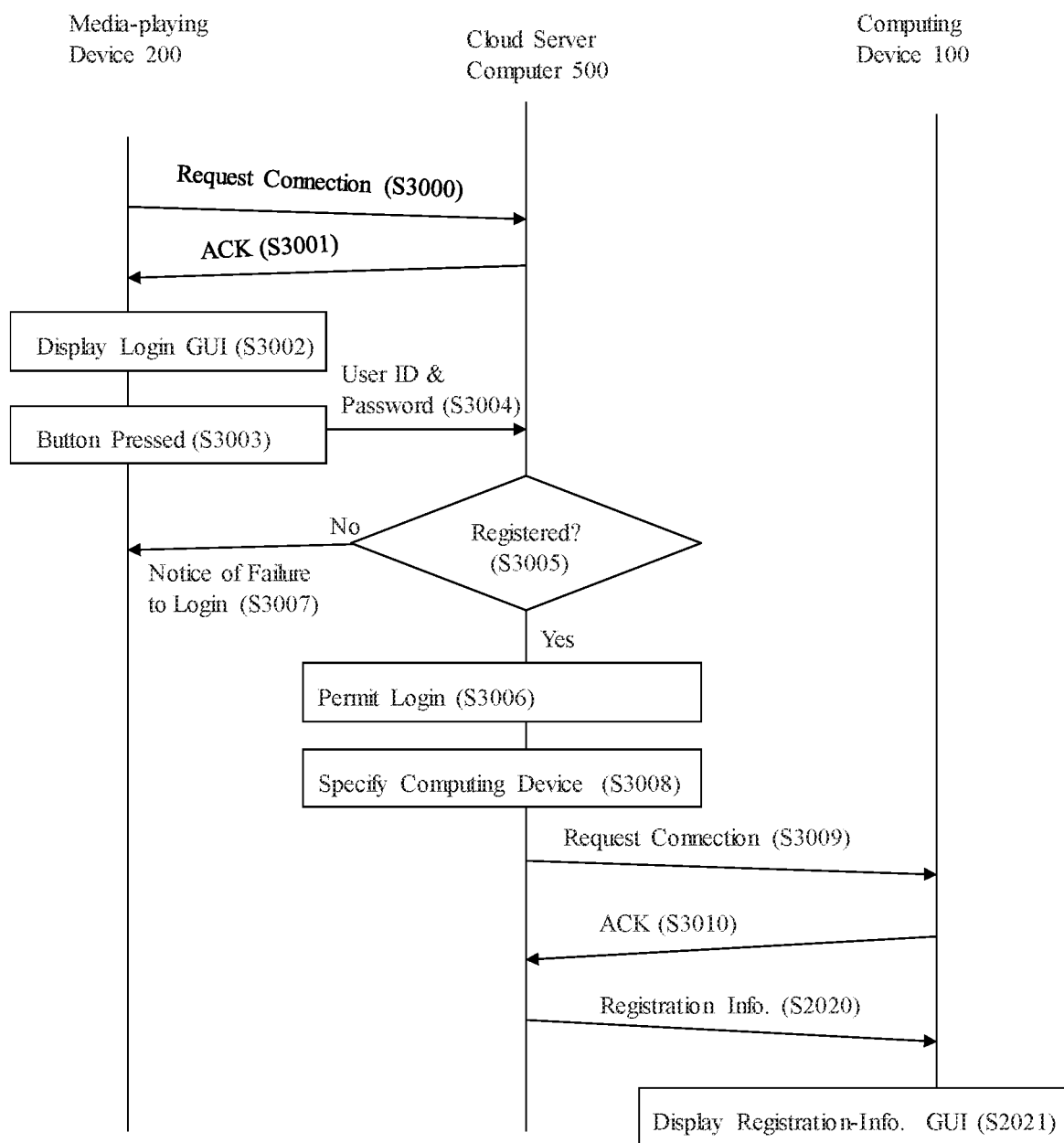
FIG. 45 is a flowchart illustrating operations performed by the computing device, the media-playing device, and the cloud server computer according to another modified first embodiment.

According to this modified embodiment, as illustrated in FIG. 45, the media-playing device 200 sends to the cloud server computer 500 a request for connection between the media-playing device 200 and the cloud server computer 500 (S3000).

Figure 46:
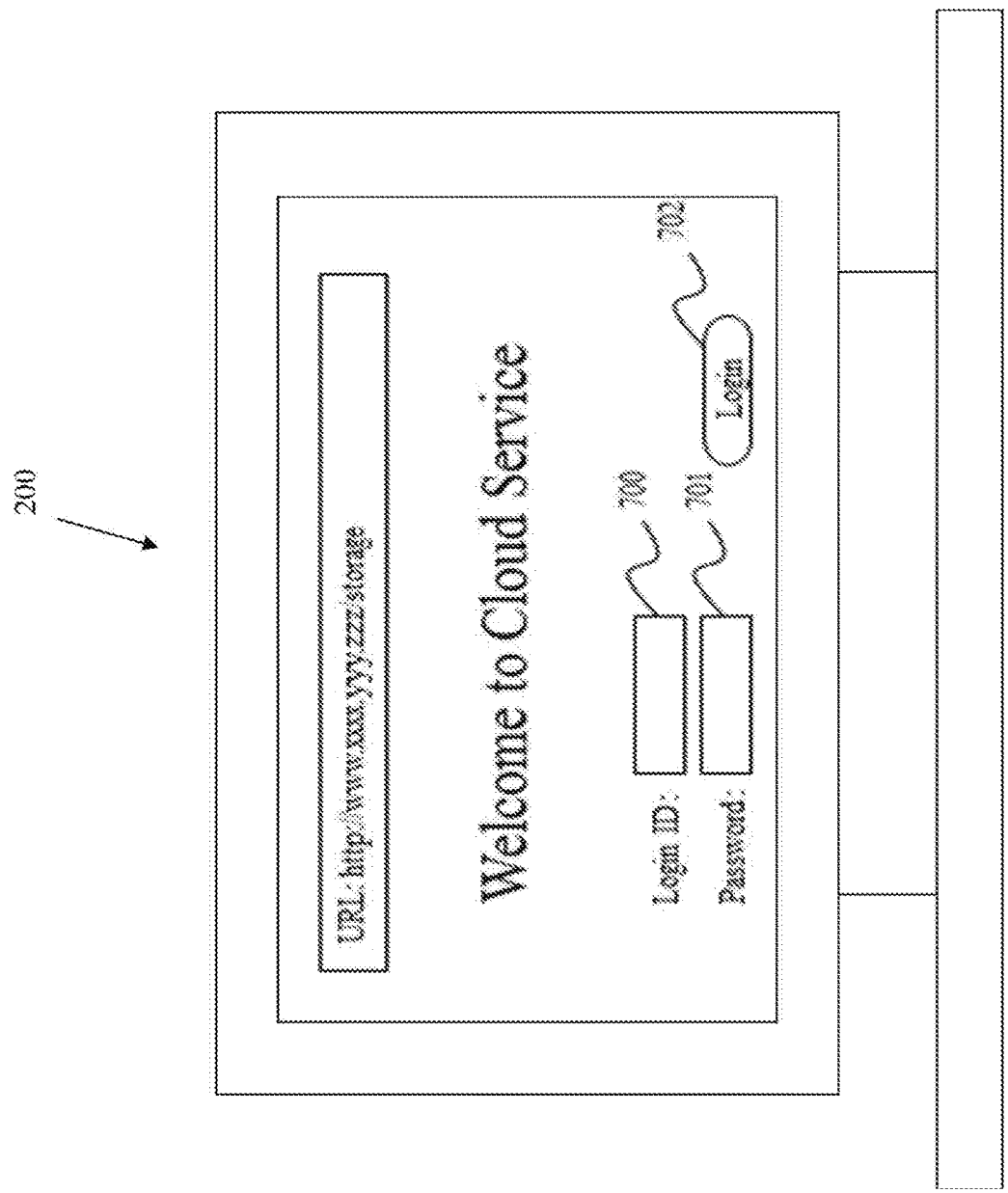
FIG. 46 illustrates how a GUI is displayed at the media-playing device according to the modified first embodiment.

Upon establishment of the connection (S3001), the media-playing device 200 displays on the output unit 303 a login GUI for login to the cloud server computer 500 (S3002). As illustrated in FIG. 46, the login GUI may contain a login ID input field 700, a password input field 701, and a button 702. The media-playing device 200 receives user inputs of a login ID and a password in the fields 700 and 701 as well as receives pressing the button 702. The pressing may be accomplished by the user's tapping on the button 702 through the output unit 301 if the output unit 301 includes a sensitive display capable of detecting taps as similar to the sensitive display 102. Or, if the media-playing device 200 is coupled to an input device such as a keyboard, a mouse, a remote commander, and the likes, the pressing may be accomplished by the user's clicking or selecting the button 702 through the input device.

Responsive to the button 702 being pressed (S3003), the media-playing device 200 sends to the cloud server computer 500 a request for login with the inputted user ID and the password (S3004).

The cloud server computer 500 then accepts the requested login (S3006) if the user ID and the password are registered together as the user data 600 (S3005: Yes). If the user ID and the password are not registered (S3005: No), the cloud server computer 500 does not accept the requested login, and notifies the media-playing device 200 of failure to login (S3007).

Responsive to the login being permitted (S3006), the cloud server computer 500 specifies a computing device 100 associated with the media-playing device 200 with reference to the device information 601 of the logged-in user (S3008). For example, if the user has logged in with the user ID 001, the cloud server computer 500 refers to the device information 601 of the user ID 001. Then, the cloud server computer 500 sends to the specified computing device 100 a request for connection between the cloud server computer 500 and the computing device 100 (S3009).

Upon establishment of connection between the cloud server computer 500 and the computing device 100 (S3010), the process proceeds to S2020 as illustrated in FIG. 10. Namely, the cloud server computer 500 sends to the computing device 100 the device information 601 stored as the user data 600 (S2021), and then the computing device 100 displays the GUI for registration information as illustrated in FIG. 8C with reference to the device information 601 (S2020).

The S3000 through S3010 are executed instead of S2002 through S2009 illustrated in FIGS. 9 and 10. After S3010, the process proceeds to S2020 and continues as illustrated in FIGS. 11 through 26.

Advantageously, according to the modified embodiment, the connection establishment process in S2061 and S2062 may be unnecessary upon the streaming request in S2060, S2210, S2110, or S2220 because connection between the cloud server computer 500 and the media-playing device 200 may be already established, at the time of the streaming request, in accordance with the connection process in S3000 and S3001. Therefore, in the modified embodiment, the cloud server computer 500 may start streaming quickly without the connection establishment process after the request for streaming from the computing device 100.

Second Embodiment

Summary

In a second embodiment, the cloud server computer 500 presents to the media-playing device 200 information indicative of the stored media assets. The media-playing device 200 transfers to the computing device 100 the received information. The computing device 100 displays a list of the media assets based on the information, and receives selection of a media asset from the user to send the selection result back to the media-playing device 200. Responsive to the selection result, the media-playing device 200 requests the cloud server computer 500 to stream the selected media asset to the media-playing device 200.

FIGS. 61, 62, and 64 to 66 are flowcharts illustrating how the streaming is performed.

Figure 61:
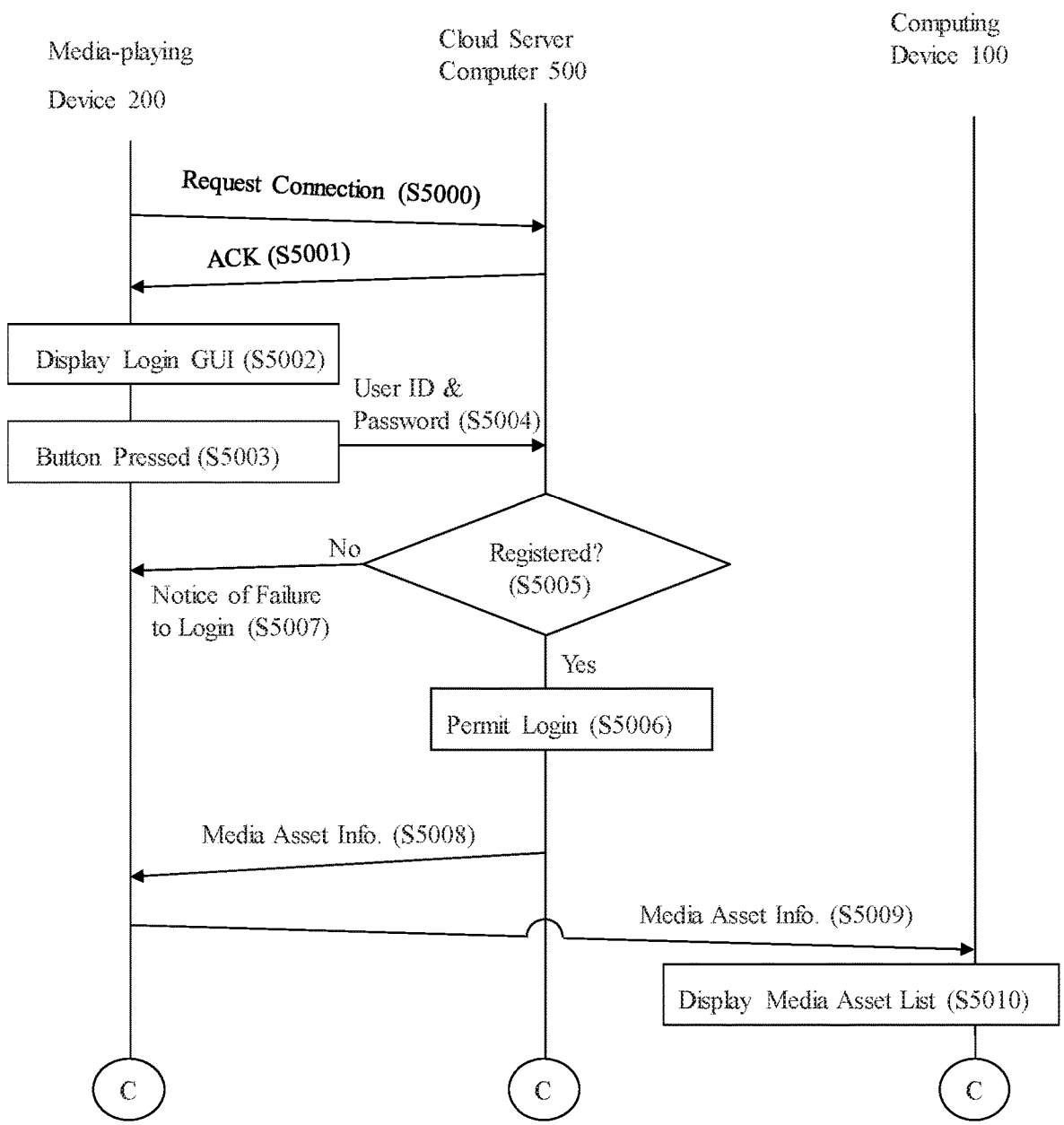
FIG. 61 is a flowchart illustrating operations performed by the computing device, the media-playing device, and the cloud server computer for media streaming according to the second embodiment.
Figure 62:
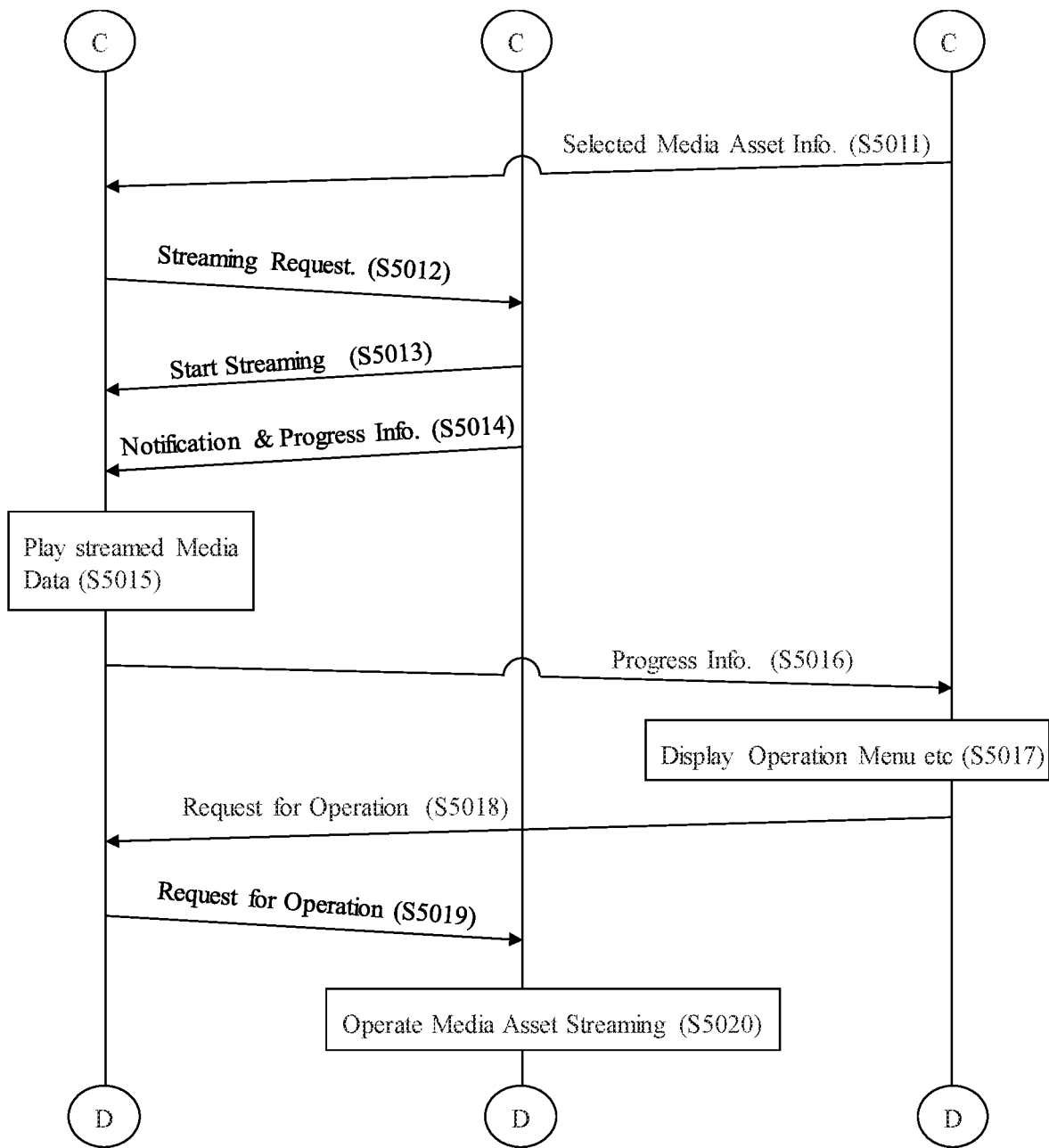
FIG. 62 is a flowchart illustrating operations performed by the computing device, the media-playing device, and the cloud server computer for media streaming according to the second embodiment.

The user first uses the media-playing device 200 to connect to the cloud server computer 500 over network 400. The media-playing device 200 launches the streaming program 305a According to the instructions of the streaming program 305a, as illustrated in FIG. 61, the media-playing device 200 first sends to the cloud server computer 500 a request for connection between the media-playing device 200 and the cloud server computer 500 over the network 400 through the communication circuitry 302 (S5000).

Figure 59:
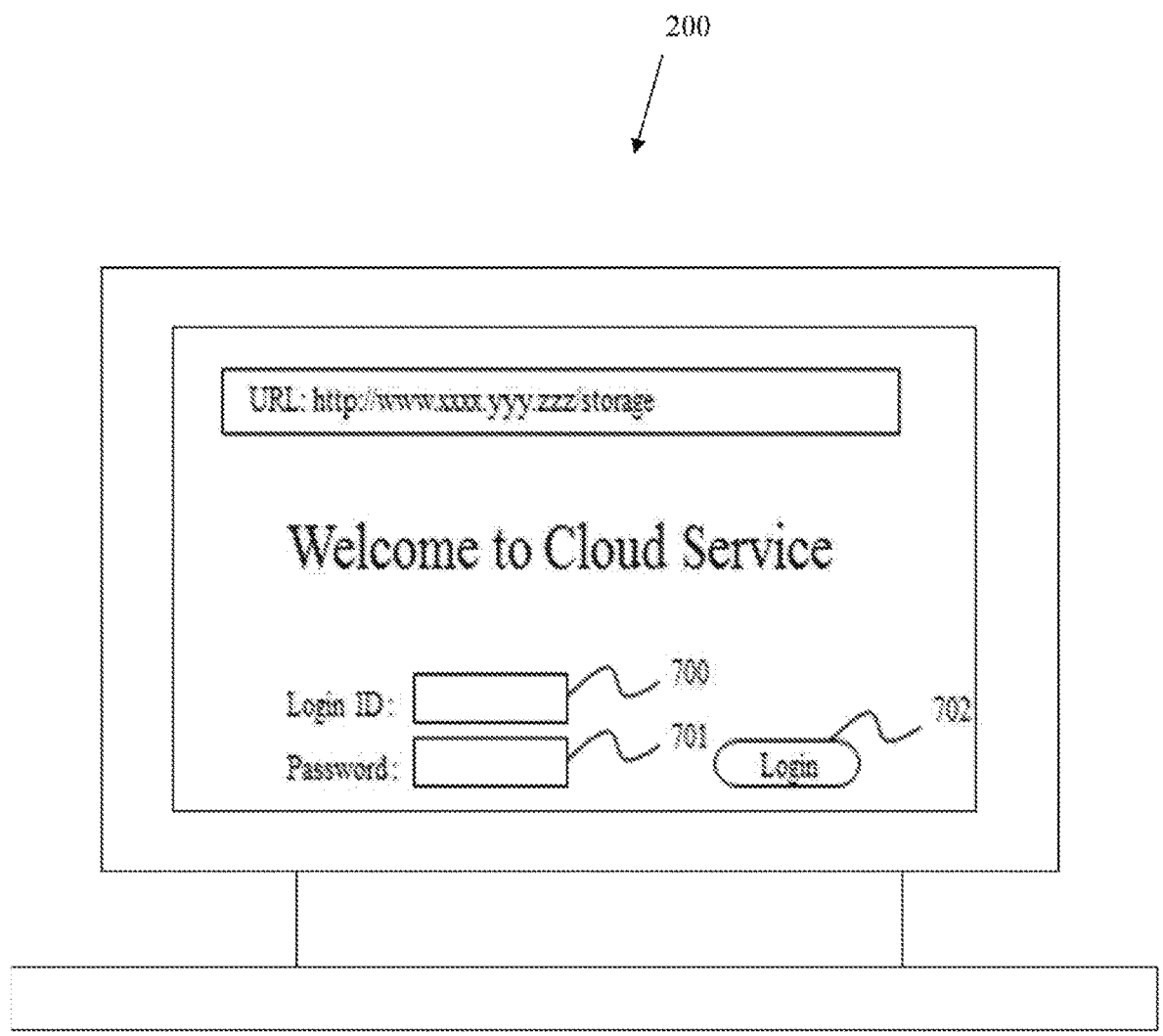
FIG. 59 illustrates a GUI for login displayed at the media-playing device according to a second embodiment.

Upon establishment of the connection (S5001), the media-playing device 200 displays, on the output unit 303, a GUI for login as illustrated in FIG. 59 (S5002).

The login GUI may contain the login ID input field 700, the password input field 701, and the button 702. The media-playing device 200 receives user inputs of a login ID and a password in the fields 700 and 701 as well as receives the user's pressing the button 702. The pressing may be accomplished by tapping on the button 702 through the output unit 301 if the output unit 301 includes a sensitive display capable of detecting taps as similar to the sensitive display 102. Or, if the media-playing device 200 is coupled to an input device such as a keyboard, a mouse, and a remote commander, the pressing may be accomplished by clicking or selecting the button 702 through the input device.

Responsive to the button 702 being pressed (S5003), the media-playing device 200 sends to the cloud server computer 500 a request for login with the inputted user ID and the password (S5004).

The cloud server computer 500 accepts the requested login (S5006) if the user ID and the password are registered together as the user data 600 (S5005: Yes). If the user ID and the password are not registered (S5005: No), the cloud server computer 500 does not accept the requested login, and notifies the media-playing device 200 of failure to login (S5007).

Responsive to the login being permitted (S5006), the cloud server computer 500 sends to the media-playing device 200 information indicative of the media assets 602 stored as the user data 600 of the logged in user ID over the network 400 through the communication circuitry 503 (S5008). For example, if the user has logged in with the user ID 001, the information indicative of the media assets 602 stored as the user data 600 of the user ID 001 is sent to the media-playing device 200. The information sent at S5008 may be a list of the media assets 602.

Responsive to reception of the information indicative of the media assets 602 through the communication circuitry 302, the media-playing device 200 transfers the information to the computing device 100 through the close-range communication circuitry 304 (S5009).

Figure 60:
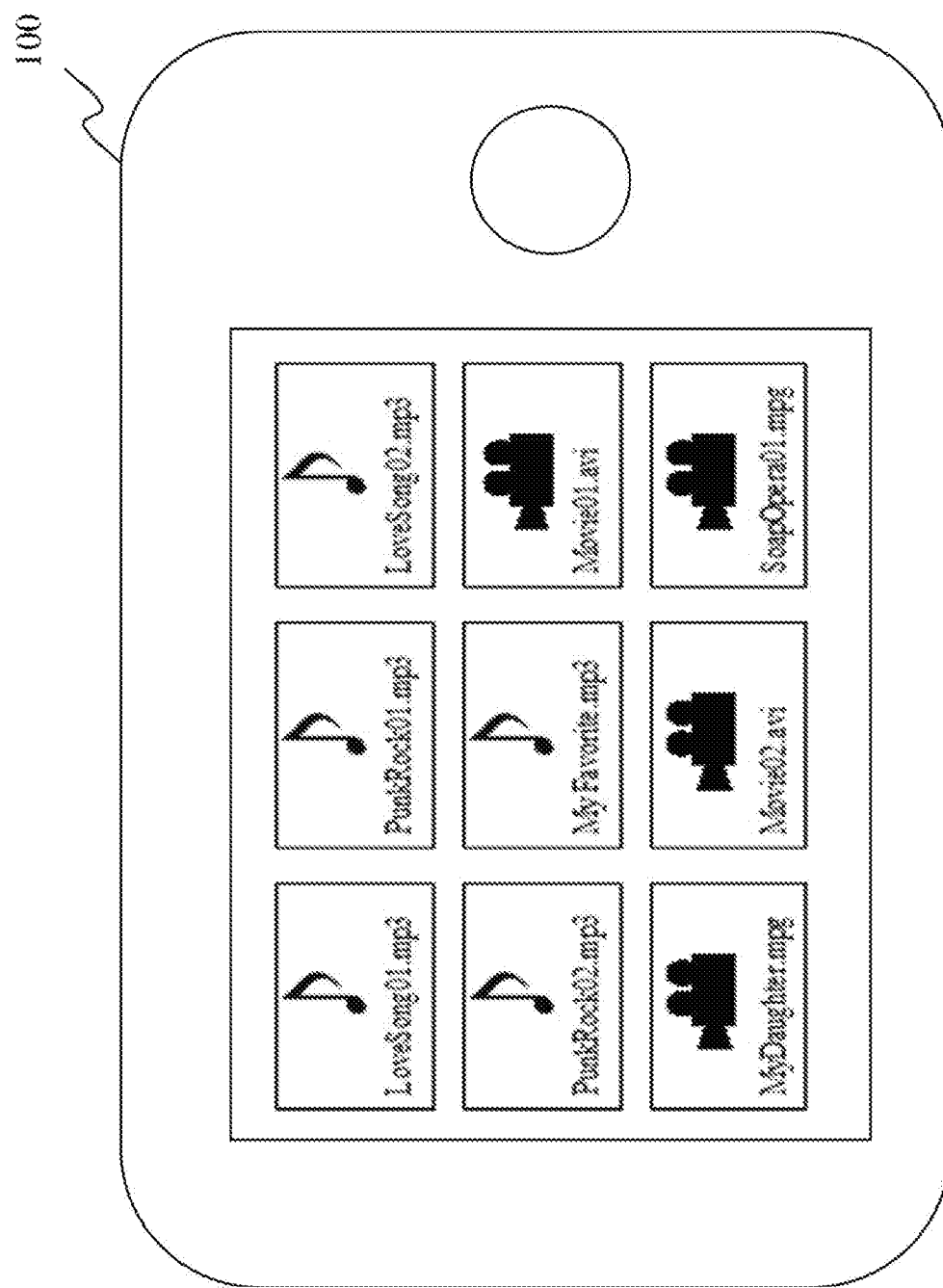
FIG. 60 illustrates a list of media assets displayed at the computing device according to the second embodiment.

Responsive to the information indicative of the media assets 602, the computing device 100 displays on the sensitive display 102 a list of the media assets 602 in a tappable manner as illustrated in FIG. 60 (S5010). The list may contain tappable objects, such as thumbnails, each representing each of the media assets 602. In an example of FIG. 60, the computing device 100 lists tappable thumbnails representing media assets 602 contained in the user data 600 of the user ID 001, namely, "LoveSong01.mp3", "PunkRock01.mp3". "LoveSong02.mp3". "PunkRock02.mp3", "MyFavorite.mp3", "Movie01.avi", "MyDaughter.mpg", "Movie02.avi", and "SoapOpera01.mpg".

Through the displayed media assets list, the user can select a media asset by tapping on a thumbnail representing the media asset. The computing device 100 receives a tap made by the user onto a tappable thumbnail.

Responsive to a tappable thumbnail being tapped, the computing device 100 sends information indicative of a media asset represented by the tapped thumbnail to the media-playing device 200 through the close-range communication circuitry 106 (S5011).

Responsive to the information indicative of a media asset, the media-playing device 200 sends a request for streaming of the selected media asset to the cloud server computer 500 through the communication circuitry 302 (S5012).

Responsive to the request, the cloud server computer 500 starts streaming the requested media asset 602 to the media-playing device 200 (S5013). Specifically, the cloud server computer 500 starts streaming the requested media asset by directing the streaming to the IP address of the media-playing device 200. If the requested media asset concerns encoded video or audio data, the streaming may be made by directly sending the encoded video or audio data to the media-playing device 200, or by decoding the encoded video or audio data to send the decoded data to the media-playing device 200. If the requested media asset concerns a video game program, the streaming may be made by executing the video game program to send rendered video game graphics and played video game sound to the media-playing device 200.

Upon starting the streaming, the cloud server computer 500 sends to the media-playing device 200 a notification that the streaming has been started, and starts sending to the media-playing device 200 progress information indicative of progress of the streaming (S5014). The notification may contain information indicative of the streamed media asset such as the name of the streamed media asset, the format of the streamed media asset, the duration of the streamed media asset, and the likes. The progress information may indicate how far the media asset has been streamed within the duration of the media asset. The cloud server computer 500 intermittently sends the progress information based on the progress of the streaming after S5014 as long as the streaming is in progress.

The media-playing device 200 receives the streamed media asset, the notification, and the progress information. While the media asset is being streamed, the media-playing device 200 plays the media asset (S5015). Specifically, resultant audio and/or video generated as a result of the media asset being played is outputted through the output unit 303. For example, if the streamed media asset involves an encoded audio or video data, the streamed media asset is decoded by the processor 301 so that the decoded video or audio is outputted by the output unit 303. For example, if the streamed media asset involves video game graphics, the streamed media asset is just outputted by the output unit 303

In parallel to playing the streamed media asset at S5015, the media-playing device 200 transfers the notification to the computing device 100 through the close-range communication circuitry 304, and intermittently transfers the received progress information to the computing device 100 through the close-range communication circuitry 304 (S5016).

Figure 63:
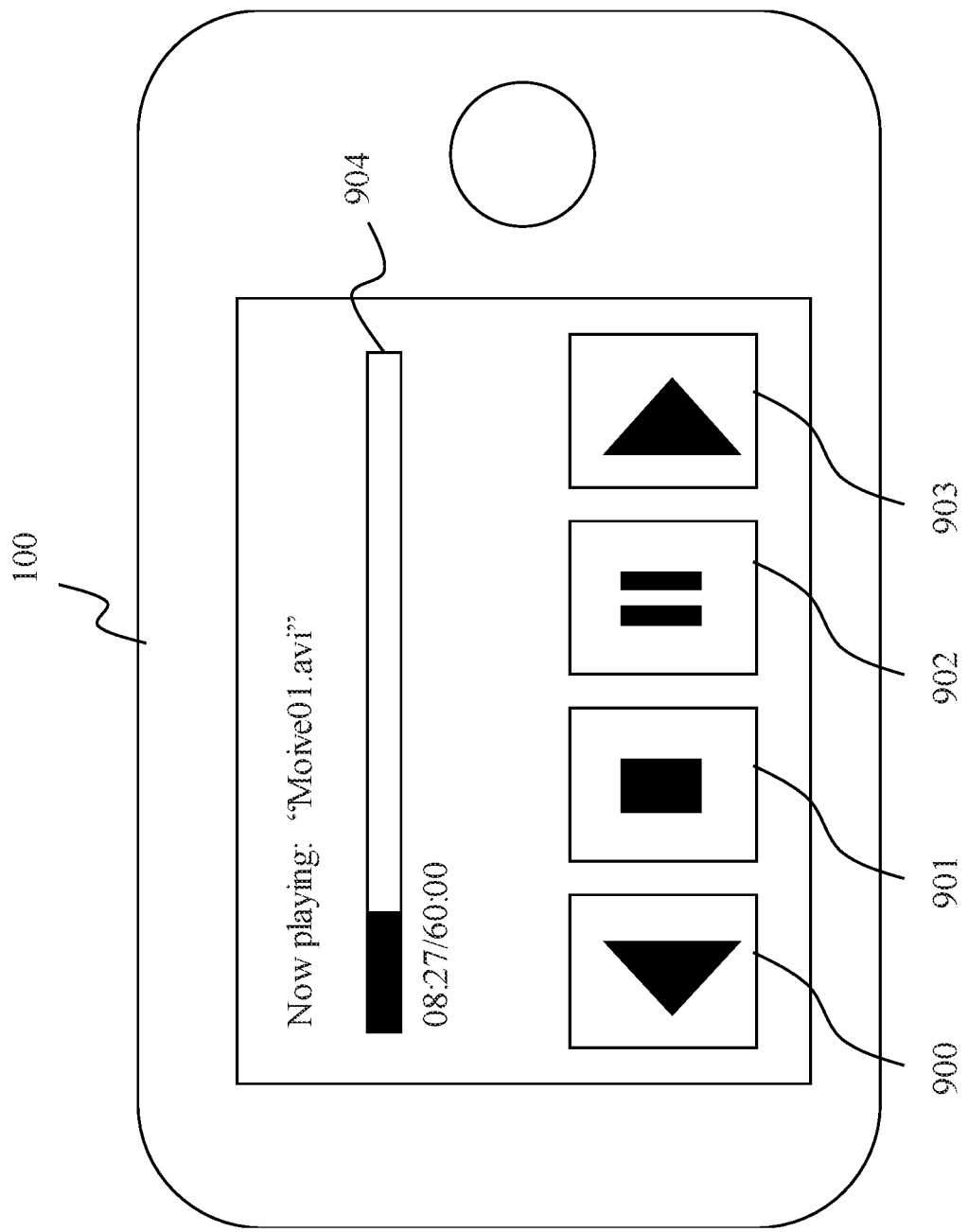
FIG. 63 illustrates how progress information is displayed at the computing device according to the second embodiment.
Figure 64:
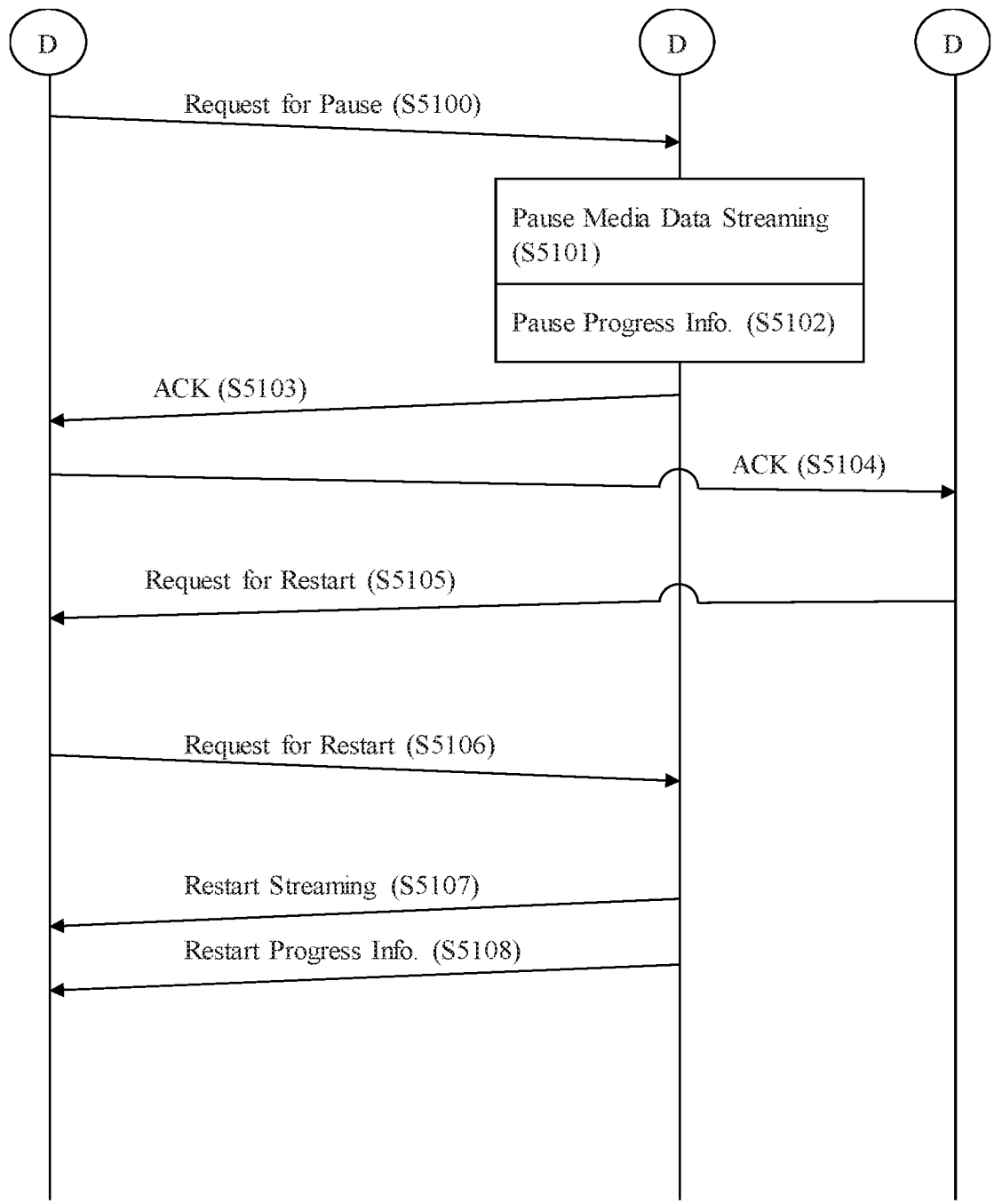
FIG. 64 is a flowchart illustrating operations performed by the computing device, the media-playing device, and the cloud server computer for pausing streaming according to the second embodiment.
Figure 65:
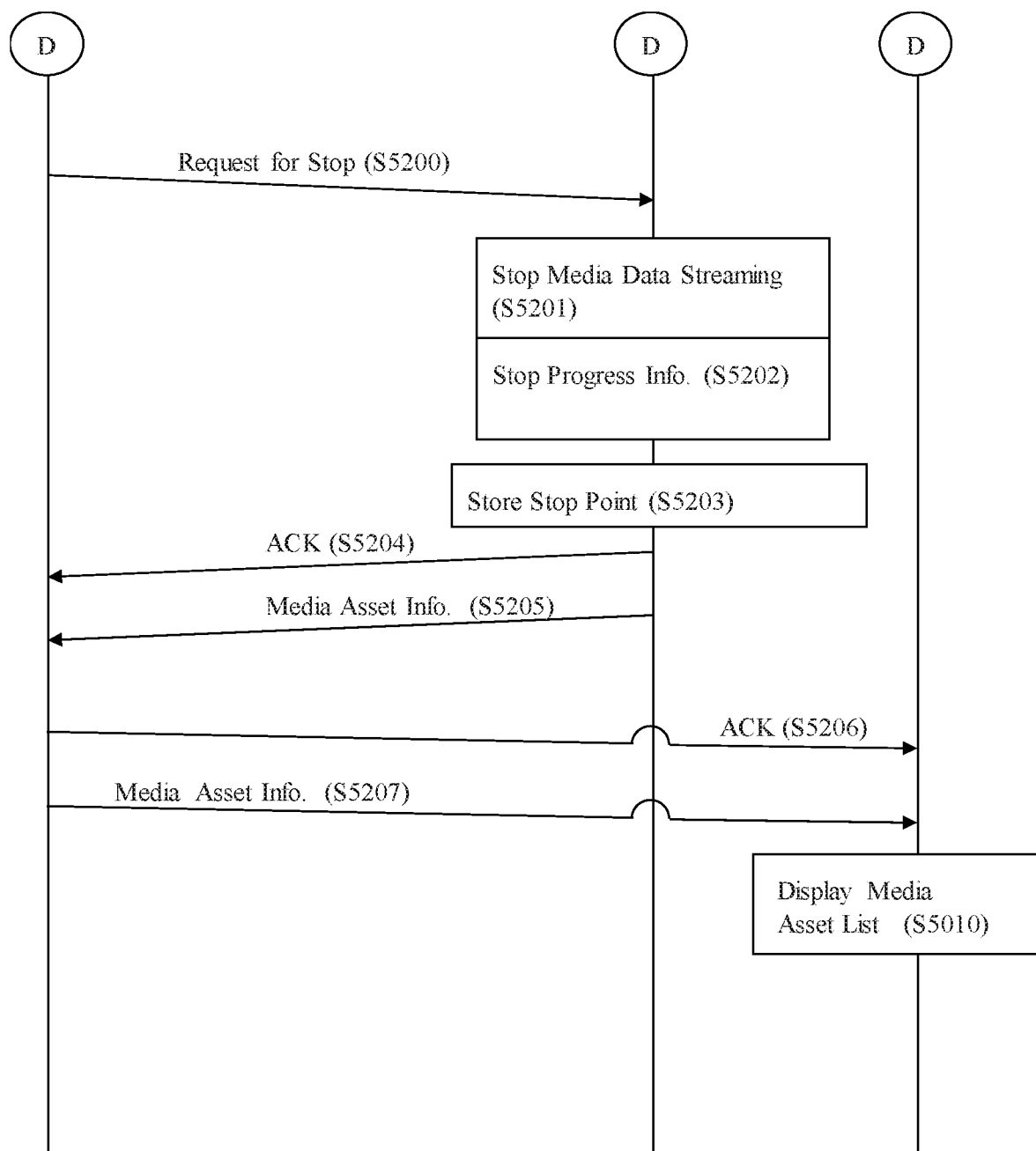
FIG. 65 is a flowchart illustrating operations performed by the computing device, the media-playing device, and the cloud server computer for stopping streaming according to the second embodiment.
Figure 66:
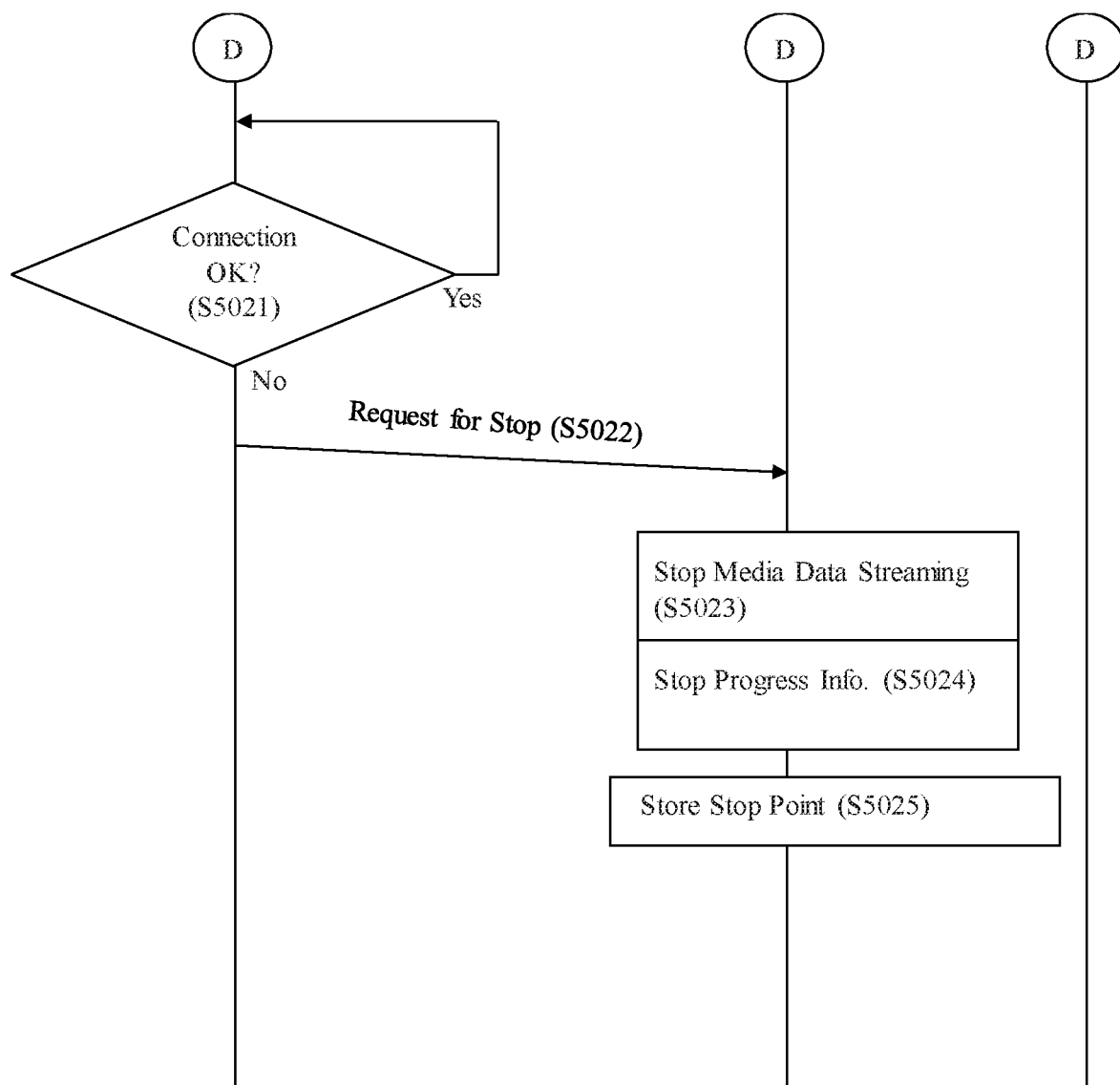
FIG. 66 is a flowchart illustrating operations performed by the media-playing device and the cloud server computer for monitoring connection according to the second embodiment.

Responsive to the notification and the progress information, the computing device 100 starts displaying on the sensitive display 102 information indicative of the streamed media asset and a graphical menu based on the notification and the progress information (S5017). For example, as illustrated in FIG. 63, the sensitive display 102 displays the name of the streamed media asset, a progress bar 904 indicative of how far the media asset has been played within the duration of the played media asset, and a graphical menu consisting of the icons 900 to 903 for operation of the streaming. In the example of FIG. 63, the sensitive display 102 is showing that the media asset with the name of "Movie01.avi" has been played for eight minutes and twenty-seven seconds after the start of the streaming within the duration of sixty minutes. The icons 900 to 903 are icons for operation of streaming of the media asset. Responsive to one of the icons 900 to 903 being tapped through the sensitive display 102, the computing device 100 sends a request for operation of the ongoing streaming of the media asset to the media-playing device 200 through the close-range communication circuitry 106 (S5018). For example, responsive to the icon 900 being tapped, the computing device 100 requests rewinding of the ongoing streaming of the media asset. For example, responsive to the icon 901 being tapped, the computing device 100 requests stopping of the ongoing streaming of the media asset. For example, responsive to the icon 902 being tapped, the computing device 100 requests pausing of the ongoing streaming of the media asset. For example, responsive to the icon 903 being tapped, the computing device 100 requests fast-forwarding of the ongoing streaming of the media asset.

Responsive to the request for operation from the computing device 100, the media-playing device 200 transfers the request to the cloud server computer 500 over the network 400 through the communication circuitry 302 (S5019).

Responsive to the request, the cloud server computer 500 operates the streaming of the ongoing media asset, namely, rewinds, stops, pauses, or fast-forwards the ongoing streaming of the media asset (S5020).

In case of response to the request for pause of the streaming by way of the icon 902 being tapped in S5018 (S5100), the cloud server computer 500 pauses the ongoing streaming to the media-playing device 200 (S5101) and pauses the intermittent transmission of the progress information to the media-playing device 200 (S5102). Upon pausing the streaming and the intermittent progress information (S5101, S5102), the cloud server computer 500 sends an acknowledgement to the media-playing device 200 (S5103). Responsive to the acknowledgement, the media-playing device 200 stops intermittent transferring of the progress information to the computing device 100, and transfers the acknowledgement to the computing device 100 through the close-range communication circuitry 304 (S5104).

After the acknowledgement at S5104, the computing device 100 can send to the media-playing device 200 for restart of the paused streaming responsive to the icon 902 being tapped again (S5105). Responsive to the request for restart, the media-playing device 200 transfers the request to the cloud server computer 500 over the network 400 through the communication circuitry 302 (S5106).

Responsive to the request, the cloud server computer 500 restarts the streaming of the media asset again to the media-playing device 200 (S5107) as well as restarts intermittently transmitting the progress information to the media-playing device 200 (S5108).

In case of response to the request for stop of the streaming by way of the icon 901 being tapped in S5019 (S5200), the cloud server computer 500 stops the ongoing streaming to the media-playing device 200 (S5201) and stops the intermittent transmission of the progress information (S5202). Upon stopping the streaming and the intermittent progress information (S5201, S5202), the cloud server computer 500 stores a stop point indicative of a temporal or chronological point at which the streaming is stopped within the duration of the media asset (S5203). Specifically, the cloud server computer 500 stores the stop point in association with the stopped media asset as the user data 600 corresponding to the logged-in user ID. The cloud server computer 500 will start streaming of the once-stopped media asset at the stop point stored in association with the media asset responsive to request for streaming the once-stopped media asset again from the media-playing device 200. Assuming that the streaming is stopped at the moment illustrated in FIG. 63, the cloud server computer 500 stores a stop point indicative of eight minutes and twenty-seven seconds within the sixty minute duration in association with "Movies01.avi" as the user data 600 of the user ID 001, and the cloud server computer 500 will start streaming "Movies01.avi" at eight minutes and twenty-seven seconds responsive to request for streaming "Movie01.avi" again from the media-playing device 200.

Also, upon stopping the streaming and the intermittent progress information (S5201, S5202), the cloud server computer 500 sends to the media-playing device 200 an acknowledgement (S5204) and information indicative of the media assets 602 stored as the user data 600 of the logged in user ID (S5205) over the network 400 though the communication circuitry 503.

Responsive to the acknowledgement and the information indicative of the media assets 602, the media-playing device 200 transfers the acknowledgement and the information to the computing device 100 through the close-range communication circuitry 304 (S5206, S5207).

Responsive to the acknowledgement and the information, the computing device 100 returns to S5010, namely, starts displaying on the sensitive display 102 a list of the media assets 602 in a tappable manner as illustrated in FIG. 60.

While the media-playing device 200 is playing a media asset after S5015, the media-playing device 200 may continuously monitor connection between the media-playing device 200 and the computing device 100, namely, between the close-range communication circuitry 304 and the close-range communication circuitry 106 (S5021).

The monitoring of connection may be made by, for example, sending polling signals intermittently from the media-playing device 200 to the computing device 100 through the close-range communication circuitry 304. As long as the media-playing device 200 receives acknowledgements from the computing device 100 in reply to the polling signals through the close-range communication circuitry 304, the media-playing device 200 determines that the connection is kept established between the computing device 100 and the media-playing device 200. If the media-playing device 200 fails to receive acknowledgements from the computing device 100 in reply to the polling signals, the media-playing device 200 determines that the computing device 100 and the media-playing device 200 have been disconnected from each other for some reason. Note that the computing device 100 may become disconnected from the media-playing device 200 if, for example, the computing device 100 has been powered off or has been carried by the user to some place where the computing device 100 cannot wirelessly connect to the media-playing device 200 via the close-range communication circuitry 106.

Responsive to determining that the media-playing device 200 and the computing device 100 have been disconnected from each other (S5021: NO), the media-playing device 200 sends to the cloud server computer 500 a request for stop of the ongoing streaming (S5022).

Responsive to the request, the cloud server computer 500 stops the ongoing streaming of the media asset (S5023) and stops the intermittent transmission of the progress information (S5024). Upon stopping the streaming and the intermittent progress information (S5023, S5024), the cloud server computer 500 stores a stop point indicative of a temporal or chronological point at which the streaming is stopped within the duration of the media asset (S5025). The cloud server computer 500 stores the stop point in association with the stopped media asset as the user data 600 corresponding to the logged-in user ID. The cloud server computer 500 will start streaming of the once-stopped media asset at the stop point stored in association with the media asset responsive to request for streaming the once-stopped media asset again from the media-playing device 200. Assuming that the streaming is stopped at the moment illustrated in FIG. 60, the cloud server computer 500 stores a stop point indicative of eight minutes and twenty seven seconds within the sixty minute duration in association with "Movies01.avi" as the user data 600 of the user ID 001, and the cloud server computer 500 will start streaming "Movies01.avi" at the time of eight minutes and twenty seven seconds responsive to request for streaming "Movie01.avi" again from the media-playing device 200.

Thanks to S5021 through S5026, if the cloud server computer 500 becomes unable to receive requests from the computing device 100 and so the streaming of the media asset may become out of control, the streaming automatically stops. Accordingly, the media asset can be avoided from being streamed out of control in case of some communication trouble between the computing device 100 and the cloud server computer 500.

Advantage and Supplemental Note

The embodiments described above allow the user to use one of his/her device (for example, the computing device 100) to start and/or control media asset streaming from the cloud server computer 500 to another of his/her device (for example, the media-playing device 200).

Thanks to the embodiments, the user can use a portable or mobile device (for example, the computing device 100) as a remote commander for operating streaming, to enjoy playing a media asset at another device (for example, the media-playing device 200) having a greater display and/or loudspeaker.

Further modifications and alternative embodiments will be apparent to those skilled in the art in view of this disclosure. Accordingly, the above description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

What is claimed is:

1. A method comprising:
at a media playback device:
responsive to a streaming request for media content that corresponds to a thumbnail image displayed on a mobile device, establishing a data communication connection with a server, the server storing the media content, the server associated with an IP address that is different from a first IP address associated with the mobile device and a second IP address associated with the media playback device;
requesting the server to stream the media content via the data communication connection;
initiating playback of the media content streamed from the server; and
concurrently with respect to the playback of the media content, forwarding progress information, via a wireless connection, to the mobile device or to the server, wherein the progress information indicates progress of the playback by the media playback device of the media content streamed from the server.

2. The method of claim 1, wherein the progress information is indicative of the progress of the playback of the media content with respect to a duration of the media content.

3. The method of claim 1, wherein the progress information is indicative of the progress of the playback of the media content with respect to a beginning of the media content.

4. The method of claim 1, wherein the mobile device renders the progress information on a graphical user interface as a graphical interface element.

5. The method of claim 1, wherein the media playback device is responsive to an operation request from the mobile device.

6. The method of claim 5, wherein the operation request is a stop playback command.

7. The method of claim 5, wherein the operation request is a display feature with respect to the media content.

8. The method of claim 1, wherein the progress information is indicative of the progress of the playback of the media content with respect to a beginning of the media content.

* * * * *